United States Patent [19]
Eder

[11] Patent Number: 5,615,109
[45] Date of Patent: Mar. 25, 1997

[54] METHOD OF AND SYSTEM FOR GENERATING FEASIBLE, PROFIT MAXIMIZING REQUISITION SETS

[76] Inventor: Jeff Eder, 15422 SE. 7th Pl., Bellevue, Wash. 98007

[21] Appl. No.: 448,826

[22] Filed: May 24, 1995

[51] Int. Cl.⁶ .................................................. G06F 15/00
[52] U.S. Cl. ........................................ 395/208; 395/235
[58] Field of Search .................................. 364/401, 403, 364/404, 408; 395/925

[56] References Cited

U.S. PATENT DOCUMENTS

| | | | |
|---|---|---|---|
| 4,989,141 | 1/1991 | Lyons et al. | 364/408 |
| 5,128,861 | 7/1992 | Kagami | 364/403 |
| 5,189,608 | 2/1993 | Lyons | 364/408 |
| 5,224,034 | 6/1993 | Katz | 364/401 |
| 5,237,495 | 8/1993 | Morii | 364/401 |
| 5,237,496 | 8/1993 | Kagami | 364/401 |
| 5,521,813 | 5/1996 | Fox et al. | 364/401 |

*Primary Examiner*—Paul P. Gordon
*Assistant Examiner*—Ronald E. Prass, Jr.

[57] ABSTRACT

In a computer based inventory control method and system, feasible profit maximizing sets of requisitions are created. System processing starts with the creation of detailed, multi-dimensional forecasts of sales and cash receipts using stored algorithms and data preferentially extracted from a basic financial system and the adjustment of the forecasts to match the controlling forecast specified by the user. The adjustment of the forecasts is facilitated by the use of a calculated variable that defines the magnitude of the relative adjustment for each forecast element. All forecasts are adjusted to exactly match a controlling forecast which is either a multivalent combination of the previously generated forecasts or the user specified controlling forecast. The adjusted forecast of sales by item is then used in calculating a requisition set that satisfies expected demand while meeting user specified service level targets. A profit maximized requisition set is then created that utilizes vendor and unit of measure substitution under a variety of discount schedules to the extent possible within the user specified constraints. The processing completed by the system to determine the profit maximizing requisition set utilizes multi-objective, mixed-integer, linear programming techniques. A financial forecast is then calculated and displayed to determine if purchasing the profit maximizing requisition set will be feasible under the forecast financial conditions. Once the constraints and/or forecasts are adjusted as required to produce a feasible solution, processing advances to the profit enhancement stage where overall financial constraints are established and user specified constraints on commitment percentages, global unit of measure substitution and global vendor substitution are optionally relaxed and profit enhancing changes are calculated, stored and displayed. The user optionally accepts displayed enhancements and the financial forecast is recalculated to demonstrate the impact of the accepted changes before the requisitions are modified to reflect the accepted enhancements.

10 Claims, 13 Drawing Sheets

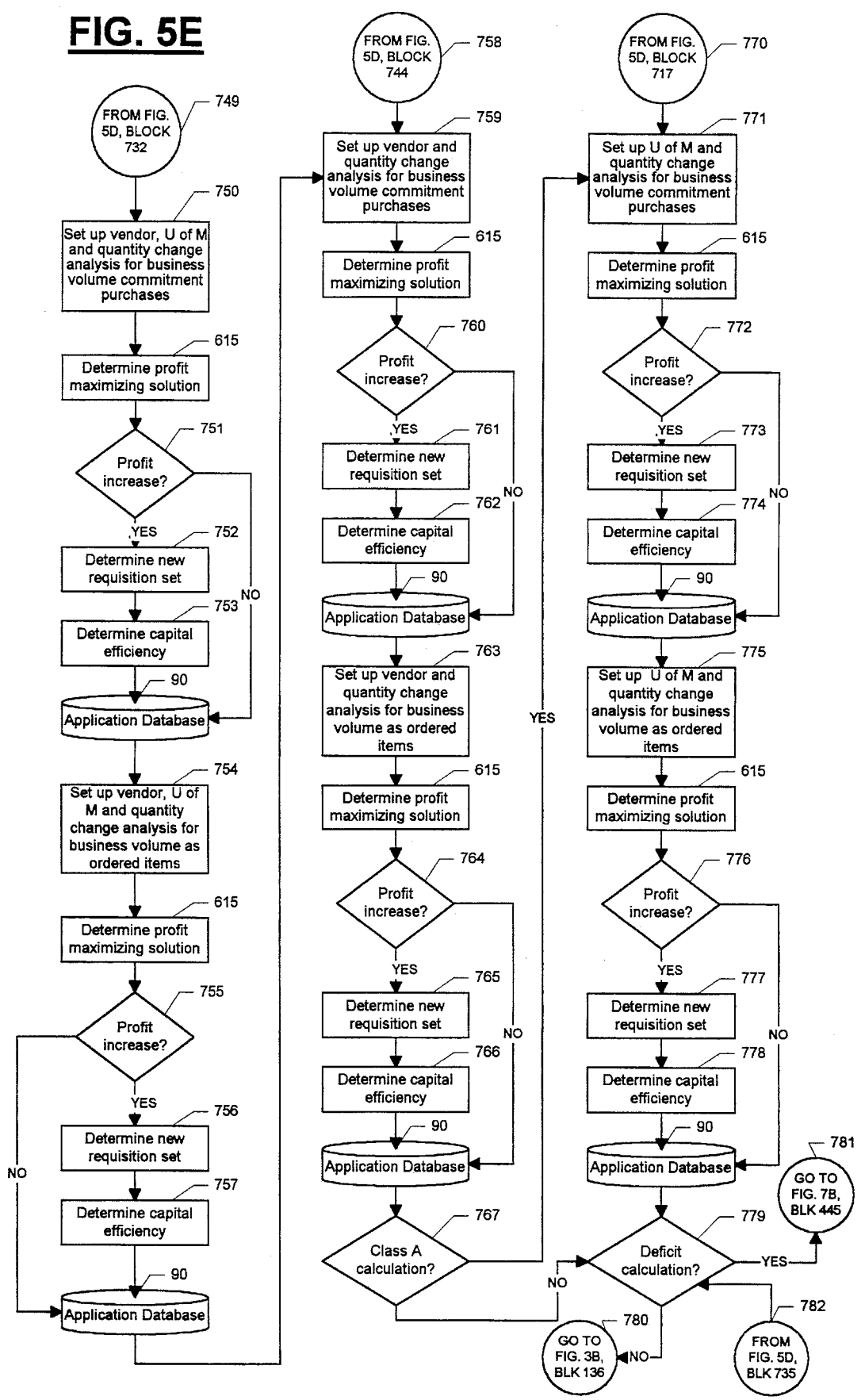

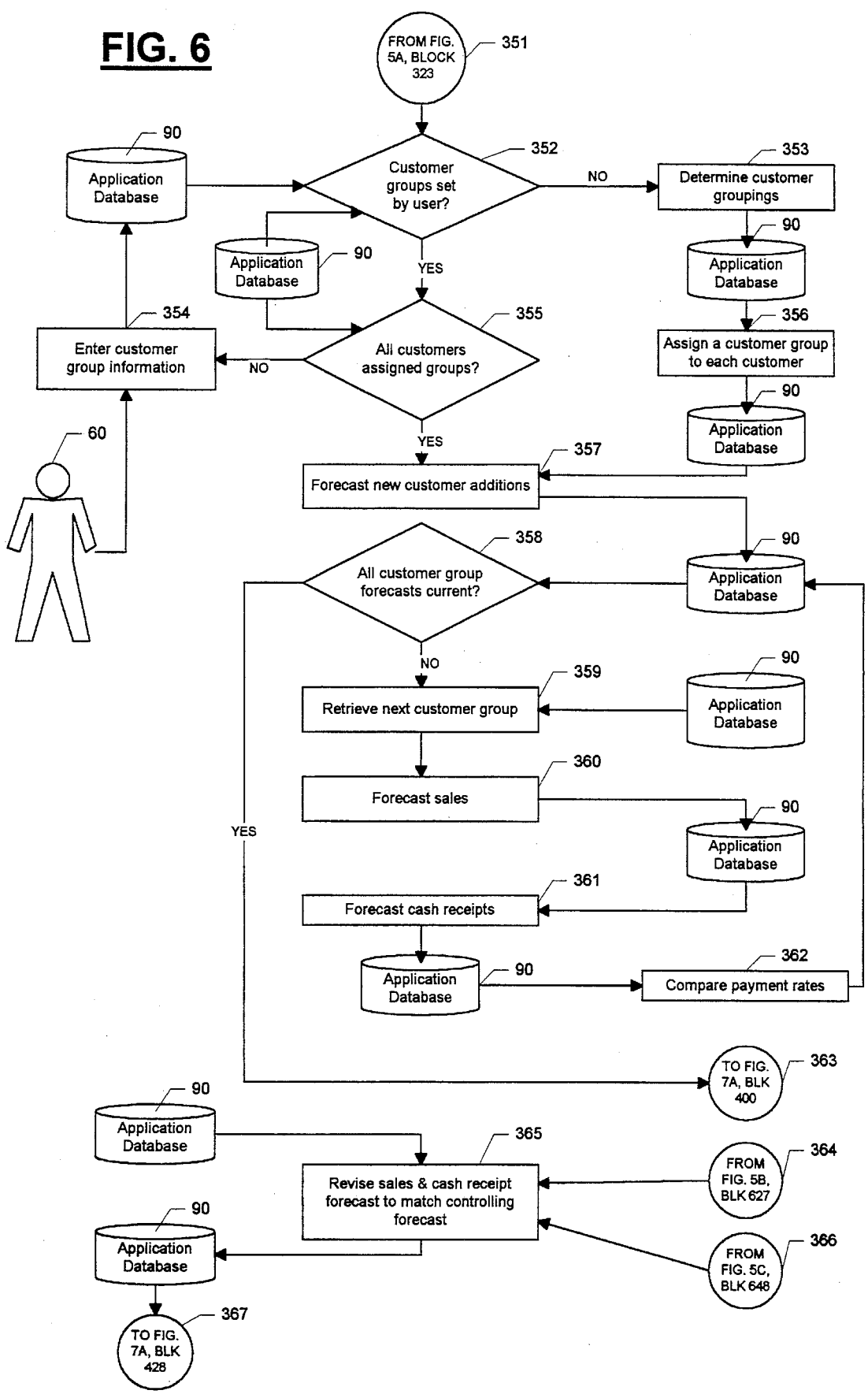

METHOD OF AND SYSTEM FOR GENERATING FEASIBLE, PROFIT MAXIMIZING REQUISITION SETS

BACKGROUND OF THE INVENTION

This invention relates to a method of and system for enhanced inventory management, more particularly, to a system that creates detailed forecasts of sales before generating profit maximizing sets of requisitions and/or manufacturing work-orders that maintain finished goods inventory at the levels required to maintain user-specified service standards, while satisfying the financial constraints forecast by the system and user specified constraints, during the next 1 to 78 time periods.

The effective control of inventory is one of the more difficult problems faced by businesses today. The high cost of capital and storage space combined with the high risk of obsolescence, created by the ever accelerating pace of change in today's economy, drives companies to minimize their investment in inventory. At the same time, unprecedented growth in the number and variety of products, intense global competition and increasing demands for immediate delivery can force companies to increase their inventory investments. Balancing these two conflicting demands while effectively and efficiently considering the different price schedules, volume discounts, quality and lead time options that different vendors and different in-house manufacturing resources offer is a very complex task. The complexity of this task has increased geometrically in recent years.

One of the major causes of this increase in complexity is the unprecedented increase in the number and variety of products in almost every product market from "apparel and toys to power tools and computers."[1] For example, "the number of new product introductions in the U.S. food industry has exploded in recent years from 2,000 in 1980 to 18,000 in 1991."[2] Because the level of total sales to customers has not increased at a level that even remotely approaches the rate at which the number of products has increased, virtually every commercial enterprise selling products, most notably manufacturers, distributors and retailers, has experienced a significant increase in the number of inventory items that must be managed. Complicating matters even further, the increase in the rate of new product introductions has been matched by a corresponding increase in the rate at which old products are discontinued or replaced by new products. This increasing risk of product obsolescence has increased the financial risk associated with inventory management as discontinued products generally have drastically lower market values. Businesses that are left holding products that have been discontinued or replaced are generally forced to take severe markdowns and/or make inventory write-offs that can seriously diminish or even eliminate their working capital.

1. Marshall Fisher, Janice Hammond, Walter Obermeyer, Ananth Raman, "Making Supply Meet Demand in an Uncertain World", Harvard Business Review, May-June 1994, page 83.
2. ibid, page 86.

The difficulties described above are being exacerbated by the increase in complexity caused by vendors that have introduced a variety of new discount schedules and incentives. Traditional purchasing incentives were associated with offering lower prices for larger purchases of a single item. These item-quantity discounts are still widely used by vendors in a variety of industries. New discount options have been created in an effort to enhance the frequency of repeat business by rewarding customers with discounts based on their total level of business during some time period, usually a year, rather than basing discounts solely on the basis of the quantities from a single order as they had done in the past. These business-volume discounts typically offer two different types of discount schedules to the customer. The first being a discount schedule based on the dollar volume purchased during a specified time period. This type of discount schedule is commonly known as an as-ordered discount schedule. Under this type of discount schedule the level of discount rises as the total as-ordered volume increases. An example of this type of discount schedule is shown in Table 1.

TABLE 1

| As-Ordered Discount Schedule | Vendor A | Vendor B |
| --- | --- | --- |
| $0–$20,000 | 0 | 0 |
| $20,001–$50,000 | 0 | 5% |
| over $50,000 | 2% | 6% |

The second type of business-volume discount schedule is typically based on the customer's commitment to purchase a specified volume of a product during a specified time period. The commitment-basis discount schedules typically come in two segments. First, the customer is given a different base price schedule for items purchased when a commitment to buy a certain quantity of the item has been made. The base prices on the commitment-basis price schedule often contain discounts from the as-ordered base prices as shown in Table 2.

TABLE 2

| Vendor-Product | Commitment Base Price | As-Ordered Base Price |
| --- | --- | --- |
| Vendor A - Widget | $20.00 | $21.00 |
| Vendor A - Carton | $5.00 | $5.00 |
| Vendor B - Widget | $20.50 | $22.00 |
| Vendor B - Carton | $4.50 | $5.00 |

Once the customer has purchased a certain amount on a commitment basis, all subsequent orders for that item during the relevant time period will be priced at the commitment price and the customer is said to have "locked in" the commitment price. The second element of the commitment-basis discount is typically a percentage discount based on the cumulative total of commitment purchases made during the relevant time period. An example of this type of commitment-basis discount schedule is shown in Table 3.

TABLE 3

| Commitment Discount Schedule | Vendor A | Vendor B |
| --- | --- | --- |
| $0–$10,000 | 0 | 0 |
| $10,001–$25,000 | 1% | 2% |
| $25,001–$50,000 | 2% | 4% |
| $50,001–$100,000 | 3% | 6% |
| over $100,000 | 5% | 8% |

In this environment a customer would have four different possible prices for the purchase of five hundred (500) widgets from the two different business volume discount vendors as shown in Table 4.

TABLE 4

|  | Vendor A | Vendor B |
|---|---|---|
| Year to date actual as-ordered volume - total | $7,012 | $19,553 |
| Current as-ordered discount percentage | 0% | 0% |
| Widget commitment price locked in? | YES | NO |
| Widget base price as-ordered | $20.00 | $22.00 |
| Cost for 500 widgets - as-ordered | $10,000 | $10,472 |
| Year to date actual committed purchases - total | $28,119 | $67,328 |
| Current commitment-basis discount percentage | 2% | 6% |
| Widget commitment-basis price | $20.00 | $20.50 |
| Cost for 500 widgets - commitment-basis | $9,800 | $9,635 |

It is clear from the preceding example that the business volume discount schedules can severely complicate a purchase order decision. In the example shown above the lowest cost alternative for the company is to order from Vendor B on a commitment basis. Thus we see that a customer would have to evaluate the quantity commitments to two vendors, closely monitor the year to date volume for each vendor and evaluate up to four different prices from the two different vendors before placing a single order for a single item. It is also clear from the preceding example that the task of consistently determining the best purchase options for even a small commercial enterprise stocking only a few hundred items can be a daunting task. It is important to note here that the level of complexity shown in this example has been simplified as it ignores the complications that would be introduced by considering different units of measure from the different vendors.

Because of the complexity and risk associated with the inventory management task, it is not uncommon for companies to have several personnel in an operations or purchasing department dedicated to planning, purchasing and controlling inventory investments. In performing their various job functions the operations/purchasing personnel in larger companies typically utilize several different computer based systems for: forecasting demand, planning purchase orders or manufacturing work orders, monitoring the quality and quantity of the items received in the warehouse, tracking returned goods, placing purchase orders, controlling inventory, monitoring costs and entering sales orders. In smaller companies the management of inventory is often accomplished through the use of informal and paper based systems. In some cases the informal systems and the larger "formal" systems are supplemented by microcomputer based spreadsheet programs. In all cases, the goal of the operations/purchasing department is to have the required items in inventory available for sale when the customer orders the product while keeping the investment in inventory as low as possible.

Because inventory is typically the largest component of working capital for companies in the retail, manufacturing and distribution industries, the importance of efficiently managing inventory can not be overemphasized. The significance of effective inventory management practices is particularly high for the small companies that comprise the fastest growing segment of the modern American economy. These small firms typically don't have the working capital required to withstand large mistakes in inventory management. Compelling evidence of the importance of effective inventory management practices is found in the *Dun & Bradstreet Business Failure Record* that shows inventory investment problems are one of the leading causes of business failure for retail, manufacturing and distribution companies. It is clear from the preceding discussion that a system that helps companies effectively manage inventory could enhance both the short-term financial results and the long-term survival prospects of many companies.

PRIOR ART

To help address some aspects of the complex inventory management problem, inventors have previously created systems for determining the most cost effective method for procuring items under idealized conditions. U.S. Pat. No. 5,224,034 to Katz and Sedrian (1993) discloses an automated system for generating procurement lists that uses linear programming optimization algorithms to generate lists showing the annual volume of each product that is to be purchased from each of the different vendors offering business volume discounts to minimize the cost of acquiring the user specified annual volume. There are several drawbacks and limitations inherent in a system of this type including:

(a) Constantly changing business conditions require that all item forecasts be updated frequently and accurately if the system is to provide truly useful output. Because the system is highly specialized, completing these data inputs requires the error-prone, time consuming and costly conversion of data to the format required by the separate inventory optimization system;

(b) After completing the conversion of data to the system required format, the user is then faced with the costly and time consuming task of re-keying or transferring the data into the separate system;

(c) The specialized, technical nature of the system generally requires the use of a highly-skilled, trained operator to run the systems effectively;

(d) The outputs from the system need to be transferred into the purchasing and/or accounting systems before they can be fully utilized. This transfer often entails the error-prone, time consuming and costly conversion and re-keying of data;

(e) The system has no provision for assuring that the company using the system will have the financial resources required to acquire the items identified on the procurement lists. It does little good to optimize plans for committed and as-ordered purchases if the company will not have sufficient funds to pay for the items ordered when the bills come due;

(f) The determination of optimized inventory purchases is implicitly viewed as an exercise that is separate from the determination of financial constraints (if any) when in fact the two are tightly interrelated. The resources that a company will have available for making future purchases is in part dependent on the discounts it has received for the purchases it has previously made. At the same time, the discounts that a company will receive is a function of the size of the purchases that it can afford to commit to and/or make without running short of funds;

(g) The system has no facility for effectively assessing the impact of impending obsolescence on plans for procuring items. The program may recommend an increase in the purchase quantity for an item from a vendor who is expected to introduce a new version in the near future. The new version could render the older versions of the item obsolete and the cost of writing off the obsolete inventory could very easily outweigh the cost savings realized by optimizing the purchase mix and order quantities;

(h) A limitation that is closely related to the shortcoming discussed in item (g) is that the system has no capability for handling planned product obsolescence. For example, even if it is known that a product is to be phased out on a given date and a new product is to take its place, there is no mechanism available to manage the transition;

(i) The system is severely limited in its usefulness as it only optimizes the mix of items purchased under business volume discount regimes. Most companies have more than one type of discount available from their different vendors. Indeed, some vendors offer more than one type of discount. The discount options may include: quantity discounts for individual items, volume discounts based on the total committed volume or volume discounts based on the total ordered volume or some combination of the two or on purchases of specific product mixes or product combinations. As a result, companies that were seeking to optimize the purchase of all of their products would be forced to incur the time, effort and expense required to install and maintain multiple inventory optimization systems;

(j) The system only minimizes the cost of purchasing items forecast by the user under the user-defined constraints. In some cases the user-defined constraints impose artificial limitations on the solutions developed by the system. Limiting the system to purchase only the commitment levels and quantities forecast by the user is an artificial constraint that generally has no basis in reality. In reality, the suppliers (internal or external) can probably provide whatever quantities the user chooses to order and can afford to pay for. In some cases ordering more than the forecast requirements can produce significant savings. As shown in the following example, committing $10 more than permitted under the user specified constraints to a specific vendor would increase pre-tax profitability by $40,000:

| Committed $ Volume | Discount % |
|---|---|
| $0 to $999,999 | 0 |
| $1 M to $1,999,999 | 2 |
| $2 M to 2,999,999 | 4 |

Total 12 month $ Volume Forecast Vendor A=$2,499,987.50

Maximum percentage of forecast volume that can be committed=80%

Vendor A Dollar Commitment=$1,999,990.00

Increase in discount percentage from increasing commitment by $10=2%

Savings from increased discount=$2,000,000×2%=$40,000

This enormous potential profit would not be highlighted to the user by a system that simply minimized costs within the constraints established by the user. Clearly, a system that isn't artificially restricted to solutions that include the forecast item demand limitations can provide substantial benefits to the user;

(k) The system only minimizes costs and doesn't maximize the profitability of the firm using the system. The primary goal of most firms is not to minimize costs rather it is to realize as large a profit as possible. The example shown below illustrates how significant this change in focus can be when combined with the removal of the artificial constraints discussed in item (j). Consider a profit maximization model with three products and three resources. A traditional linear programming model for the specific situation would be:

Maximize profit: $p=80x_1+32x_2+57.6x_3$

Subject to:

$6.4x_1+4.82x_2+3.84x_3 \leq 1,280$ (resource 1)

$3.2x_1+4.8x_2+6.4x_3 \leq 1,600$ (resource 2)

$3.2x_1+3.2x_2+3.2x_3 \leq 960$ (resource 3)

$x_1, x_2, x_3 \geq 0$

Using the simplex method, the optimal solution is reached at $x_1$=228.576, $x_2$=0.0, $x_3$=685.728 and p=$57,784.01. If the prices of the resources were $s_1$=$20, $s_2$32 $10 and $s_3$=$40 we can use the above constraints to determine the maximum amount that can be purchased: 1,280($20)+1,600($10)+960($40)=$80,000.

If the above problem were changed to the multiple criteria, De-Novo maximization formulation to remove the artificial constraints on purchasing resources, it would appear as shown below:

Maximize profit: $p=80x_1+32x_2+57.6x_3$

Subject to:

$2x_1+1.5x_2+1.2x_3 \leq x_4$ (resource 1)

$x_1+1.5x_2+2x_3 \leq x_5$ (resource 2)

$x_1+x_2+x_3 \leq x_6$ (resource 3)

$20x_1+10x_2+40x_3 \leq 80,000$ (budget)

$x_1, x_2, x_3, x_4, x_5, x_6 \geq 0$

Solving the above yields the following optimal solution: $x_1$=888.896, $x_4$=1,777.792, $x_5$=888.896, $x_6$=888.896 and p=$71,111.68. The optimal solution from this formulation is substantially different from the previous formulation and it has a profit level 23% higher than the one produced by the linear programming model. Clearly, there can be substantial benefits to changing the focus to profit maximization rather than cost minimization while removing constraints that artificially limit the potential solutions;

The next ten (10) shortcomings and limitations of the present system would all contribute to a decision to establish another separate system dedicated to inventory management. This inventory management system would provide the required forecasts, target inventory levels, requisition quantities, requisition dates, stock-out probabilities and projected stock-out costs in a consistent and efficient manner. However, to realize these benefits the user would be required to incur the time, effort and expense associated with setting up and maintaining a separate system for monitoring inventory usage, developing forecasts and managing inventory. The user would also be faced with the costly and time consuming task of re-keying or transferring data into and out of the separate inventory management system.

(l) The system has no simple mechanism for allowing the user to restrict the purchase of an item to a particular vendor. It is not uncommon for a user to have strategic or qualitative reasons for choosing one vendor over another in the purchase of a specific item—even if the price for buying from that vendor is higher. Restricting vendor selection for an item using the system described by Katz & Sedrian would require the user to develop a constraint and enter it into the specialized system before processing begins;

(m) The system has no provision for allowing the user to order items using different units of measure. It is commonplace for a vendor to offer items in different units of measure with different price schedules. If the user wishes to order product using a different unit of measure, then he or she will be forced to go through the costly, time consuming and error-prone effort to convert the procurement lists that have already been created using a different unit of measure. If lower prices are offered for different units of measure that weren't considered, it is entirely possible that the solution developed by the system would not be the lowest cost solution;

(n) The effectiveness of the system in planning the purchases required to keep the proper items stocked in inventory is completely dependent on the demand forecasts developed and input to the system by the user;

(o) The system is limited to planning purchases one year at a time for all business volume items. Because the system doesn't have the ability to analyze shorter or longer forecast time periods, the user will be required to work with another system to address inventory planning needs for any time period other than a year;

(p) The system only determines the annual quantity mix by vendor for the items, the actual dates and order quantities are not determined for any item. The user is required to go through an additional time consuming exercise of determining how large the orders should be and when to place orders;

(q) The system doesn't consider service levels (e.g., fill rate targets where a 95% fill rate is defined to mean that 95% of the total annual demand for an item is supplied by inventory from stock) and demand variability when determining the annual purchase quantities. Ignoring these factors can leave the commercial enterprise using the system vulnerable to inventory stock-outs. Any inventory stock-out would probably cause lost profits for the business when the consumer purchases the item from another supplier that has the item in stock.

The example presented in Tables 5, 6 and 7 illustrates the impact of different levels of item demand variability on the available inventory of two different items with the same total forecast demand, the same average monthly demand and the same fill rate targets.

TABLE 5

| Monthly Demand | Part A | Part B |
| --- | --- | --- |
| Last month | 100 | 55 |
| Two months ago | 100 | 0 |
| Three months ago | 100 | 100 |
| Four months ago | 100 | 20 |
| Five months ago | 100 | 115 |
| Six months ago | 100 | 95 |
| Seven months ago | 100 | 15 |
| Eight months ago | 100 | 0 |

TABLE 5-continued

| Monthly Demand | Part A | Part B |
| --- | --- | --- |
| Nine months ago | 100 | 500 |
| Ten months ago | 100 | 0 |
| Eleven months ago | 100 | 0 |
| Twelve months ago | 100 | 300 |
| Total 12 Month Demand | 1,200 | 1,200 |
| Average Monthly Demand | 100 | 100 |
| Sample Standard Deviation | 0 | 152.5 |

TABLE 6

|  | Part A | Part B |
| --- | --- | --- |
| Lead Time | 2 months | 2 months |
| Available Inventory | 300 units | 300 units |
| Fill Rate - Target % | 95% | 95% |
| Order Cost | $500 | $500 |
| Carrying Cost - Annual % | 12% | 12% |
| Unit Price | $50 | $50 |
| Economic Order Quantity* | 450 | 450 |

*the Economic Order Quantity formula will be detailed later

A system that didn't address the differences caused by the different demand patterns of the two items would use the same re-order level for each item. The re-order level for the parts can be calculated as shown below:

Reorder Level Part A=(100 units/month×2 months lead time)=200

As shown in Table 7, if the same re-order level were used for both items and the demand pattern from the prior year was repeated, then the available inventory during the coming year for these two parts would be quite different.

TABLE 7

| Month | Start Inv Part A | Part A Demand | A Order Receipt | End Inv Part A | Qty A Ordered | Start Inv Par B | Part B Demand | B Order Receipt | End Inv Part B | Qty B Ordered |
| --- | --- | --- | --- | --- | --- | --- | --- | --- | --- | --- |
| 1 | 300 | 100 | 0 | 200 | 450 | 300 | 300 | 0 | 0 | 450 |
| 2 | 200 | 100 | 0 | 100 | 0 | 0 | 0 | 0 | 0 | 0 |
| 3 | 100 | 100 | 450 | 450 | 0 | 0 | 0 | 450 | 450 | 0 |
| 4 | 450 | 100 | 0 | 350 | 0 | 450 | 500 | 0 | −50* | 450 |
| 5 | 350 | 100 | 0 | 250 | 0 | −50* | 0 | 0 | −50* | 0 |
| 6 | 250 | 100 | 0 | 150 | 450 | −50* | 15 | 450 | 385 | 0 |
| 7 | 150 | 100 | 0 | 50 | 0 | 385 | 95 | 0 | 290 | 0 |
| 8 | 50 | 100 | 450 | 400 | 0 | 290 | 115 | 0 | 175 | 450 |
| 9 | 400 | 100 | 0 | 300 | 0 | 175 | 20 | 0 | 155 | 0 |
| 10 | 300 | 100 | 0 | 200 | 450 | 155 | 100 | 450 | 505 | 0 |
| 11 | 200 | 100 | 0 | 100 | 0 | 505 | 0 | 0 | 505 | 0 |
| 12 | 100 | 100 | 450 | 450 | 0 | 505 | 55 | 0 | 450 | 0 |
| Total |  | 1,200 | 1,350 |  | 1,350 |  | 1,200 | 1,350 |  | 1,350 |

*negative inventory represents a back-order

As shown above, if the timing of the purchases of Part B weren't adjusted to build the inventory to a level that was sufficient to absorb the large variability in monthly demand, then the user would experience a two month stock-out and would be subject to the margin loss that typically accompanies a period of prolonged back-order. In this case it is clear that in order to avoid stock outs and lost profits the user would be required to incur the time, effort and expense associated with establishing a separate inventory planning system, re-keying the procurement system data into the new system, analyzing the output of the new inventory management system and manually adjusting the annual procurement quantities produced by the system described by Katz & Sedrian before placing orders;

(r) The usefulness of the system as a management planning tool is severely limited as it has no provision for running different scenarios through the system or for comparing the results of the different scenarios to one another. Any "what if" type analysis would have to be completed using a separate system after re-keying or transferring the output from the inventory management system;

(s) The usefulness of the system for planning within a larger organization is limited by its inability to segregate items by division, department, location or planner. While the determination of the optimal solution for a firm requires looking at total company requirements, the review of the system output and the implementation of the results is often broken down by planner, location, department or division. It may be impossible in some instances to separate recommended orders into different classifications as is the case when the system recommends the purchase of one carton per month to satisfy the demand in 5 locations. However, whenever it is possible to segregate planned purchases or production by department, division or site it is generally beneficial to do so; and (t) The system doesn't provide a mechanism for controlling the amount of margin lost because of stock-outs. This shortcoming is closely related to the one described in item "q". Given the forecast item demand, the variability of the forecast item demand and the size of planned replenishment orders, one skilled in the art of inventory management can calculate the expected size and frequency of stock outs during a given time period. When combined with the margin of the item in question, it is possible to determine the expected margin loss for the given time period. Working backwards from the targeted margin loss, it is possible to determine the order quantities required to achieve a specified margin loss target (the details of this calculation are described later in the narrative). An inventory management system without this feature leaves the user open to unexpected margin loss surprises with potentially devastating effects on financial health and stability.

U.S. Pat. No. 5,237,495 to Morii (1993) discloses a similar production/purchase management system that reads the stock and remaining order information and the user-provided master production schedule and product construction item-master before it generates a prioritized purchase planning order and production planning order indicating the dates for the required item orders and quantities. While the integration in this system is enhanced relative to the system described previously, this system still suffers from virtually all of the limitations and drawbacks identified above (a–n and r–t) and has the additional limitation that it doesn't seek to minimize procurement costs or maximize profitability under any type of discount schedule.

In addition to the systems described above, there are commercially available systems such as Inventory Manager from Manufacturing Management Systems, Inc. and Procurement Management from American Software, Inc. for developing item demand forecasts and for generating purchase order recommendations based on reorder point calculations and/or demand forecasts. In some cases these systems perform both functions, developing item forecasts and generating the requisite order recommendations. U.S. Pat. Nos. 5,128,861 and 5,237,496 to Akiro Kagami et al. (1993) disclose a similar system that is a hybrid, automated reorder point, economic order quantity system for ordering goods based on the system generated forecast of changes in sales. Some commercially available systems with the same inventory management functionality such as the Distribution Management System from Apogee Systems also include their own basic financial system which can help minimize the need for data conversion and re-keying. There are several drawbacks and limitations inherent in systems of this type including:

(a) These systems only determine the requisition dates and quantities required to meet the forecast demand. These systems make no attempt to minimize the cost of purchasing goods under any type of discount schedule;

(b) These systems make no attempt to maximize the profitability of the firm using the system;

(c) These systems have no provision for assuring that the company using the system will have the financial resources required to acquire the items identified for procurement. It does little good to create purchase requisitions if the company won't have sufficient funds to pay for the ordered items when the bills come due;

(d) These systems require the user to assess the impact of impending obsolescence on the plans for procuring all items and provide no mechanism for handling planned product obsolescence in the middle of a forecast time period;

(e) Most of these systems require the user to incur the time and expense associated with creating item demand forecasts using a separate system before undertaking the time-consuming, error prone re-entry of the item demand forecast into the system before calculations can begin;

(f) In those systems that develop item demand forecasts, the forecasts generally need to be reformatted before they can be reviewed in a meaningful manner by managers in the different functional organizations. Because the output from these systems is produced in only a unit volume format, the completed forecasts don't lend themselves to review by other functional organizations. While other functional organizations may be very well versed on revenue trends by product or account, they are typically not familiar with unit volume trends and could thus provide little in the way of meaningful input to any review discussion;

(g) The robustness of the forecasts developed by these systems is questionable. In calculating the forecasts, the systems typically rely on only one or two indicators, unit volume history or unit volume history and time of year, to determine the item demand forecasts. Relying on only these few factors leaves the forecasts extremely vulnerable to skewing by one time events;

(h) These systems require the user to utilize the accounting system that is provided with the inventory planning system in order to realize the benefits of an integrated system. These benefits include reduced time and expense for re-keying data, reduced lag time for adding new data to the distribution planning system and elimination of the costs associated with maintaining two separate systems. However, realizing these benefits requires the user to stop using the accounting system already in place, convert the existing accounting files and databases to the format of the new accounting system and retrain accounting personnel and system operators on the use of the new system. While each of these activities are costly to implement, retraining the existing personnel is often the most costly and time consuming part of the process. It is not uncommon for a system conversion to take several months with the total cost of the conversion effort equaling two or three times the cost of the purchased software; and (i) These systems don't generally consider margin loss targets when determining the annual purchase quantities.

Another major drawback of all previously described systems is one that is inherent in having any separate system for determining requisition requirements, namely, that the forecasts and plans contained in the separate system can easily diverge from the forecasts and plans contained in other functional systems that support the operation of the company. Thus, it is possible for the requisition/inventory system to have a forecast or plan for the near future that is substantially different from the near-term forecast or plan being used by the sales organization. The plans from both organizations could in turn be different from the near-term forecast or plan being used by the finance organization.

These differences between the separate plans and systems can arise all too easily because coordinating the activities of the functional organizations within a company to ensure that sales is selling what operations is planning to buy or make with the money that finance says will be available can be an expensive and time consuming task for general managers in companies of any size in virtually all industries. At the same time, the importance of achieving alignment can not be over emphasized. In the recent book *Built to Last* which analyzed the successful habits of visionary companies over the last 80 years, the authors James Collins and Jerry Porras concluded that one of the most significant findings of their study was the importance of organizational alignment to long term success. A related finding was that virtually all companies underestimated the difficulty of achieving and maintaining alignment. For many corporations, the expense and difficulty associated with aligning the plans and activities of different functional organizations in detail is such that it is only attempted once a year during the annual budget setting exercise. Unfortunately, even after spending the time and effort required to coordinate the activities of the different functional organizations, the gap between the forecasts and plans contained within each organization's separate functional system may not have been eliminated.

One of the primary difficulties associated with synchronizing the different functional organizations within a company is reconciling the perspectives that each group has on the past, present and the future. The simplified listing of the typical focus for each functional organization that is shown in Table 8 gives an indication as to why this synchronization might be so difficult:

TABLE 8

| Functional Organization | Focus |
|---|---|
| Sales | Customers |
| | Unit Volume Sold |
| | Unit Proces |
| Operations | Unit Costs |
| | Inventory |
| | Efficiency |
| | Productivity |
| Finance | Profitability |
| | Cash Flow |
| | Return on Assets |

The lack of overlap between the primary concerns of the functional organizations is often exacerbated by the use of different terminology and/or units of measure for describing areas of common interest. For example, operations may be focused on how many truck loads of product are shipped while sales is interested in how many cases of product are being sold. Viewed in this light, the difficulty described previously can be seen as a problem of establishing a common language as the basis for discussions and analyses with further complications associated with coming to an agreement as to the interpretation of the data being analyzed.

For most companies, the "common language" that can be shared most readily by all groups is a financial one. This is not surprising since everyone in every group has some experience dealing in the local currency and can readily relate to discussions on this basis. From the preceding discussion, it would be logical to conclude that the most effective system for synchronizing the plans of all groups would be a financial planning system. However, the limitations of existing financial planning software systems render this option impractical and ineffective.

Financial Planning Systems

Financial planning software systems are a subset of corporate financial software systems. Corporate financial software systems are generally divided into two categories, basic and advanced. Advanced financial systems utilize information from the basic financial systems to perform financial analysis, financial planning and financial reporting functions. Every commercial enterprise uses some type of basic financial system as they are required to maintain books and records for income tax purposes. An increasingly large percentage of these basic financial systems are resident in microcomputer and workstation systems. Basic financial systems include general-ledger accounting systems with associated accounts receivable, accounts payable, inventory, invoicing, payroll and purchasing subsystems. These systems incorporate worksheets, files, tables and databases. These databases, tables and files contain information about the company operations and its related accounting transactions.

General ledger accounting systems generally store only valid accounting transactions. As is well known, valid accounting transactions consist of a debit component and a credit component where the absolute value of the debit component is equal to the absolute value of the credit component. The debits and the credits are posted to the separate accounts maintained within the accounting system. Every basic accounting system has several different types of accounts. The effect that the posted debits and credits have on the different accounts depends on the account type as shown in Table 9.

TABLE 9

| Account Type: | Debit Impact: | Credit Impact: |
|---|---|---|
| Asset | Increase value | Decrease value |
| Revenue | Decrease value | Increase value |
| Expense | Increase value | Decrease value |
| Liability | Decrease value | Increase value |
| Equity | Decrease value | Increase value |

General ledger accounting systems also require that the relationship shown below is maintained at all times:

Asset account balances=Liability account balances+Equity account balances

The general ledger system generally maintains summary, dollar only transaction histories and balances for all accounts while the associated subsystems, accounts payable, accounts receivable, inventory, invoicing, payroll and purchasing, maintain more detailed historical transaction data and balances for their respective accounts. It is common practice for the subsystems to maintain the detailed information shown in Table 10 for each transaction.

TABLE 10

| Subsystem | Detailed Information |
| --- | --- |
| Accounts Payable | Vendor, Item(s), Transaction Date, Amount Owed, Due Date |
| Accounts Receivable | Customer, Transaction Date, Amount Due, Terms, Due Date |
| Inventory | Item, Transaction Date, Transaction Type, Transaction Qty, Location |
| Invoicing | Customer, Transaction Date, Item(s) Sold, Amount Due, Due Date |
| Payroll | Employee, Employee Type, Pay Frequency, Pay Rate |
| Purchasing | Vender, Item(s), Purchase Quantity, Purchase Price(s), Due Date |

As is well known, the output from a general ledger system includes income statements, balance sheets and cash flow statements in well defined formats which assist management in measuring the firm's financial performance during the prior periods when data input has been completed.

Financial planning systems generally use the same format used by basic financial systems in forecasting income statements, balance sheets and cash flow statements for future periods. Management uses the output from financial planning systems to highlight future financial difficulties with a lead time sufficient to permit effective corrective action and to identify problems in company operations that may be reducing profitability below desired levels. For the reasons discussed in more detail below, financial planning systems are typically found only in larger corporations. These systems are most often developed by individuals within companies using 2 and 3 dimensional spreadsheets such as Lotus 1-2-3®, Microsoft Excel® and Quattro Pro®. The information from basic financial systems can be entered into these systems either by manually re-keying the appropriate data into the appropriate cells or by connecting the spreadsheets to the basic financial system database or files and importing the data to the appropriate cells within the spreadsheet. The imported data often have to be reorganized before it can be fully utilized after it has been entered into the spreadsheet.

These spreadsheet programs contain preprogrammed mathematical functions which the user can use to develop formulas for forecasting future values for any or all of the accounts required to develop the desired forecast. The use of the preprogrammed functions requires the user to select the most appropriate forecasting technique for the item being forecast. Alternatively, this facet of the operation of the spreadsheet programs can be supplemented through the use of commercially available forecast creation packages such as Forecast Pro, SmartForecasts and the Modler MBA Business Analysis Program that will analyze the data and select the most appropriate forecasting technique before generating a forecast. Using these packages for forecast calculation requires the user to import or re-key the relevant data before the forecast algorithm can be selected and the forecast calculated. In some cases, the completed forecasts must be exported or re-keyed into the appropriate cells in the spreadsheet before they can be used.

The use of spreadsheet programs for financial planning also requires the user to develop complex mathematical models in order to generate meaningful forecasts. This requirement is one of the primary factors that restricts the use of these programs for financial planning to larger companies that can afford the time and the specialized manpower required to develop the models and create the forecasts. The basic function of these spreadsheets is often supplemented by the creation of 'macros' which are strings of command sequences that are stored for playback when the operation needs to be run again. While the use of 'macros' may be helpful to the individual completing the forecast, the usefulness of the forecast spreadsheet may be limited by the user's tailoring of the output to fit his or her personal needs at the time. Furthermore, because these 'macros' are often undocumented they can be very difficult to revise should the personnel who created them leave the corporation or should business needs change. The ad-hoc nature of these programs also makes them unsuitable for long term direct connection to the operational systems used to run the company. Spreadsheet programs generally also lack the ability to provide financial controls such as audit trails that are required in advanced financial applications.

Financial planning systems built within an executive information system (EIS) or decision support system (DSS) are alternatives to the spreadsheet based systems. These systems often interface directly with the corporate basic financial system and access the basic financial system transactions and data in a manner that is similar to that used in the present invention. These systems also have the ability to access data from other operational systems that may be used by the corporation. However, these systems are generally not pre-programmed with any specific type of report. As a result, the user must undertake an expensive and time consuming effort to design and program the system to monitor the company's financial situation in a manner that will be beneficial. The specialized nature of these systems often dictates that the user engage specialized personnel to develop the required models and programs.

In completing the programming effort, the EIS or DSS based financial planning software developer would face difficulties similar to those experienced by the spreadsheet programmer discussed previously:

1. The developer must select the most appropriate forecasting techniques to use in creating the forecasts;

2. The developer would be required to develop complex models for projecting the user's financial status in future periods; and 3. The developer would in all likelihood be required to reorganize the data obtained from the basic financial system or other operational system before using it to create forecasts or complete financial forecasts.

Once the financial planning models are developed and the system is producing financial forecasts and reports, the usefulness of the information provided is limited. EIS and DSS function as early warning systems, management report generators and query tools and not operational systems. These systems are similar to the spreadsheet financial planning systems in that the undocumented nature of the software generating the specific reports can make changing the programmed models difficult. These financial planning systems also have no mechanism for aligning the calculated forecast with the forecasts in other functional systems. Furthermore, because there is generally no direct interface available to feed information of any type from the financial planning system to an accounting or operational system, the user must undertake the time-consuming, error-prone and expensive step of manually re-entering any relevant financial planning system information in order to use it for processing. Alternatively, the user can take the costly step of developing an interface between the EIS/DSS financial planning subsystem and other systems.

The limited capability of these financial planning systems combined with the enormous time and expense required to develop and maintain these systems effectively limits their use to larger companies and makes it difficult to use these systems as the basis for synchronizing the forecasts used by the different functional organizations within a commercial enterprise.

A method for overcoming the shortcomings with existing inventory management systems that were identified above involves combining an enhanced system and method for inventory planning together with an advanced system and method for financial planning. This innovative system begins by creating multi-dimensional forecasts of sales and cash receipts. The system uses data from existing basic financial systems together with limited user input as the basis for the forecasts. The different sales and cash receipt forecasts are then synchronized by the system with the aid of a novel variable that also helps minimize investments in obsolete inventory. After the composite forecast is completed, the base-level requisitions (profit maximizing requisition set under existing constraints) are generated for all forecast items having item quantity and business-volume discount schedules. Requisitions for items with no discount schedule or mixed discount schedules are also created at the same time. The system then develops a detailed financial forecast for use in determining if there are sufficient funds to pay for the base-level requisitions. After the system determines that the commercial enterprise can pay for the base-level requisitions while keeping the available capital above the user specified minimum level during the forecast time period, the system then creates a listing of potential changes to the base-level requisitions that can increase profitability. The application software of the present invention then creates a display of the list of changes for the user. The user then has the option of accepting or rejecting the proposed changes. When the user's review of the proposed changes is complete, the previously calculated base-level requisitions and financial forecasts are changed to reflect the impact of the accepted changes. There are no known prior attempts to:

1. Produce, store and display multivalent forecasts of sales and cash receipts for use by an integrated inventory management, requisition preparation, and financial planning system where the forecasts are created by transforming transaction data and information from standard financial software systems into forecasts of sales by item, sales by customer group and sales by account as well as forecasts of cash receipts by customer group and by account; or to 2. Develop a composite forecasts of sales and cash receipts using the multivalent combination of previously created sales and cash receipt forecasts for possible use as the controlling forecasts for forecast synchronization; or to 3. Calculate and store a unique variable for each forecast element in order to provide an efficient and effective mechanism for synchronizing forecasts that have been created on more than one dimension (i.e., sales by item, customer group and account) with a controlling forecast and facilitate obsolescence risk management for individual items; or to 4. Determine the profit maximizing requisition set (base-level requisitions) for any mixture of items with business volume and item quantity discount schedules that satisfy forecast demand while meeting the item fill-rate or item margin-loss targets specified by the user; or to 5. Create and display a detailed financial forecast for a commercial enterprise highlighting any deficiencies in available capital that affect the ability of the enterprise to acquire the base-level requisitions. This financial forecast is created by combining the previously calculated sales forecasts, cash receipt forecasts and base-level requisitions with multivalent balance sheet and expense account forecasts. The balance sheet and expense account forecasts are created by using transaction data and information from standard financial software systems together with prior forecasts as the basis for calculation; or to 6. Calculate, prioritize and display a listing of profit enhancing changes to the base-level requisitions that are feasible within the forecast financial constraints of the commercial enterprise using the system after relaxing some of the user defined constraints; or to 7. Accept user deletions to the listing of profit enhancing changes, display a financial forecast that reflects the impact of the accepted changes and then modify the base-level requisition after user acceptance of the modified financial forecast.

SUMMARY OF THE INVENTION

It is a general object of the present invention to provide an innovative and useful inventory management system that creates and displays a prioritized list of profit-enhancing changes to base-level requisitions that are feasible within the projected financial constraints of the company that eliminates the limitations and drawbacks of the prior art that are described above.

The above and other objects of the present invention will become apparent from the narrative in the present specification and the accompanying drawings.

A preferable object to which the present invention is applied is inventory management for a small commercial enterprise that can not afford to purchase, support and maintain a separate, specialized system for inventory management or expend the time and effort required to convert its accounting system to one tied to a distribution planning system with limited functionality. A large portion of the specialized manpower and effort required to support and maintain separate systems is eliminated in accordance with the present invention by using the information in the databases, tables, and files of the existing computer-based corporate financial software systems as the source for the transaction data and product parameters required to operate the system. In accordance with the invention, the use of transactions from existing computer-based, basic financial systems eliminates the need for a highly-skilled, specialized operator to complete the costly and time consuming preparation, conversion and re-keying of data. It has the added benefit of eliminating the need to replace the existing accounting system. The application software of the present invention preferentially loads the application database by copying the transaction and item data from a basic financial system database to the application database using the mapping criteria and data dictionary information input by the user. The present invention also has a provision for entering information manually and for reading the data from computer files.

The present invention further eliminates time consuming and expensive effort for the user by using the transaction records from a basic financial system together with minimal user input to develop the required forecasts for the chosen time period. More specifically, the system develops forecasts for the user-specified time period of sales by product, sales by customer type, sales by account number, cash receipts by customer type, cash receipts by account number, debits by account number, credits by account number, inventory by item and account balances by period. All forecasts can be segregated by site, division or department as required for more effective review. Item forecasts can also be segregated by planner. The system also incorporates the full functionality of an advanced financial system for financial planning which is used to create detailed income statement, balance sheet and cash flow forecasts for future periods. System performance is further enhanced by the inclusion of scenario control logic that allows the user to store and compare current forecasts to prior forecasts that have been developed with the use of this system.

The sales forecasts developed in accordance with the present invention are substantially more robust than the forecasts generated by existing inventory management systems as they are based on a multivalent forecasts of customer group buying patterns, sales account trends and product volume histories. Another advantage of the method and system of the present invention that is described in more detail below is that the system prepares matching sales forecasts using a customer basis, a unit-volume basis and a general ledger account basis. The resulting forecasts can be easily reviewed by the three major functional groups within any company: sales, operations and finance.

When calculating the required sales forecasts, the system also completes the novel and useful calculation and storage of a TVO (Trend, Variability and Obsolescence) variable for each forecast element. The TVO variable provides a superior method for synchronizing the different functional group forecasts by prioritizing the selection of the items that will have their forecast quantities preferentially increased or decreased as required to match the controlling forecast specified by the user. Furthermore, in the present invention the TVO variable provides the user with an effective, low-cost mechanism for systematically preventing the build-up of inventory stock for items that are thought to be nearing obsolescence. The system has additional capabilities for handling the obsolescence of individual items by allowing the user to designate successor items for purchase after a specified date. The specified date is used as both the start date for sale of the new, successor item and the date when inventory balance of the predecessor item should reach a zero balance.

After using the TVO variables in synchronizing the sales and cash receipt forecasts with the controlling forecast in accordance with the present invention, the system analyzes the impact of the previously calculated item demand and demand variability (V in TVO) in setting a target inventory level for each item that will produce the user specified fill rate. Alternatively, the user can specify the amount of gross margin loss that is acceptable for an item during the forecast time period. The system will then calculate, display, store and utilize the corresponding fill rate target for the item to achieve the target level of margin loss. This aspect of the present invention can greatly reduce both the number and the severity of stockouts that the company using the system experiences. The reduction in stockouts will in turn increase the satisfaction level of the customers while reducing profit loss caused by lost sales. After completing the target inventory level calculations, the system calculates the base-level requisition set that will generate the largest profit for the commercial enterprise while maintaining the target inventory levels for the individual items. The system calculates the base-level requisitions for the user's entire range of items even if more than one type of discount schedule is used. The system will determine the base-level requisitions for a collection of items with a mix of item and business volume discount schedules. This feature of the present invention provides the user with tremendous time and cost savings when compared to existing systems by using one system for optimizing all of the company's inventory purchases instead of requiring the use of two or more systems.

In accordance with the present invention, further significant advantages are realized through the use of user-input variables to designate whether or not the system should consider vendor substitution and unit of measure substitution globally and at the item level as part of an optimization calculation. As discussed previously, there are often overriding concerns that lead a company to buy from a particular vendor or in a specific unit of measure even when the resulting item unit price is higher than that of an alternative. In the present invention, the user of the system only has to click a radio button with his mouse to change the Vendor Change Permitted or Unit of Measure Change Permitted variables for the entire forecast or for a single item from yes to no. Implementing this change in existing business volume discount optimization systems requires reprogramming the constraints—a time consuming and difficult task.

Following the computation of the base-level requisitions, the system completes the financial forecast for the specified time period and determines whether or not the company will have sufficient cash and available credit (hereinafter referred to as available capital) to pay for the base-level requisitions in all future time periods. If the available capital is not above the user specified minimum level in all forecast time periods, then system processing will not proceed to the profit maximization step. The user can bring the available capital above the minimum level by modifying the original input parameters, the individual item sales forecasts or the individual item fill-rate or margin-loss targets before rerunning the forecast.

Once the available capital is above the minimum level in every forecast time period, the user is given the option of modifying the previous calculations and input or accepting the base-level financial forecast as is. System processing advances to the profit maximization step only after the user accepts the financial forecast. These features of the system and method of the present invention assures the user that the forecast financial situation is acceptable and that the forecast financial situation will provide the means to pay for the items planned for purchase before the requisitions are finalized and orders are placed. The user realizes enormous benefits by avoiding the time-consuming, embarrassing and potentially expensive exercise of canceling or delaying orders that have already been placed. Because it would not be unusual for vendors receiving late payments to stop shipments and/or cut off credit, these features have the further advantage of protecting the user's credit history and the user's ability to obtain credit from other vendors in the future.

After the base level forecast has been accepted by the user, the present invention provides the user with additional benefits by generating and displaying a prioritized listing of profit enhancing changes to requisition quantities, vendors and units of measure that are feasible within the forecast financial constraints of the company using the system after some of the user specified constraints are removed. The listed changes are prioritized for display in accordance with the ratio of profit increase to the required capital investment. The user can accept or reject the individual changes that have been recommended by the system as desired. This aspect of the present invention benefits the user by recommending changes to base-level requisitions that directly improve the profitability of the firm. It also benefits the user by clearly quantifying the cost of maintaining certain inventory management and purchasing policies and by giving the user the chance to easily modify the practices as desired to increase profitability.

The present invention provides the user with a fully integrated inventory management system that utilizes minimal user input and data from existing corporate financial software systems to produce accurate multi-dimensional forecasts useful for integrated inventory and financial planning; establish the target inventory levels that will maintain user specified fill rate or margin loss targets given the previously developed demand forecasts; minimize the financial risk associated with inventory obsolescence by calculating, storing and using a unique variable for adjusting forecast quantities and by providing for the planned transition from one product to another; determine the lowest cost set of requisitions that maintain the target inventory levels for products with any mix of item and business volume discount schedules; calculate and display the forecast financial position of the commercial enterprise using the system while highlighting any deficiency in the funds required to pay for the purchase of the lowest cost set of requisitions during the forecast time period; calculate, prioritize and display a list of profit enhancing changes to the lowest cost requisition set that are feasible within the forecast financial constraints, accept user modifications to the listing, display a financial forecast to the user that reflects the impact of the accepted changes and then modify the base-level requisition after user acceptance of the modified financial forecast.

BRIEF DESCRIPTION OF DRAWINGS

These and other objects, features and advantages of the present invention will be more readily apparent from the following description of the preferred embodiment of the invention in which:

FIG. 5D and FIG. 5E are flow diagrams showing the sequence of steps required to generate the list of profit enhancing changes to the base-level requisitions within the constraints imposed by the forecast financial situation of the commercial enterprise using the system after relaxing some or all of the user defined constraints on vendor and/or unit of measure substitution in the inventory replenishment subsystem;

FIG. 6 is a flow diagram showing the sequence of the steps in the customer payment analysis subsystem for forecasting sales by customer group, forecasting cash receipts by customer group and calculating the customer group TVO variables used for determining the magnitude of customer group forecast adjustments during forecast synchronization.

DETAILED DESCRIPTION OF THE PREFERRED EMBODIMENT

Figure 1:
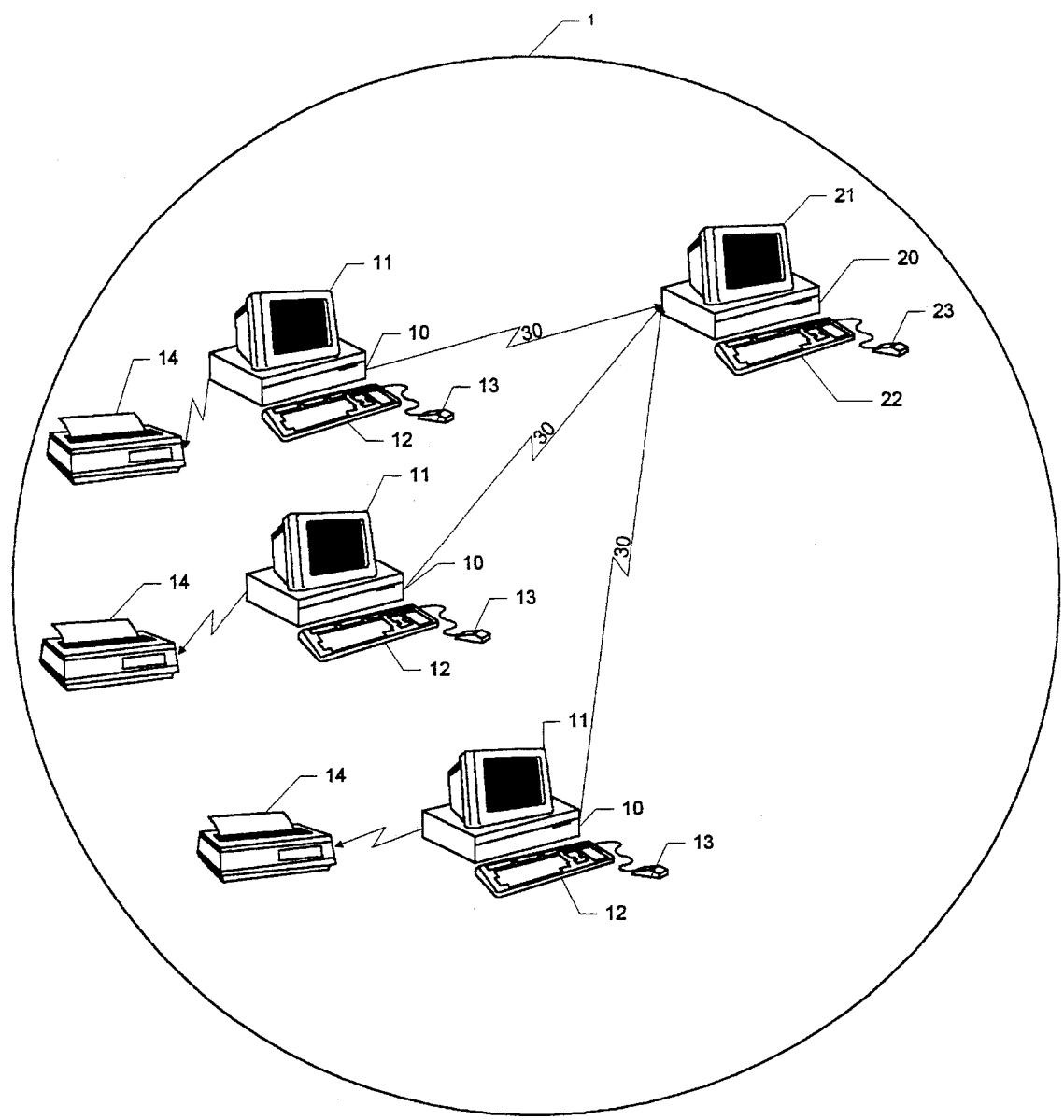
FIG. 1 is an overview of an illustrative computer system used in the practice of the present invention.

The detailed description of the present invention will start with an overview of the functionality of the computer based automated system and the processing, storage and display of information completed by the automated system together with the processing and storage of information completed by the associated software subsystems that comprise the automated system. This overview will help put the detailed description in clear perspective while providing an opportunity to introduce concepts and examples that will facilitate the illustration of various aspects of the present invention. The overview will be followed by a description of the flow diagrams illustrative of a preferred embodiment of the present invention that will complete the detailed description.

Processing in the present invention starts with the acceptance and storage of user input that defines the type of forecast that is to be calculated. Other inputs provided by the user at the beginning of operation are shown in table 11.

Table 11

1. The time period used for forecast calculations (weeks or months)
2. The number of forecast time periods (maximum 78 weeks or 18 months)
3. The number of time periods for which requisitions will be calculated (the maximum is equal to the number of forecast time periods)
4. The source for transaction data: user-input, computer files or a basic financial system database
5. The source for item forecast historical data: sales transactions or inventory transactions
6. The minimum acceptable available capital balance where available capital is defined as the sum of the operating cash balance plus the unused portion of available credit line
7. The number of days per week the business operates
8. The base currency for all calculations
9. The default location (site) for forecast calculations
10. The default cost for placing, receiving and stocking an order
11. The default display format for the financial forecast
12. The default inventory carrying cost rate 13. The default percentage of forecast item demand that can be purchased on a commitment basis
14. The default sales account
15. The default inventory account
16. The number of history periods that should be used for base period forecast calculation
17. The maximum acceptable age of a forecast
18. The times in a month when orders are typically placed (end of month, every Thursday, the 7th and 21st day of each month, etc.)
19. The number of categories and the relative weightings that will be used in Item TVO variable calculation
20. The number of categories and the relative weightings that will be used in Customer TVO variable calculation
21. The number of categories and the relative weightings that will be used in Account TVO variable calculation
22. If vendor substitution is to be considered for any item
23. If unit of measure changes are to be considered for any item
24. Accuracy percentage required for unit price forecasts
25. Accuracy percentage required for unit volume forecasts
26. Accuracy percentage required for currency amount forecasts
27. Holidays and other days with no sale or receipt of goods
28. Location names (with "all locations" being one location)
29. A forecast of changes in capital structure
30. A forecast of capital investments (and divestments)
31. The account structure of the basic financial system that will be supplying transaction data
32. If vendor substitution restrictions should be removed as part of profit enhancement calculations
33. If unit of measure substitution restrictions should be removed as part of profit enhancement calculations
34. Maximum percentage total requisition quantities can be increased as part of profit enhancement calculations
35. The days orders are processed
36. The scenario designation for the current forecast, includes optional: site, division or department restrictions on customer groups, accounts and items being forecast, planner restrictions on items being forecast, forecast by item algorithm specification, forecast by account algorithm specification, forecast by customer group algorithm specification, controlling forecast designation and product only specification.

The functional impact of these inputs will be described in the present specification as part of the description of the affected processing. If the user has already entered and stored the information listed above, then the user has the option of changing the previous input or proceeding to the next stage in processing.

The application software of the system then checks to ensure that the required data dictionary and data source mapping tables for the user-specified data source have been completed and stored in the application database. If any required information isn't present in the application database, the user is prompted by the application software to provide the required information. After the required data dictionary and data mapping information are entered and stored in the application database, the application software establishes a connection with the specified data source utilizing user-input as required. The date of the transactions in the application database data tables are then compared with those in the specified data source by the application software of the present invention. The application software then creates a display showing the range of transaction dates that need to be added to each data table in the application database to bring the data up to date. The user is given the option of modifying or skipping the updates for specific tables before the application software copies the appropriate information from the specified data source to the tables in the application database of the present invention. The user is then prompted to provide input as required to complete the calculation of the various forecasts required for operation of the present invention. These forecasts are developed in a multi-step process that will be detailed below.

The first step in the forecast calculation is the independent forecast of future sales and cash receipts using three different bases, namely, sales and cash receipts by account, sales and cash receipts by customer group and sales by item. For individual accounts or items, the user has the option of using the history or the forecast from a different account or item, respectively, as the basis for the forecast. If the user doesn't specify another account or item as the basis for forecasts then the prior history of the account or item is used as the forecast basis. Accounts and items that have their forecast based on the forecast for another account or item are said to be dependent. With items, the user also has the option of designating another item as the successor after a designated date. Each independent forecast by account, customer group or item is first completed for the preceding 3 to 10 time periods. The number of preceding time periods used in this calculation are specified by the user. The time period covered by this forecast of preceding time periods is called the base period. This definition for the base period will be applied in all subsequent descriptions of system operation. The calculation of all system generated sales, expense and price forecasts is started by using the actual history from the 15 to 24 time periods that precede the base period together with 32 different algorithms to produce 32 different forecasts covering the base period. The 32 different algorithms used in calculating preliminary sales, expense and price forecasts are listed in Table 12 below.

TABLE 12

| Algorithm |
| --- |
| 1. Prior 3 period average |
| 2. Prior 6 period average |
| 3. Prior 12 period average |
| 4. Prior 15 period average |
| 5. Prior 18 period average |
| 6. Prior 26 period average |
| 7. Prior period actual |
| 8. Prior period actual × (prior period actual/2 periods prior actual) |
| 9. Prior period actual × (1 + 3 period average period to period trend) |
| 10. Prior period actual × (1 + 6 period average period to period trend) |
| 11. Prior period actual × (1 + 12 period average period to period trend) |
| 12. Prior period one quarter ago |
| 13. Prior period six months ago |
| 14. Prior period one year ago (seasonal) |
| 15. Prior period two years ago |
| 16. Average of (prior period one year ago + prior period one period before the period one year ago + prior period one period after one year ago) |
| 17. Average quarter during last year – converted to monthly or weekly forecast as appropriate |
| 18. Average quarter during last year × (1 + most recent |

TABLE 12-continued

Algorithm quarter to quarter growth rate) – converted to monthly or weekly forecast as appropriate
19. Average quarter during last year × (1 + average quarterly growth last year) – converted to monthly or weekly forecast as appropriate
20. Average period last year
21. Average period last year × (1 + average period growth last year)
22. Simple weighted average, heavy weighting to most recent 3 periods
23. Simple weighted average, heavy weighting to most recent 12 periods
24. Simple weighted average, heavy weighting to periods one year ago
25. Damped trend exponential smoothing – reduced time period
26. Damped trend exponential smoothing
27. Single exponential smoothing – reduced time period
28. Single exponential smoothing
29. Double exponential smoothing – reduced time period
30. Double exponential smoothing
31. Winter's exponential smoothing – reduced time period
32. Winter's exponential smoothing The error of the resulting forecasts is then assessed on two parameters, magnitude (i.e., currency level, price or item volume) and trend. The magnitude error is assessed by summing the square of the differences between the base period forecast and the actual base period results for each period and dividing the result by the number of periods as shown below.

$$\text{Error measure for magnitude} = \sum_{n=1}^{n=N} (Q_{fn} - Q_{an})^2/(N)$$

Where:

n=period number 1,2 . . . N

N=total number of periods in the base period $Q_{fn}$=quantity (currency level, price or item volume) forecast for period n in base period $Q_{an}$=actual quantity (currency level, price or item volume) during period n in base period Trend is defined as the slope of the best-fit least-squares regression of the base period forecast using the formula shown below.

$$Q_n = (Q_{(n-1)}XT) + B$$

Where:

n=period number 1,2 . . . N n−1=period prior to period n $Q_n$=quantity forecast for period n $Q_{(n-1)}$=quantity forecast for period prior to period n T=trend B=constant The error in the trend forecast is assessed by the square of the differences between the forecast trend and the actual trend as shown below.

$$\text{Error measure for trend} = (T_f - T_a)^2$$

Where:

$T_f$=trend of base period forecast $T_a$=actual trend during the base period

The error of each of the 32 forecasts is assessed using the two measures and the results for each measure are then normalized. The resulting error measures are then added together to produce an overall measure of forecast error. Given the preceding error definitions it is clear that the lower the error measure is—the higher the forecast accuracy. The three algorithms that produced the closest match with the actual base period results (the three algorithms with the lowest combined error) are then assigned weightings based on the multivalent assessment of their overall accuracy as shown in Table 13. In the event two different algorithms have the same low combined error level, the algorithm having the lowest table number (as shown in Table 12) will preferentially be chosen for future forecast calculations.

TABLE 13

| | | Forecast weightings | | | | | | | | |
|---|---|---|---|---|---|---|---|---|---|---|
| T | .1 | 5 | 6 | 6 | 7 | 7 | 8 | 8 | 9 | 9 | 10 |
| R | .2 | 5 | 5 | 6 | 6 | 7 | 7 | 8 | 8 | 9 | 9 |
| E | .3 | 5 | 5 | 5 | 6 | 6 | 7 | 7 | 8 | 8 | 9 |
| N | .4 | 4 | 5 | 5 | 5 | 6 | 6 | 7 | 7 | 8 | 8 |
| D | .5 | 4 | 4 | 5 | 5 | 5 | 6 | 6 | 7 | 7 | 8 |
|   | .6 | 3 | 4 | 4 | 5 | 5 | 5 | 6 | 6 | 7 | 7 |
| E | .7 | 3 | 3 | 4 | 4 | 5 | 5 | 5 | 6 | 6 | 7 |
| R | .8 | 2 | 3 | 3 | 4 | 4 | 5 | 5 | 5 | 6 | 6 |
| R | .9 | 2 | 2 | 3 | 3 | 4 | 4 | 5 | 5 | 5 | 6 |
| O | 1.0 | 1 | 2 | 2 | 3 | 3 | 4 | 4 | 5 | 5 | 5 |
| R* | | 1.0 | .9 | .8 | .7 | .6 | .5 | .4 | .3 | .2 | .1 |
| | | NORMALIZED MAGNITUDE ERROR | | | | | | | | | |

*Normalized

The same three algorithms are then used to calculate forecasts for the next 1 to 78 weeks (if the user selected time period is weeks) or the next 1 to 18 months (if the user selected time period is months). A weighted average forecast is then calculated using the three forecasts weighted by the previously designated weightings. The weighted average forecast is used as the forecast for the specified time period. The calculated forecasts for the base period and for the forecast time period are then stored for later use. The forecasts for dependent accounts or items are completed in a manner similar to that described for independent accounts or items except the dependent forecasts are created by using the forecast of the base account or item in place of prior history.

The user is also given the option of designating any one of the 32 algorithms shown above for account, customer group or item forecasting. This designation can be done globally (i.e., all forecasts by item are completed using algorithm 12) or at the element level (i.e., customer group a4 forecasts are completed using algorithm 27). Global designations are specified when the forecast scenario is established while element (account, customer group or item) specifications are established in the different element master files.

While completing these calculations, the system may determine that some of the accounts, customer groups or items that are being forecast require review by the user before the forecast calculations can be completed. When it is determined that a forecast element needs review, it is flagged for later review by the user. Some of the reasons for flagging individual forecasts for review include insufficient data to complete a reliable forecast and large differences between the multivalent forecast for the base period and the actual results for the base period. The user specifies the acceptable level of accuracy as part of the system set up. The flagged item, account and customer group forecasts must be reviewed by the user before the forecast calculation can proceed to completion.

During the forecast calculation by account, by customer group and by item, the trend (T) and variability (V) associated with the historical pattern for each individual forecast element (where an element can be an account currency level, a customer group currency level or an item volume) is calculated and stored for later use. In accordance with the present invention, trend (T) is defined as the slope of the best-fit least-squares regression of the base period history for each element. Variability (V) is defined as the quotient of the sample standard deviation of the relevant prior history for each element over the average period value of the element during the same time span. The system calculates and stores a TVO variable for each account, customer group or item that is being forecast. Previous input by the user to the item master assessing the probability of obsolescence (O) is also related to the item forecast information. The TVO variable is calculated in accordance with the present invention based on weightings that have been determined by the system and optionally modified by the user. More specifically, the TVO variable is the weighted sum of the normalized values of the Trend, Variability and Obsolescence variables. Tables 14, 15 and 16 illustrate the steps taken to complete the TVO variable calculation for each of three different products:

TABLE 14

| | Raw Data | | |
|---|---|---|---|
| | Trend | Variability | Obsolescence Risk |
| Product A | .10 | .24 | Moderate |
| Product B | −.21 | 2.24 | Very High |
| Product C | 1.12 | .67 | Very Low |
| Range | −.87 to 2.14 | .05 to 2.89 | Very Low to Very High |

TABLE 15

| | Normalized Data | | |
|---|---|---|---|
| | Trend | Variability | Obsolescence Risk* |
| Product A | .32 | .07 | 0.5 |
| Product B | .22 | .77 | 0.0 |
| Product C | .66 | .22 | 1.0 |

*Note: scale is reversed, the higher the obsolescence risk the lower the normalized value

TABLE 16

| TVO Calculation - Weighting × Normalized Value | | | | |
|---|---|---|---|---|
| | Trend | Variability | Obsolescence Risk | Calculated TVO |
| Weighting | 25% | 25% | 50% | |
| Product A | 0.08 | 0.02 | 0.25 | 0.35 |
| Product B | 0.06 | 0.19 | 0.00 | 0.25 |
| Product C | 0.16 | 0.06 | 0.50 | 0.72 |

The example shown above illustrates that relatively high TVO values would typically be associated with forecasts that have a high relative period-to-period growth rate, a high relative variability in period-to-period magnitude and a low relative risk of obsolescence.

The innovative and effectual storage and use of the TVO variable provides a superior method for selecting the forecast elements that will have their values preferentially increased or decreased as required to match the controlling forecast. In the case where a forecast needs to be increased to match a controlling forecast, the increase is preferentially spread to the group of elements with the highest TVO values while the group of elements with the lowest TVO values would have no increase. Reasons for preferentially increasing the highest TVO elements include:

1. Increasing the forecast for a high TVO element is in line with existing trends. The monthly level for the element is already increasing more than most other items (normalized T is highly positive), and/or;
2. Increasing the forecast for a high TVO element is conservative. The element has a high period-to-period variability (normalized V is highly positive). Increasing the forecast improves the likelihood that the forecast will cover the actual level experienced, and/or;
3. If the element is an item, increasing the forecast for an item with a relatively low risk of becoming obsolete minimizes the financial risk associated with increasing a forecast. As shown above, low risks of obsolescence carry higher normalized values of O.

In light of the preceding discussion, it is clear that when a forecast needs to be decreased to match a controlling forecast, the decrease would be preferentially spread to the group of elements with the lowest TVO values while the group of elements with the highest TVO values would not be decreased.

The use of the TVO variable gives the user the ability to ensure that the initial sales forecasts for items that are likely to become obsolescent in the foreseeable future are not increased under any circumstances. The user can achieve this by increasing the relative weighting of the Obsolescence (O) variable in the TVO table. Increasing the relative weighting of the Obsolescence (O) variable in the Item TVO calculation would also ensure the user that items that were expected to be obsolescent in the near future would be the first to have their forecasts decreased as part of an overall forecast reduction.

The next step in the forecast development process involves the comparison of the just completed sales and cash receipt forecast(s) for the preceding 3 to 10 time periods from each of the three different perspectives (dollars, customers and units) with the actual results for the same time period. In accordance with the present invention, the system will then determine a composite sales and cash receipt forecast using a system generated multivalent weighting criteria similar to that described previously.

The final step in the sales and cash receipt forecast development process in accordance with the present invention involves the adjustment of the three sales forecasts (:by account, by customer group and by item) and the two cash receipt forecasts (by account and by customer group) to match the controlling forecasts. If the system generated composite forecast has been designated as the controlling forecast (the default condition), then each sales and cash receipt forecast is adjusted to match the composite forecast. Alternatively, if the user has chosen one of the two sales and cash receipt forecasts as the controlling forecast, then the other two forecasts are adjusted to match it. Finally, if the user has chosen to use the most accurate forecast as the controlling forecast, then the system will determine which of the three forecasts mentioned previously is the most accurate in predicting the base period results and use it as the controlling forecast.

The user is normally only given the option of choosing the forecast by customer group or the forecast by account as the controlling forecast for two reasons, the sales forecast by item only captures the expected revenues from product sales and the sales forecast by item doesn't have a corresponding cash receipt forecast. Use of the sales forecast by item is generally unacceptable because most commercial enterprises will have revenue from service and other miscellaneous sources in addition to product sales revenue. However, when the user has specified that the current scenario is a product only scenario, the user will have the option of choosing the sales forecast by item as the controlling sales forecast. In this case, the cash receipt forecast by account is adjusted to reflect the controlling sales forecast and is used as the controlling cash receipt forecast. If no controlling forecast is specified, then the system will use the composite forecast as the controlling forecast. The controlling forecast can be specified when the forecast scenario is established.

All forecasts are adjusted to exactly match the controlling forecast in every time period. The first step in the adjustment of the forecast involves segregating each individual account, customer group or item forecast into a different sub-group or segment based on relative TVO value. If the user didn't specify the number of TVO categories for the forecast being adjusted then the system uses a default value of four segments. The changes required to bring each period forecast in line with the controlling forecast for the period are then preferentially spread to the most appropriate segments. For example, if the item sales forecast for the first period needed to be increased to match the controlling sales forecast for that period and there were four categories specified for item TVO, then the application software of the present system would segregate the items into four groups with group four having 25% of the items with the lowest TVO values, group three having 25% of the items with the next highest TVO values, group two having 25% of the items with the next highest TVO values and group one having 25% of the items with the highest TVO values. If there were no segment rankings specified, then the system would use the default values and spread: four-sevenths of the required increase on a proportional basis (each item would be increased by the same percentage) to the items in group 1, two-sevenths of the required period increase on a proportional basis to the items in group 2 and one-seventh of the required period increase on a proportional basis to the items in group 3. No adjustment would be made to the group with the lowest TVO values, group 4. All sales and cash receipt forecasts are adjusted in a similar fashion using the relative TVO values (with the O variable having a zero weighting for account and customer forecasts) as the basis for preferential increase or decrease to the forecast for each period. The number of TVO segments and the relative weighting each segment receives can be changed by the user from the default values used in the example above. The relative weightings and number of segments used for TVO calculation are stored in the customer group TVO table, account TVO table and item TVO table.

Having completed forecast of sales and cash receipts by account, by customer group and by item, the next processing step in accordance with the present invention is the calculation of the preliminary requisition set required to maintain inventory at the levels required to satisfy the user specified fill rate or margin loss targets for all of the individual items. All independent items are processed in alphanumeric order unless the user has limited the scope of item processing for the current scenario. After the independent item forecasts have been completed, the forecasts are completed for the dependent items in base item order. The preliminary requisition calculations for each item are completed before processing advances to the next item. In completing the calculations, the system uses information concerning:

1.) open purchase orders for the item,
2.) open sales orders for the item,
3.) the current on-hand inventory level for the item,
4.) the current available inventory level for the item,
5.) item units of measure,
6.) item vendors,
7.) item unit prices,
8.) item lead times,
9.) item sales forecast,
10.) item demand variability (V),
11.) order processing costs,
12.) inventory carrying costs, and
13.) the user specified fill-rate or margin-loss target for the item, to determine the appropriate target inventory level and the economic order quantity. For the preliminary requisition calculation, the system will assign either the vendor currently assigned to the item by the user or the vendor the item was most recently purchased from if no vendor has been specified by the user. The system then determines if the quantity price breaks offered by the selected vendor provide sufficient cost savings to change the calculated economic order quantity. Using this information, the system then determines the timing, number and size of the requisitions that will be required to maintain the target inventory level given the sales forecast and the days of operation the user has previously designated.

After completing this initial requisition calculation, the requisition set that maximizes profitability is then calculated for each item within the constraints previously specified by the user. The constraints specified by the user relate primarily to the possibility of substituting different vendors and/or different units of measure in order to reduce costs. As discussed previously, the company using the system may have strategic or qualitative reasons for choosing to do business with a particular set of vendors or to buy goods using a particular unit of measure. To accommodate this very real concern, the user is given the ability in the present invention to control vendor substitution and unit of measure substitution at both the item and global forecast level. In accordance with the present invention, control at the forecast level is effected via the use of the Vendor Substitution and Unit of Measure Substitution variables in the system setting table. Control of vendor substitution and unit of measure substitution at the item level is implemented through the use of the Vendor Substitution and Unit of Measure Substitution variables in the item master table.

The first step in the calculating the maximum profit requisition set is the segregation of items into those purchased under item quantity discounts and those purchased under business-volume discounts. Vendors that don't offer any type of volume discount are considered item discount vendors for purposes of this segregation. The system will analyze items with a combination of business volume and item-discount vendors using the logic described for item-discount items. The item quantity discount items are analyzed first. The analysis of these items is completed one item at a time in alphanumeric order. A profitability equation is created for each item by subtracting the total cost of storing, processing, and purchasing, the item from the potential vendors using the available units of measure and quantity price breaks from the forecast revenue from item sales during the forecast time period. The most profitable mix is selected as the base level mix for the item and the preliminary requisitions are adjusted as required to match the specified mix. When the base level requisitions for all the item quantity discount items have been calculated, processing advances to the calculation of base level requisitions for business volume discount items.

The application software of the present system uses multi criteria, mixed-integer, linear program algorithms to calculate the profit maximizing requisition set for business volume discount schedule items. More specifically, the profit maximizing set of requisitions for items purchased under business volume discount schedules on a commitment basis is calculated by the application software and then the profit maximizing set of requisitions for items purchased using as-ordered business volume discount schedules is calculated in a similar fashion. The resulting set of requisitions is designated as the base-level requisitions for the business volume items.

In accordance with the present invention, the system then calculates and displays the forecast time period financial status of the commercial enterprise in any of seven formats chosen by the user. If there isn't sufficient capital to pay for the base level requisitions and maintain the specified minimum available capital balance for all periods being forecast, then the system will display the resulting forecast, highlighting the periods with a deficiency in capital. From this point, processing can return to the initial input screens where the user can increase the borrowing capacity, change the amount of capital held in reserve, increase the forecast of capital additions, decrease the forecast of capital expenditures, change individual item sales forecasts, change the item fill rate targets and/or increase the item margin loss targets before re-running the forecast. Alternatively, the user can choose to have the system repeat calculations similar to the base-level requisition calculations within the forecast financial constraints. At the same time, if there is sufficient capital to complete the purchase of the base-level requisitions, the user has the option of editing any of the prior inputs or accepting the base-level financial forecast and proceeding to the profit enhancement step.

The profit enhancement step mirrors the processing that was completed in the calculation of the base level requisitions. For example, the processing is completed in the same order discussed previously with potential profit enhancing changes for item-discount items being calculated first, profit enhancing changes for committed business-volume discount items being calculated second and profit enhancing changes for as-ordered business volume discount items being calculated last. Profit enhancing changes are generated by removing the user specified constraints on vendor substitution, item commitment percentages and unit of measure substitution. Calculations are completed to show the effect of removing previously specified constraints to clearly define for the user the cost of maintaining certain policies. For example, the user may prefer to buy bolts from Acme Bolt Company because of a long standing relationship. However, if the user learns that it is costing an extra $100,000 a year to do maintain this policy, the desirability of continuing the policy might be questioned. The user specifies which constraints (if any) are removed during profit enhancement calculations as part of the scenario specification.

If the user elected to consider the potential increase in profit from removing either the vendor or the unit of measure substitution restrictions, then all potential changes that enhance profitability are stored and ranked on the basis of their capital efficiency. Capital efficiency is defined as the ratio of the profit improvement over the increase in average capital investment required to produce the profit improvement. When profit improvement is achieved with a reduction in average capital investment, capital efficiency is defined as the profit improvement plus the absolute value of the reduction in average capital investment. The potential changes are stored along with the calculated capital efficiency of each change for use in a display.

The user is then presented with the listing of the potential changes to the base level requisitions in descending capital efficiency order (i.e., the most efficient changes are first). At this point the user is given the option of accepting any of the displayed profit enhancing changes until the sum of the increases in average capital investment for the accepted changes equals the lowest available capital balance during the forecast time period. Once the user has completed the selection of profit enhancing changes, the system calculates and displays the revised financial forecast that incorporates the accepted changes to base level requisitions. The user then has the option of accepting or rejecting the new financial forecast. If the user rejects the new financial forecast, then system processing returns to the display of potential changes to the base level requisitions. The user will then have the ability to accept additional changes and/or reject previously accepted changes before recalculating the financial forecast. The user's other option at this point would be to accept the revised forecast. If the revised forecast is accepted, then the base level requisitions stored in the application database are revised to reflect the accepted changes and the user is presented with the option of displaying or printing a variety of management reports.

DETAILED DESCRIPTION

As shown in FIG. 1, the preferred embodiment of the present invention is a computer system 1 illustratively comprising a plurality of client, personal computers 10 each with a display 11, a keyboard 12, a mouse 13 and a printer 14. These client, personal computers 10 are connected to a server, personal computer 20 via an interconnection network 30. The server, personal computer 20 also has a display 11, a keyboard 12 and a mouse 13. The system can be networked to fifty or more client, personal computers 10. The computers (10 and 20) shown in FIG. 1 illustratively are IBM-PCs or clones or any of the more powerful personal computers or workstations that are widely available. It is to be understood that the diagram of FIG. 1 is merely illustrative of one embodiment of the present invention.

Figure 2:
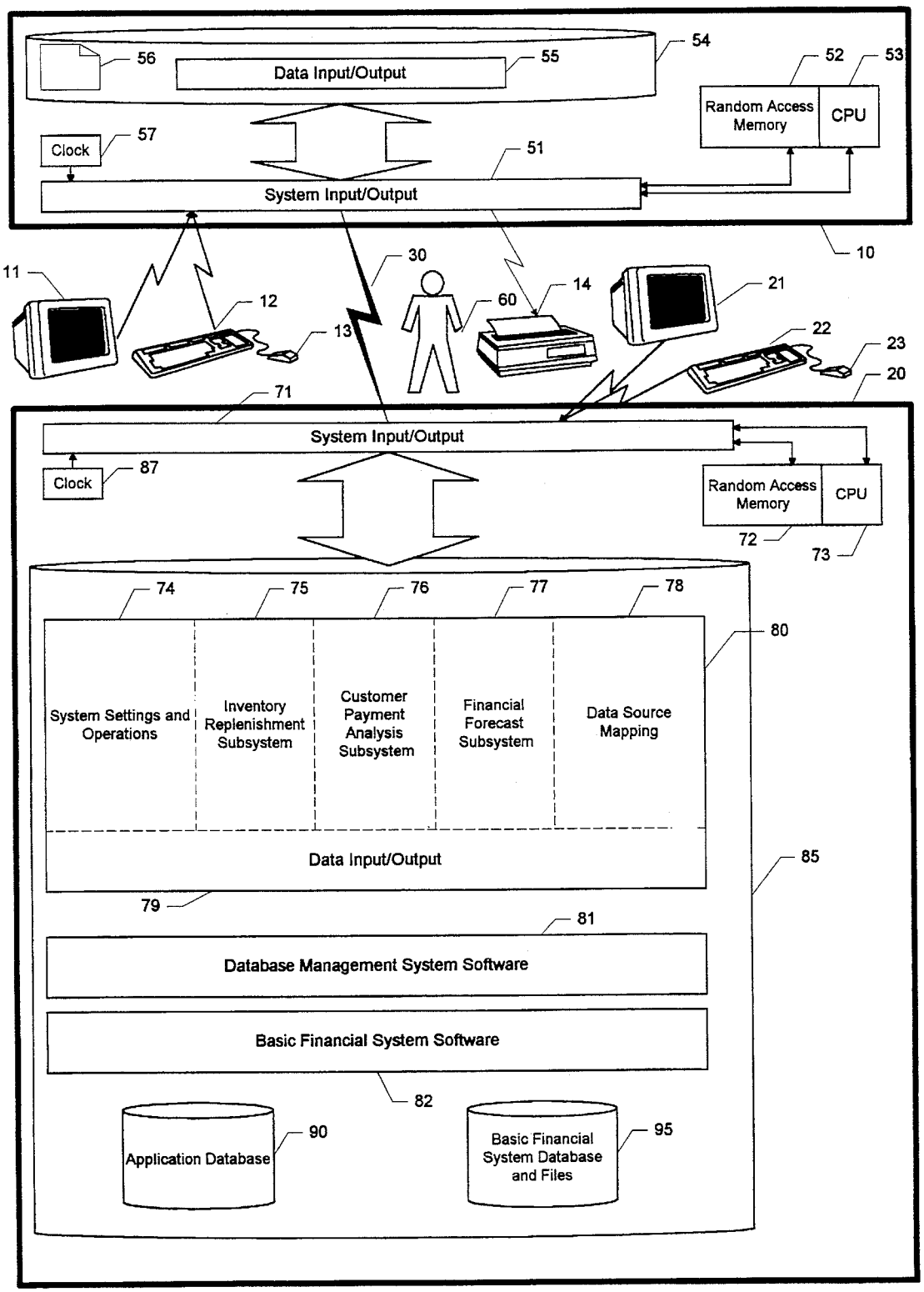
FIG. 2 is a block diagram of an illustrative computer based method of and system for generating a listing of feasible profit-enhancing changes to base-level requisitions.

The same client 10 and the server 20 personal computers are shown from a different perspective in FIG. 2. While only one client, personal computer 10 is shown in FIG. 2, it is to be understood that the server, personal computer 20 can be networked via the interconnection network 30 to fifty or more client, personal computers 10. It is well known that such computers include a processor 53, 73, a read/write random access memory 52, 72, a means for writing data into said memory, an internal clock that tracks the current date and time 57, 87 and a communications bus 51, 71 for channeling data between the various system components. Typical memory configurations for client, personal computers 10 used with the present invention should include at least 8 megabytes of semiconductor random access memory 52 and at least a 250 megabyte hard drive 54. Typical memory configurations for the server personal, computer 20 used with the present invention should include at least 16 megabytes of semiconductor random access memory 72 and at least a 500 megabyte hard drive 84.

Resident in the memory 52 of the each client, personal computer 10 during system operation is a portion of the application software 55 of the present invention that defines system operation with respect to client, personal computer 10 data input, display, and output. A user 60 inputs data and operating instructions into the client, personal computer input/output bus 51 from a keyboard 12 or mouse 13. The user 60 also has the option of directing the application software 55 to access data from computer files such as a database table 58 or an electronic worksheet 56. These database tables 58 and electronic worksheets 56 may be residing in the hard drive 54 of the client, personal computer 10 as shown in FIG. 2. Alternatively these files may reside in the server, personal computer 20 or in another client, personal computer 10 connected to the interconnection network 30. The information is processed in the random access memory 52 using the CPU 53 and optionally stored in the hard drive 54 before being transferred via the interconnection network 30 to the server, personal computer 20. After some amount of processing is completed by an application software 80 of the present invention using the CPU 73 in the server, personal computer 20, the user 60 can view the responses from the application software 80 of the present invention that have been transferred via a data input-output segment 79 of the application software 80 to the system bus 71 to the interconnection network 30 where it is in turn passed on to the client, personal computer system input/output bus 51 and on to the display device 11 or printer 14. Data can be received from any client, personal computer 10 connected to the interconnection network 30. Reports can be output to electronic worksheets 56, database files or printed reports using the printer 14. The output can be directed to any computer connected to the interconnection network 30.

Resident in the memory 72 of the server, personal computer 20 during system operation is the application software 80 of the present invention which provides for enhanced inventory management. The application software 80 consists of six interrelated segments, namely, a system settings and operations segment 74, an inventory replenishment subsystem 75, a customer payment analysis subsystem 76, a financial forecast subsystem 77, a data source mapping subsystem 78 and a data input/output segment 79. A data base management system software 81, an application database 90, a basic financial system software 82 and a basic financial system database 95 are also resident in the server, personal computer memory 72 as required during system operation. The data base management system (and the application database) is preferentially a relational database that conforms to the ANSI SQL89 standard. As is well known, common features of relational databases include primary and foreign key support, integrity checking and backup and recovery using logs. These features can be used to support indexing and filtering of the database during processing. The software and databases mentioned previously, 74, 75, 76, 77, 78, 79, 80, 81, 82, 90 and 95, are typically stored in the hard drive 84. As discussed previously, the user 60 normally interacts with the application software 80 by entering data and commands into the client, personal computer 10 which is connected with the server, personal computer 20 via the interconnection network 30. Alternatively, the user 60 may operate the system by entering data and operating instructions directly into the server, personal computer 20 from a keyboard 12, mouse 13. Operating in this manner, the user 60 would receive the responses from the server, personal computer 20 on the server, personal computer display device 11.

The diagram of FIG. 2 is illustrative of only one embodiment of the present invention. An individual skilled in the art will immediately recognize that each segment of the application software (74–79), the database management system 81, Basic Financial System Software 82, the application databases 90, and the basic financial system database 95 currently shown as resident in the server, personal computer hard drive 84 can be distributed in many different combinations to other computers connected to the interconnection network 30. Alternatively, all the elements shown could be included on one computer eliminating the need for client, personal computer 10 and the interconnecting network 30.

System Setting and Operation

Figure 3A:
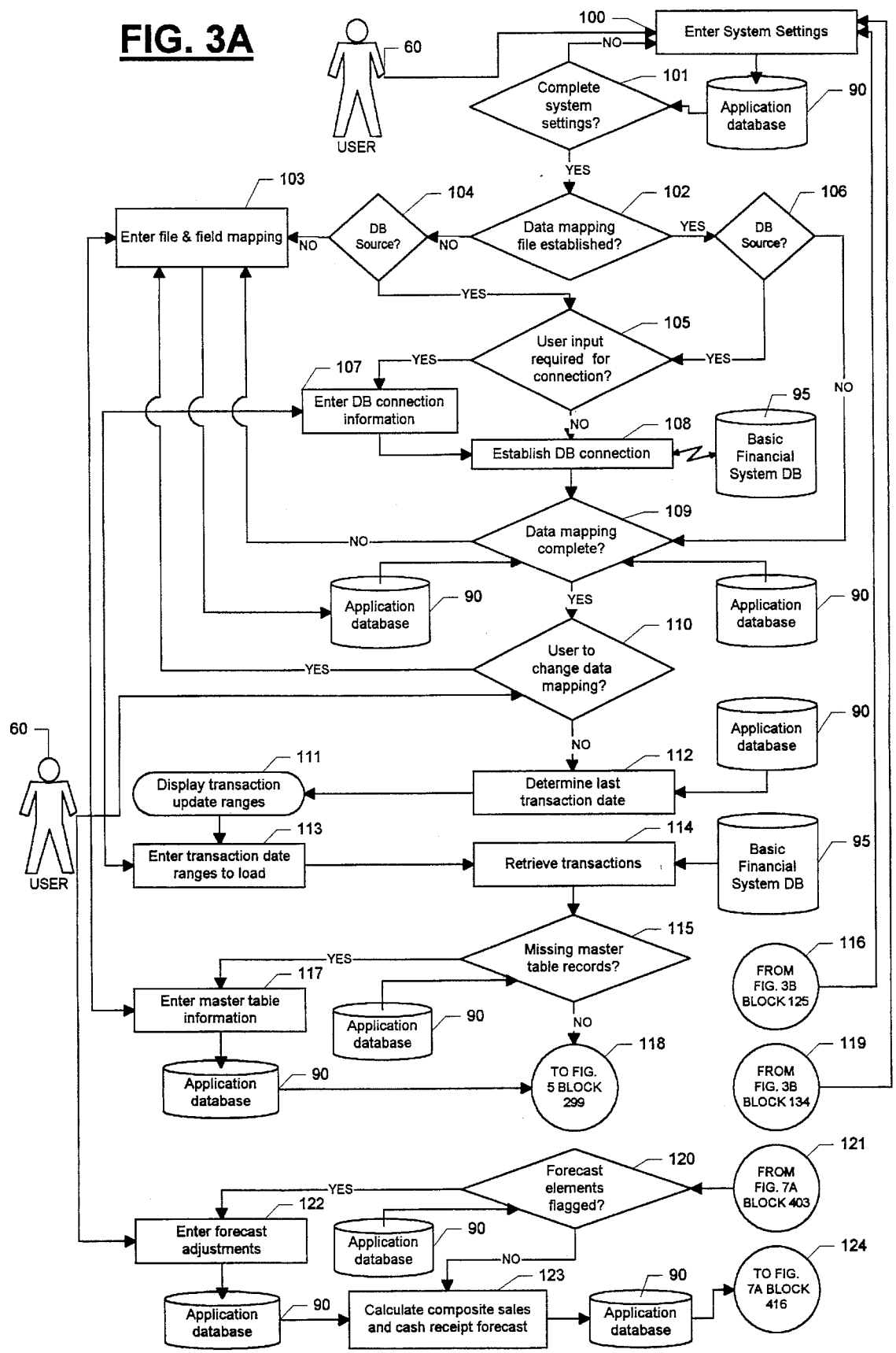
FIG. 3A and FIG. 3B am flow diagrams showing the sequence of the steps for determining the prioritized list of profit enhancing changes to the base-level requisitions within the constraints imposed by the forecast financial situation of the commercial enterprise using the invention.
Figure 3B:
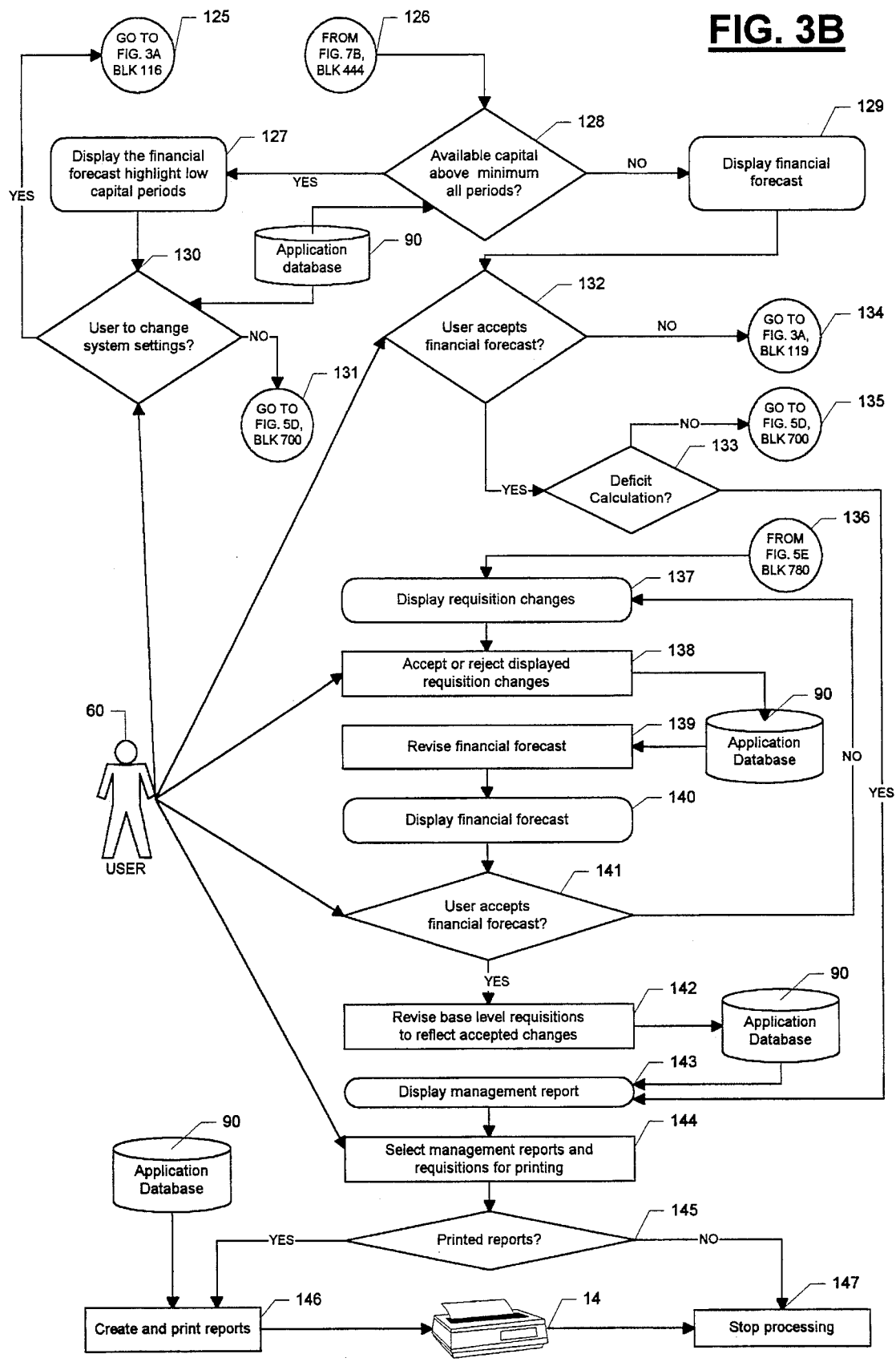

The flow diagram in FIG. 3A and FIG. 3B provides an overview of the processing in the inventive system for generating a listing of feasible profit-enhancing changes to the base-level requisition set. Processing starts with the user's entry of the system setting variables in a block 100 to define: the type of forecast to be run; the time period used for forecast calculation (weeks or months); the number of forecast time periods (maximum of 18 months or 78 weeks); the number of time periods that requisitions will be calculated for (maximum is equal to the number of forecast time periods); the source for transaction data (user-input, computer files or a basic financial system database); the source for item forecast historical data (sales transactions or inventory transactions); the minimum acceptable available capital balance (e.g., cash plus available credit); the number of days per week the business operates (five or seven days); the default currency for all calculations; the default location; the default cost for placing, receiving and stocking an order; the default display format for the financial forecast; if vendor substitution is to be considered for any item; the default inventory carrying cost rate; the default percentage of forecast item demand that can be purchased on a commitment basis; the default sales account; the default inventory account; the number of history periods that should be used in forecast validation (the base period); the maximum acceptable age for a current forecast; the times in a month when orders are placed (end of month, every Thursday, the 7th and 21st day of each month etc.); the number of categories and the relative weightings that will be used in TVO variable calculation for each type of forecast (by account, by customer group and by item); if vendor changes are to be considered for any item, if unit of measure changes are to be considered for any item; accuracy requirements for price, unit volume and currency forecasts; holidays and other days with no sale or receipt of goods; location names (with "all locations" being one location); a forecast of capital structure changes; a forecast of capital investments (and divestments); the account structure; if vendor substitution restrictions can be lifted as part of a profit enhancement calculation; if unit of measure substitution restrictions can be lifted as part of a profit enhancement calculation; the maximum percentage total requisition quantities can be increased as part of profit enhancement calculations, and the scenario designation for the current forecast sequence. The information outlined above is referred to as "system settings' and it is stored in ten separate tables within the application database 90.

When the user 60 completes the initial entries or makes changes to the system settings and all required data have been entered, the system provides the user 60 with the option of saving the newly entered information in the application database 90 by clicking the save-to-database icon on the toolbar above the screen as shown in the figure below. Alternatively, if all required data have been entered, then the user 60 can simply exit the data input screen which will cause the software in block 100 to save all entries to the database 90 before starting any other processing.

Figure 4:
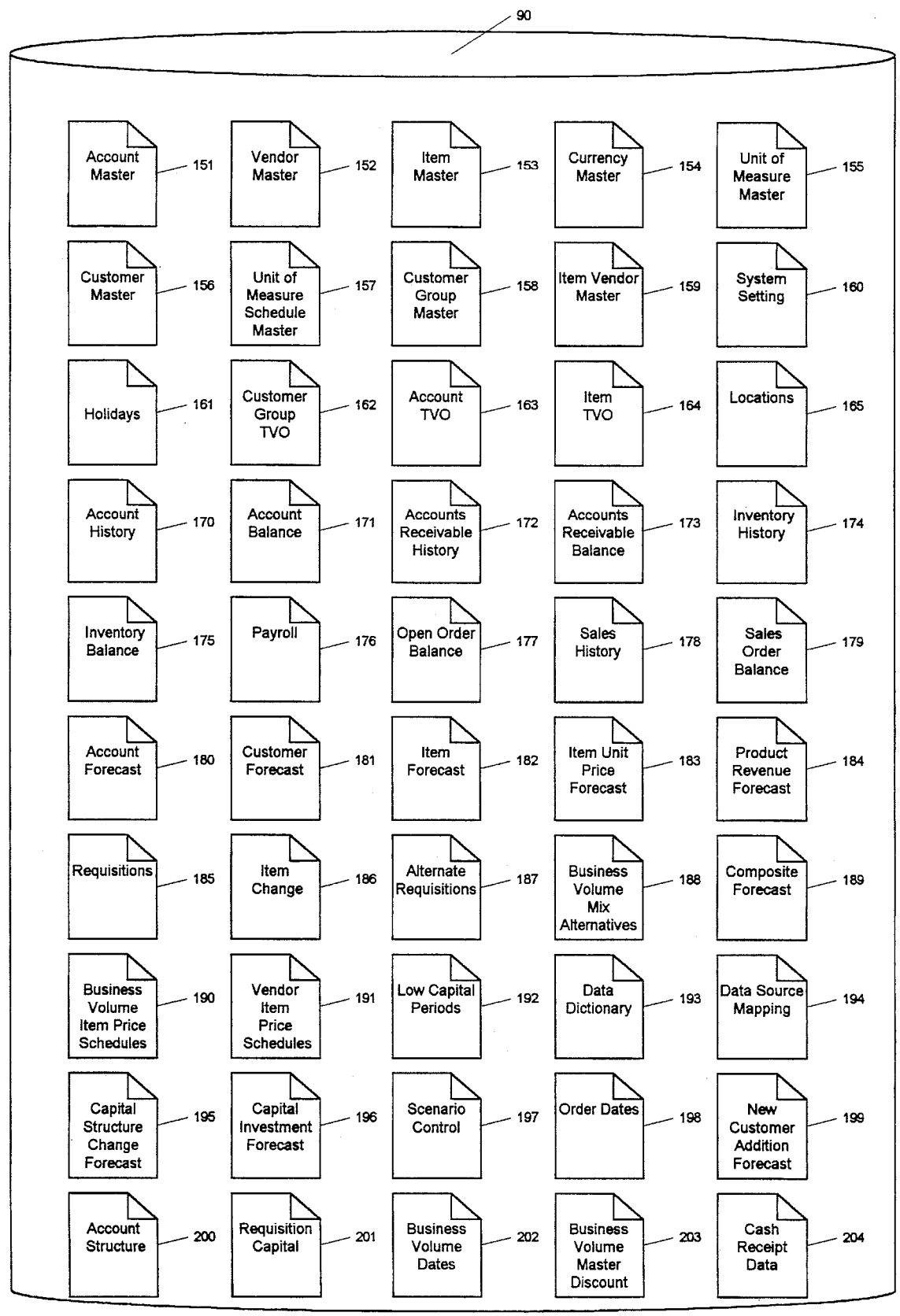
FIG. 4 is a diagram showing the files or tables in the application database of the present invention that are utilized for data storage and retrieval during the processing to determine the prioritized list of profit enhancing changes to the base-level requisitions within the constraints imposed by the forecast financial situation of the business unit or company using the invention.
Figure 5A:
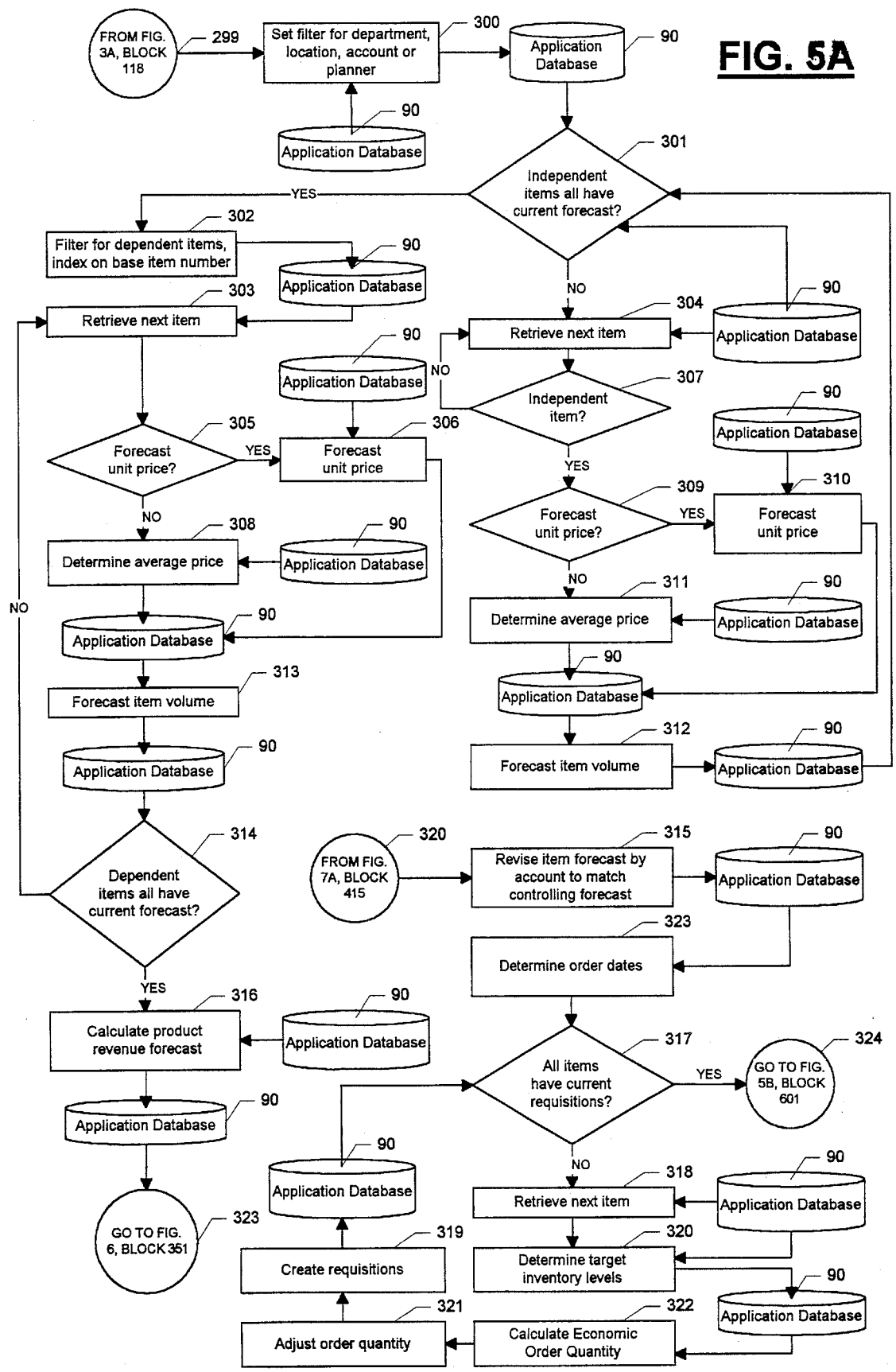
FIG. 5A is a flow diagram showing the sequence of the steps in the inventory replenishment subsystem that are used for forecasting sales by item, calculating the item TVO variables used for determining the magnitude of item forecast adjustments during forecast synchronization, calculating the economic order quantity for each item, determining the target inventory level required to maintain user specified fill-rate or margin-loss targets for each item, and creating the preliminary requisitions required to maintain the target inventory levels.
Figure 5B:
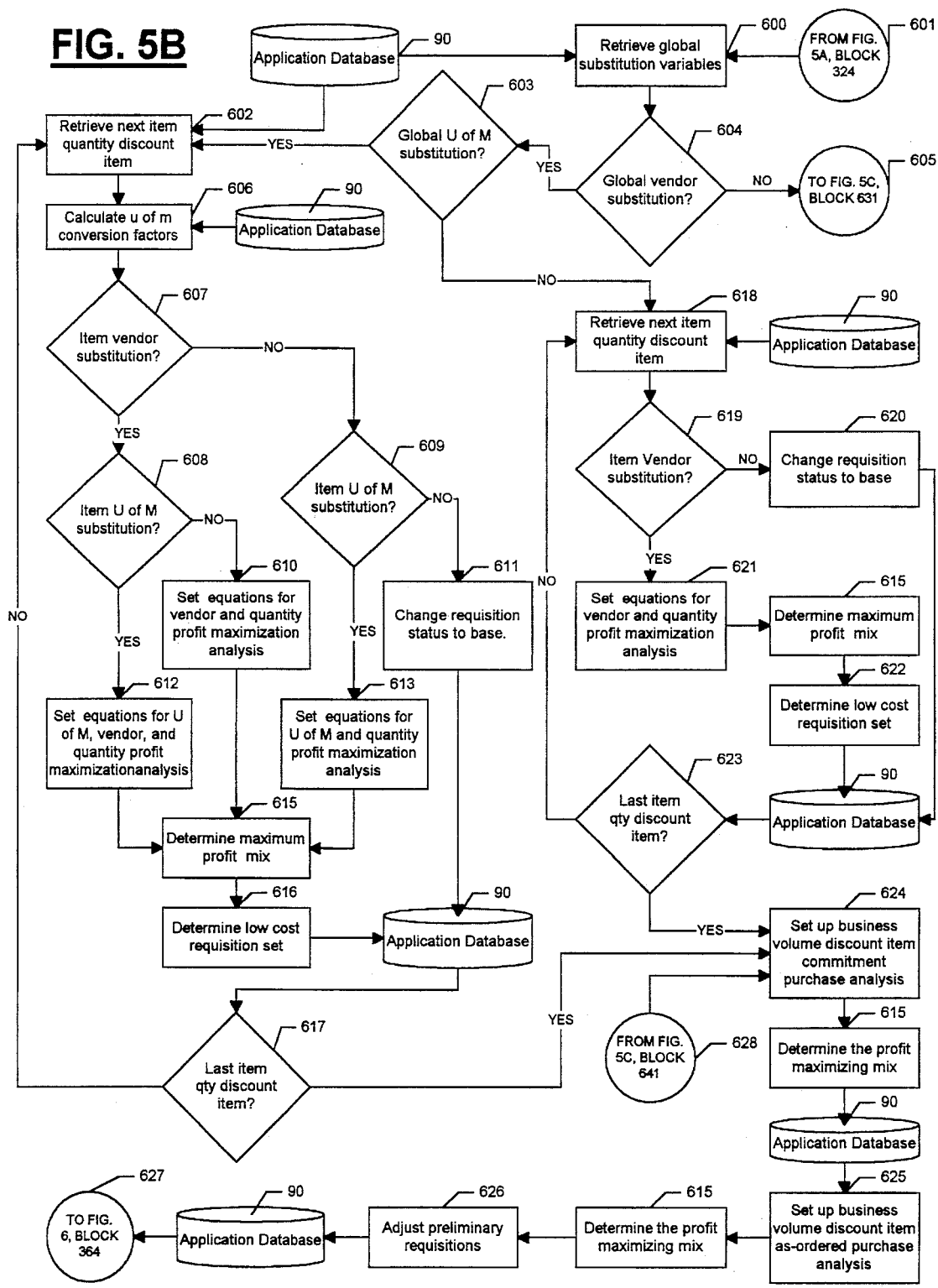
FIG. 5B and FIG. 5C are flow diagrams showing the sequence of steps used in creating the base-level requisitions in the inventory replenishment subsystem.
Figure 5C:
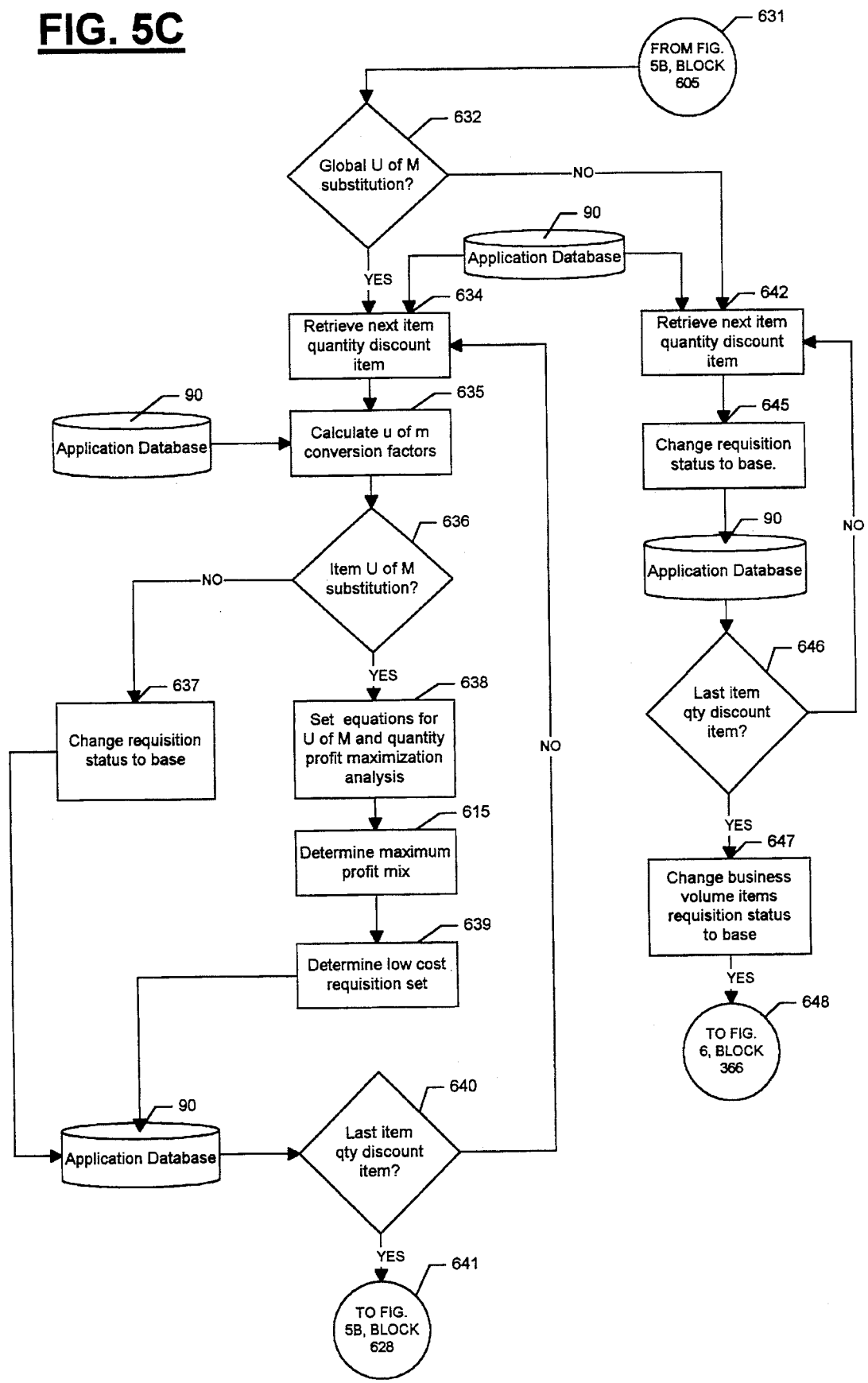
Figure 5D:
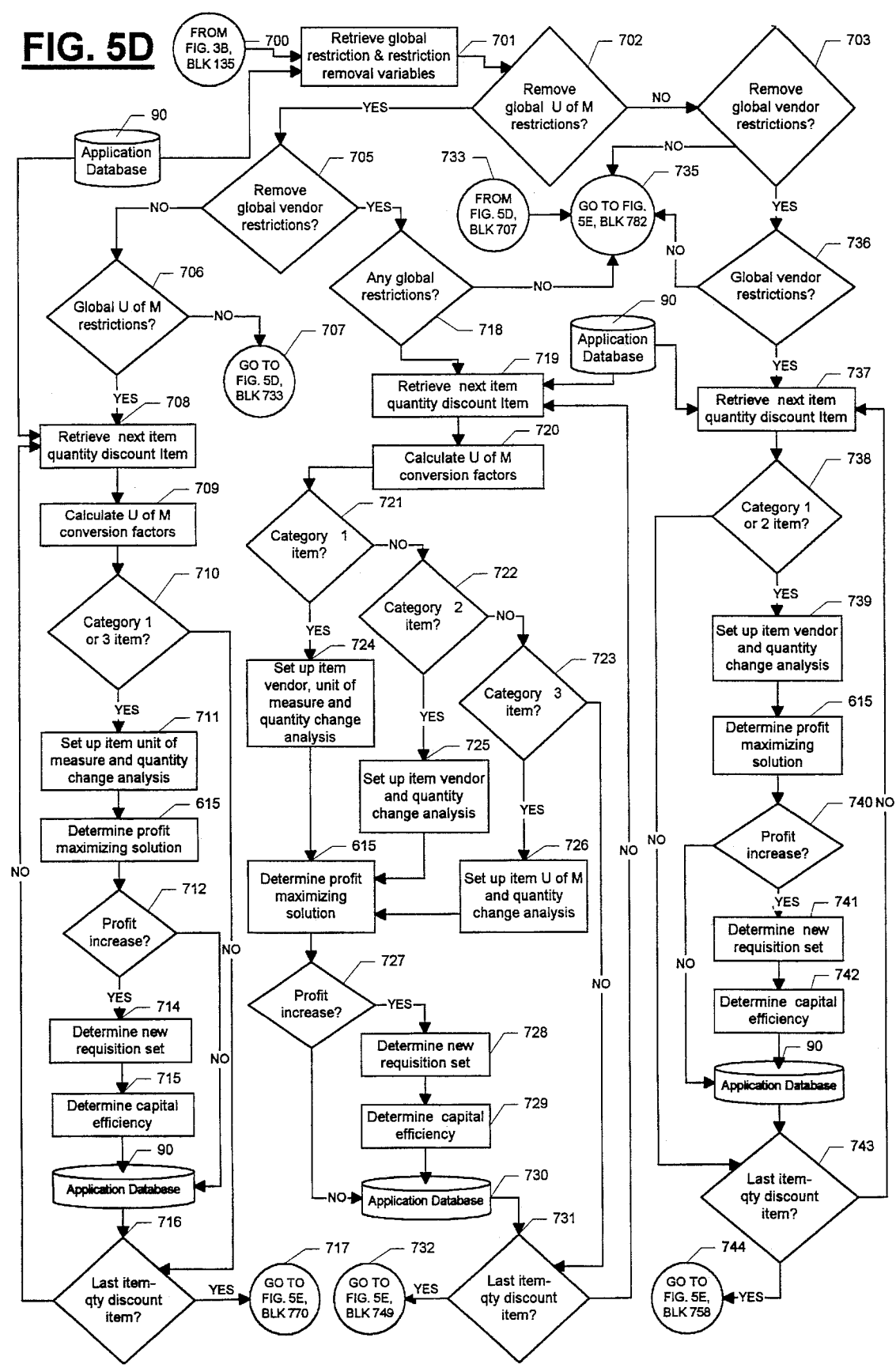

The user's input is saved in one of ten different files or tables (hereinafter, tables) within the application data base 90 as shown in FIG. 4. The ten tables are: a system setting table 160, a holidays table 161, a customer TVO table 162, an account TVO table 163, an item TVO table 164, a locations table 165, a capital structure change forecast table 195, a capital investment forecast table 196, a scenario control table 199 and an account structure table 200. These database tables have the structures shown below in Tables 17 through 26.

Tables 17(160) & 18(161)

System Setting (160) - Variable Name
Variable - length & data type - null values?

Forecast type - fc_type - 1 character - NO
Time period - tim_pd - 1 character - NO
Number of time periods - no_pd - integer - NO
Requisition periods - rq_pd - integer - NO
History periods - hst_pd - 1 character - YES
Carrying cost - int_rate - 6.2 num - NO
Cost per order - ord_cst - 15.2 num - NO
Main data source - dat_src - 1 character - NO
Item data source - itm_src - 1 character - NO
Minimum avail. capital - min_cap - 15.2 num - NO
Vendor sub - vnd_sub - 1 character - YES
U of M sub - um_sub - 1 charcter - YES
Maximum commit % - com_pct - 6.2 num - NO
Split order UM - split - 1 character - YES
Days per week - wk_days - integer - NO
Display format - disp_fmt - 1 character - YES
Default location - loc_code - 1 character - NO
Default sales acct - sal_act - 30 character - NO
Default inventory acct - inv_act - 30 character - NO
Default currency - curncy - 1 character - NO
Employer SS Rate - emp_ss - 6.3 Num - NO
Maximum forecast age - fc_age - integer - NO
Order date 1 - o_dt1 - 3 character - NO
through
Order date 12 - o_dt12 - 3 character - YES
Price accuracy % - pacc - 6.3 Num - NO
Volume accuracy % - vacc - 6.3 Num - NO
Currency accuracy % - cacc - 6.3 Num - NO
Acceptable % no data - ndat - 6.3 Num - NO
Profit enhance without vendor sunstitution
restrictions - venmax - 1 character - YES
Profit enhance w/o unit of measure substitution
restrictions - unmax - 1 character - YES
Max item volume increase % - max - integer - NO Holidays (161) - Holiday #
Variable - length & data type - null values?

Holiday 1 - h1 - date - YES
Holiday 2 - h2 - date - YES
Holiday 3 - h3 - date - YES
Holiday 4 - h4 - date - YES
Holiday 5 - h5 - date - YES
Holiday 6 - h6 - date - YES
Holiday 7 - h7 - date - YES
Holiday 8 - h8 - date - YES
Holiday 9 - h9 - date - YES
Holiday 10 - h10 - date - YES
Holiday 11 - h11 - date - YES
Holiday 12 - h12 - date - YES
Holiday 13 - h13 - date - YES
Holiday 14 - h14 - date - YES
Holiday 15 - h15 - date - YES
Holiday 16 - h16 - date - YES
Holiday 17 - h17 - date - YES
Holiday 18 - h18 - date - YES
Holiday 19 - h19 - date - YES
Holiday 20 - h20 - date - YES

Tables 19(162) & 20(163)

Customer Group TVO (162) - Variable Name
Variable - length & data type - null values?

Trend weighting - tc_pct - 6.2 Num - NO
Variability weighting - vc_pct - 6.2 Num - NO
Number of categories - cat_cust - 6.2 Num - NO
Category 1 percentage - pct_1 - 6.2 Num - NO
Category 2 percentage - pct_2 - 6.2 Num - YES
Category 3 percentage - pct_3 - 6.2 Num - YES

Tables 19(162) & 20(163)

Category 4 percentage - pct_4 - 6.2 Num - YES
Category 5 percentage - pct_5 - 6.2 Num - YES
Category 6 percentage - pct_6 - 6.2 Num - YES
through
Category 8 percentage - pct_8 - 6.2 Num - YES Account TVO (163) - Variable Name
Variable - length & data type - null values?

Trend weighting - tr_pct - 6.2 Num - NO
Variability weighting - vr_pct - 6.2 Num - NO
Number of categories - cat_act - 6.2 Num - NO
Category 1 percentage - pct_1 - 6.2 Num - NO
Category 2 percentage - pct_2 - 6.2 Num - NO
Category 3 percentage - pct_3 - 6.2 Num - NO
Category 4 percentage - pct_4 - 6.2 Num - NO
Category 5 percentage - pct_5 - 6.2 Num - NO
Category 6 percentage - pct_6 - 6.2 Num - NO
through
Category n percentage - pct_n - 6.2 Num - NO

Tables 21(164) & 22(165)

Item TVO (164) - Variable Name
Variable - length & data type - null values?

Trend weighting - ti_pct - 6.2 Num - NO
Variability weighting - vi_pct - 6.2 Num - NO
Obsolescence weighting - oi_pct - 6.2 Num - NO
Number of Categories - cat_item - 6.2 Num - NO
Category 1 percentage - pct_1 - 6.2 Num - NO
Category 2 percentage - pct_2 - 6.2 Num - YES
Category 3 percentage - pct_3 - 6.2 Num - YES
Category 4 percentage - pct_4 - 6.2 Num - YES
Category 5 percentage - pct_5 - 6.2 Num - YES
Category 6 percentage - pct_6 - 6.2 Num - YES
through
Category n percentage - pct_n - 6.2 Num - YES Locations (165) - Location
Variable - length & data type - null values?

Location 1 - l1 - 15 character - YES
Location 2 - l2 - 15 character - YES
Location 3 - l3 - 15 character - YES
Location 4 - l4 - 15 character - YES
Location 5 - l5 - 15 character - YES
Location 6 - l6 - 15 character - YES
Location 7 - l7 - 15 character - YES
Location 8 - l8 - 15 character - YES
Location 9 - l9 - 15 character - YES
Location 10 - l10 - 15 character - YES
Location 11 - l11 - 15 character - YES
Location 12 - l12 - "All locations" - NO

Tables 23(195) & 24(196)

Capital Structure (195) - Variable Name
Variable - length & data type - null values?

Account - acct - 30 character - YES
Forecast amount - fc_amt - 15.2 Num - YES
Forecast date - fc_date - date - YES Captial Investment (196) - Variable Name
Variable - length & data type - null values?

Account - acct - 30 character - YES
Forecast amount - fc_amt - 15.2 Num - YES
Forecast date - fc_date - date - YES

| Tables 25(197) & 26(200) |
| --- |
| Scenario Control (197) - Variable Name<br>Variable - length & data type - null values? |
| Scenario name - scen - 30 character - NO<br>Comments - comm - 300 character - YES<br>Account structure - act_str - 30 character - NO<br>Account segment - aseg - 30 character - NO<br>Division segment - dseg - 30 character - NO<br>Location segment - lseg - 30 character - NO<br>Department segment - dseg - 30 character - NO<br>Restrict processing? - rst - 1 character - YES<br>Restrict processing to - rst2 - 30 character - YES<br>Item forecast algorithm - ital - integer - YES<br>Account f'cast algorithm - acal - integer - YES<br>Customer f'cast algorithm - cual - integer - YES<br>Product only? - pl - 1 character - NO<br>Deficit calculation? - deficit - 1 character - NO<br>Controlling forecast - ctrl - 1 character - YES |
| Account Structure (200) - Variable Name<br>Variable - length & data type - null values? |
| Account structure - act_str - 30 character - NO<br>Segment name - name - 30 character - NO<br>Segment position - pos - integer - NO<br>Segment length - len - integer - NO<br>Segement type - type - 1 character - NO<br>Segment separator - sep - 1 character - NO |

When the user 60 completes the entry of the system settings, the information is saved in the appropriate tables in the application database. Processing then advances to a block 101 where the tables in the application database 90 are checked to confirm that all required information is present. The information contained in system setting tables 160, 161, 162, 163, 164, 165, 197 and 200 is required input while the information in tables 195 and 196 is optional. If the required system setting tables haven't been stored in the application database 90, then processing returns to the initial data entry screen 100 where the user 60 can enter the required information. If, on the other hand, all required system setting information is present in the application database 90, then processing continues to a block 102 where the software in that block checks to see if a data dictionary 193 and a data source mapping table 194 have been stored for the data source that has been specified for use by the recently entered system settings.

The data dictionary and data source mapping table structures are presented in Tables 27 and 28 below. The italicized variables shown below are unique to the present invention and would in all likelihood be entered by the user 60 as they are not likely to be found in the specified data source. The data mapping table provides for the specification of the data source drive, data source directory and data source file for each data and master table, the specification of the data source equivalent for each variable in each data and master table and the specification of an alternate location for each variable equivalent.

| Tables 27(193) & 28(194) |
| --- |
| Data Dictionary Table (193) - Variable Name<br>Variable - length & data type - null values? |
| Debit equivalent 1 - dbeq - 30 character - NO<br>Debit equivalent 2 - dbeq2 - 30 character - YES<br>Debit equivalent 3 - dbeq3 - 30 character - YES<br>Credit equivalent 1 - creq1 - 30 character - NO<br>Credit equivalent 2 - creq2 - 30 character - YES<br>Credit equivalent 3 - creq3 - 30 character - YES |

| Tables 27(193) & 28(194) |
| --- |
| Sale equivalent 1 - sl_eq1 - 30 character - NO<br>Sale equivalent 2 - sl_eq2 - 30 character - YES<br>Sale equivalent 3 - sl_eq3 - 30 character - YES<br>Return equivalent 1 - rte1 - 30 character - NO<br>Return equivalent 2 - rte2 - 30 character - YES<br>Return equivalent 3 - rte3 - 30 character - YES<br>Receipt equivalent 1 - rce1 - 30 character - NO<br>Receipt equivalent 2 - rce2 - 30 character - YES<br>Receipt equivalent 3 - rce3 - 30 character - YES<br>Transfer equivalent 1 - tfeq1 - 30 character - NO<br>Transfer equivalent 2 - tfeq2 - 30 character - YES<br>Transfer equivalent 3 - tfeq3 - 30 character - YES<br>On-hand equivalent 1 - ohe1 - 30 character - NO<br>On-hand equivalent 2 - ohe2 - 30 character - YES<br>On-hand equivalent 3 - ohe3 - 30 character - YES<br>Available equivalent 1 - ave - 30 character - NO<br>Available equivalent 2 - ave2 - 30 character - YES<br>Available equivalent 3 - ave3 - 30 character - YES<br>Base currency equivalent - bc_eq - 15 char - NO |
| Data Mapping Table (194) - Variable Name<br>Variable - length & data type - null values ? |
| Account history drive - ah_dr - 1 character - NO<br>Account history directory - ahdi - 1 character - NO<br>Account history file - ahfi - 80 character - NO<br>Forecast base - fcst_bs - 30 character - YES<br>Base multiplier - bs_mlt - 6.2 Num - YES<br>Indirect account - id_act - 30 character - YES<br>Indirect account 2 - id2_act - 30 character - YES<br>Ultimate account - ul_act - 30 character - NO<br>Acct number equivalent - acne - 30 character - NO<br>acne alternate location - acnl - 50 character - YES<br>Acct description equivalent - acde - 30 char - NO<br>acde alternate location - acdl - 50 character - YES<br>Acct type equivalent - acte - 30 character - NO<br>acte alternate location - actl - 50 character - YES<br>Normal balance equiv - sgne - 2 character - NO<br>sgne alternate location - sgnl - 50 character - YES<br>Recurring amount equiv - rec - 30 character - YES<br>rece alternate location - recl - 50 character - YES<br>Paymnt frequency equivalent - frqe - 1 char - YES<br>frqe alternate location - frql - 50 character - YES<br>Payment date equivalent - pdte - date - YES<br>pdte alternate location - pdtl - 50 character - YES<br>Posts-to equivalent - pste - 1 character - NO<br>pste alternate location - pstl - 50 character - YES |

Note: repeated for all data and master tables

If all the required data dictionary and data source mapping information has not been stored for the specified data source in tables 193 and 194, then the software in block 102 will transfer processing to a block 104 which will determine the next step in data processing. If the data source is user input or files, then the software in block 104 will transfer processing to a block 103 where the user is prompted to provide the appropriate data dictionary and data source mapping information. After the software in block 103 receives the required input from the user, processing advances to a block 109 where the software in the block confirms that all required information has been stored in the appropriate tables (193 & 194) in the application database 90. Alternatively, if the data source is a basic financial system database 95, then the software in block 104 directs processing to the software in a block 105 that determines if user input is required to establish a connection with the basic financial system database 95. If user input is required, then the user 60 is prompted by the software in a block 107 to provide the additional information that is required for the application software of the present invention to establish a connection with the database of the basic financial system 95. For example, the basic financial system database 95 may have security protection features that require the user to enter a specific password before access to the database 95 is enabled. Once the user 60 enters the required information to the application software in block 107, the software in a block 108 establishes a connection with the basic financial system database 95. If no user input is required to establish the connection with the basic financial system database 95, then processing passes directly from block 105 to block 108 where the connection is established. In either case, once the connection with the basic financial system database 95 has been established by the software in block 108, processing transfers to block 109 which checks the application database 90 to see that all required data dictionary and data source mapping information has been stored in tables 193 and 194.

If the data dictionary 193 and data source mapping table 194 have previously been established for the appropriate data source, then the software in block 102 will transfer processing to a block 106 where the software in the block determines the next step in the processing. If the data source is the basic financial system database 95, then the software in block 106 transfers processing to block 105 where the software in the block checks to see if user input is required to establish the database connection. If user input is required, then the user 60 is prompted by the software in block 107 to enter the additional information that is required for the application software of the present invention to establish a connection with the database of the basic financial system 95. After the required user input has been accepted by the software in block 107, the processing passes to block 108 where the connection with the basic financial system database 95 is established. If user input isn't required for establishing the connection, then processing proceeds directly from block 105 to block 108. Once the connection to the database 95 has been established by the software in block 108, the processing proceeds to block 109 where the software in that block checks to see that all the required information is present in the data dictionary table 193 and the data mapping table 194.

If the software in block 109 determines that all the required information in tables 193 and 194 isn't present, then processing is transferred to block 103 where the user is prompted to provide the missing information. Additional user input will be required even after the database connection has been made and the data dictionary and data mapping tables are in place, when the basic financial system database 95 doesn't contain all the information required for operation of the application software of the present invention. In this instance, the user 60 is prompted by the software in block 103 to define the necessary transactions and/or balances or to map the required data from existing files or provide manual input that provides the required information.

The specific prompts that the user 60 receives from the software in block 103 regarding the data dictionary, file mapping and field mapping depends on the data source that was selected by the user 60 and stored by the software in block 100 in the system setting file 160. For example, if the user 60 has previously chosen the data source "user input" (data source value 'u'), the software in block 103 highlights the menu option that accesses the data input screens while disabling the other menu options. If the user 60 has previously chosen the data source "files" (data source value 'f'), then the software in block 103 prompts the user 60 for the location, name and type of file or table to be used as the source for data to update the system data tables. The user 60 will be further prompted to map the fields from each source file or table to the required fields within the tables contained in application database 90. The user 60 will also be prompted to provide the transaction and balance definitions required by the data dictionary 193. These data are then saved in the data source mapping table 194 and data dictionary table 193. Finally, if the data source is the company "basic financial system database" (data source value 'b'), then the software in block 103 will prompt the user 60 to map the required data dictionary transaction and balance definitions from the basic financial system data dictionary and to map the files and fields of the basic financial system database 95 to the required tables and fields within the application database 90.

In all the cases described in the preceding paragraph, the user 60 is asked to specify the file(s) or tables and fields where the system will later obtain data related to the following types of information: accounts, vendors, items, currencies, units of measure, customers, unit of measure schedules, customer groups, item-vendor relationships, account history, account balances, accounts receivable history, accounts receivable balances, inventory history, inventory balances, payroll, open (purchasing and/or manufacturing) order balances, sales history, sales order balances, vendor business-volume item price schedules, business volume discount schedules and vendor item price schedules. The system in accordance with the present invention will later extract and store the required data and information within the application database 90 in a separate table for each area identified above as shown in FIG. 4. In the preferred embodiment of the present invention, the data source is the basic financial system database 95.

In the next processing step in the present invention, the software in a block 110 prompts the user 60 to determine if there are any changes that need to be made to the current data mapping specification. This step has been provided to allow the user 60 to update the data mapping information as required for each forecast calculation. If the user chooses to change the data mapping, then processing returns to block 103 and the processing described in the preceding paragraphs is repeated. If the user doesn't choose to update the current data mapping specification, the system processing advances to a block 112. The software in block 112 determines the date of the last transaction within each table in the database 90 before advancing processing to a block 111. The software in block 111 generates an informational display to the user 60. If the last transaction date in each relevant table in the application database 90 is the current date, then the display will show that the application database 90 is current while giving the user 60 the option of adding data from the alternate data sources or continuing with the processing. Alternatively, if the last date in the relevant tables in database 90 is prior to the current date, then the software in block 111 will create and display a message indicating that the database 90 is missing transactions for the date range and files indicated as shown below.

```
┌─────────────────────────────────────────────────┐
│ ■                                               │
├─────────────────────────────────────────────────┤
│                                                 │
│  WARNING: RECORDS MISSING FOR THE               │
│  FOLLOWING TABLES                               │
│                                                 │
│  Account Balance - Missing records 10/15/94     │
│  Account History - Missing records 9/28/94 to 10/15/94 │
│  Accounts Receivable Balance - Missing records 10/15/94 │
│  Accounts Receivable History - Missing records  │
│  9/28/94 to 10/15/94                            │
│  Inventory Balance - Missing records 10/15/94   │
│  Inventory History - Missing records 9/28/94 to 10/15/94 │
│  Payroll - Missing records 10/1/94 to 10/15/94  │
│  Order Balance - Missing records 10/15/94       │
│  Sales Order Balance - Missing records 10/15/94 │
│  Sales Order History - Missing records 9/28/94 to 10/15/94 │
│                                                 │
└─────────────────────────────────────────────────┘

In the situation shown above, the user 60 will not be given the option of continuing the processing until all of the tables that require new data have been updated or the skip-update boxes next to each table warning message (not shown) have been marked by the user 60 indicating that it is acceptable to proceed with processing without updating that particular table.

In the preferred embodiment of the present invention, the data source is the basic financial system database 95. After the software in a block 113 receives the user's input regarding the range of dates that are to be loaded processing advances to a block 114. The software in block 114 loads data in accordance with the previously established mapping criteria (stored in table 194) to the appropriate files in the application database 90. The tables in the database 90 that are updated by this process are an account master table (151), a vendor master table (152), an item master table (153), a currency master table (154), a unit of measure master table (155), a customer master table (156), a unit of measure schedule table (157), a customer group master table (158), an item vendor master table (159), an account history table (170), an account balance table (171), an accounts receivable history table (172), an accounts receivable balance table (173), an inventory history table (174), an inventory balance table (175), a payroll table (176), an open order balance table (177), a sales history table (178), a sales order balance table (179), a vendor business volume item price schedule table (190), a vendor item price schedule table (191), a business volume time period table (202) and a business volume master discount schedule (203). These tables are split in to two groups, master tables and data tables as shown in Table 29.

TABLE 29

| Master Tables | Table Numbers |
|---|---|
| Account Master, Vendor Master, Item Master, Currency Master, Unit of Measure Master, Customer Master, Unit of Measure Schedule Master, Customer Group Master, Item Vendor Master | 151, 152, 153, 154, 155, 156, 157, 158, 159 |

| Data Tables | Table Numbers |
|---|---|
| Account History, | 170, 171, 172, 173, 174, 175, 176, 177, 178, |

TABLE 29-continued

| | |
|---|---|
| Account Balance, Accounts Receivable History, Accounts Receivable Balance, Inventory History, Inventory Balance, Payroll, Open Order Balance, Sales History, Sales Order Balance, Vendor Business Volume Item Price Schedules, Vendor Item Price Schedules, Business Volume Time Period, Business Volume Master Discount | 179, 190, 191, 202, 203 |

The structure of these tables in the preferred embodiment of the present invention are outlined below.

Master Tables

Tables 30(151) & 31(152)

Account Master (151) - Variable Name
Variable - length & data type - null values?

Account number - act_num - 30 character - NO
Account description - act_dsc - 30 character - NO
Account type - act_type - 1 character - NO
Normal balance - act_sgn - 1 character - NO
Forecast base - fcst_bs - 30 character - YES
Base multiplier - bs_mit - 6.2 Num - YES
Forecast algorithm - falg - integer - YES
Indirect account - id_act - 30 character - YES
Indirect account 2 - id2_act - 30 character - YES
Ultimate account - ul_act - 30 character - NO
Recurring amount - recur - 1 character - YES
Payment frequency - freq - 1 character - YES
Payment data - pay_dt - integer - YES
Posts to - post - 1 character - NO Vendor Master (152) - Variable Name
Variable - length & data type - null values?

Vendor ID - vndr - 15 character - NO
Vendor description - vnd_dsc - 30 character - NO
Discount type - disc - 1 character - NO
Order frequency - freq - 1 character - NO
Maximum annual volume - max - 15.2 Num - YES Tables 32(153) & 33(154)

Item Master (153) - Variable Name
Variable - length & data type - null values?

Item number - itm_num - 30 character - NO
Item description - itm_dsc - 15 character - NO
U of M schedule - itm_ums - 15 character - NO
Vendor substitution - itm_sub - 1 character - YES
U of M substitution - um_sub - 1 character - YES
Forecast vendor - fc_vnd - 30 character - NO
Forecast U of M - fc_um - 15 character - NO
Forecast algorithm - italg - integer - NO
Target fill rate % - tgt_fil - 6.2 Num - YES
Max margin loss - mx_ls - 15.2 Num - YES
Price source - prc_src - 1 character - YES
Base item - bas_itm - 30 character - YES
Base multiplier - bas_mit - 6.2 Num - YES
Dependent - dpnd - 1 character - YES
Date available - adate - date - YES
Date obsolete - odate - date - YES

Tables 32(153) & 33(154)

Successor item - nw_itm - 30 character - YES
Inventory account - inv_act - 30 character - YES
Sales account - sal_act - 30 character - YES
Obsolescence risk - ob_rsk - 1 character - NO
Split order UM - split - 1 character - YES
Current forecast date - cfdate - date - YES
Current forecast scenario - scen - 30 char - YES
Forecast unit price - price - 15.2 Num - YES
Commitment percent - comt - 6.3 Num - YES
Reorder point - rord - 15.2 Num - YES Currency Master (154) - Variable Name
Variable - length & data type - null values?

Currency - cur - 30 character - NO
Base currency - bas_cur - 30 character - NO
Default multiplier - def - 15.3 Num - NO
Period 1 multiplier - pd1 - 15.3 Num - YES
Period 2 multiplier - pd2 - 15.3 Num - YES
Period 3 multiplier - pd3 - 15.3 Num - YES
Period 4 multiplier - pd4 - 15.3 Num - YES
Period 5 multiplier - pd5 - 15.3 Num - YES
Period 6 multiplier - pd6 - 15.3 Num - YES
Period 7 multiplier - pd7 - 15.3 Num - YES
Period 8 multiplier - pd8 - 15.3 Num - YES
Period 9 multiplier - pd9 - 15.3 Num - YES
Period 10 multiplier - pd10 - 15.3 Num - YES
Period 11 multiplier - pd11 - 15.3 Num - YES
Period 12 multiplier - pd12 - 15.3 Num - YES
Period 13 multiplier - pd13 - 15.3 Num - YES
Period 14 multiplier - pd14 - 15.3 Num - YES
Period 15 multiplier - pd15 - 15.3 Num - YES
Period 16 multiplier - pd16 - 15.3 Num - YES
Period 17 multiplier - pd17 - 15.3 Num - YES
Period 18 multiplier - pd18 - 15.3 Num - YES
Period 19 multiplier - pd19 - 15.3 Num - YES
Period 20 multiplier - pd20 - 15.3 Num - YES
Period 21 multiplier - pd21 - 15.3 Num - YES
through
Period 78 multiplier - pd78 - 15.3 Num - YES

Tables 34(155) & 35(156)

U of M Master (155) - Variable Name
Variable - length & data type - null values?

Unit of measure - um - 15 character - NO
Base U of M - base_um - 15 character - NO
Quantity base U of M - qty - 15.2 Num - NO Customer Master (156) - Variable Name
Variable - length & data type - nullvalues?

Customer ID - cust_id - 30 character - NO
Customer description - cd - 30 character - YES
Customer group - c_grp - 15 character - YES

Tables 36(157) & 37(158)

U of M Sched Master (157) - Variable Name
Variable - length & data type - null values?

U of M schedule - um_sch - 15 character - NO
U of M - um - 30 character - NO

Customer Group Master (158) - Variable Nm
Variable - length & data type - null values?

Customer group - cust_grp - 15 character - YES
Group description - gdsc - 30 character - YES
Forecast algorithm - calgo - integer - YES
Group set by - grp_set - 1 character - YES

TABLE 38(159)

Item Vendor Master (159) - Variable Name
Variable - length & data type - null values?

Item number - itm_num - 30 character - NO
Vendor id - vendor - 30 character - NO

Data Tables

Tables 39(170) & 40(171)

Account History (170) - Variable Name
Variable - length & data type - null values?

Account number - act_num - 30 character - NO
Transaction ID - tran_id - 30 character - NO
Transaction amount - tran_amt - 15.2 Num - NO
Transaction type - tran_typ - 1 character - NO
Transaction date - tran_dat - date - NO Account Balance (171) - Variable Name
Variable - length & data type - null values?

Account number - act_num - 30 character - NO
Account balance - act_bal - 15.2 Num - NO
Balance type - bal_typ - 1 character - NO
Balance date - bal_dat - date - NO

Tables 41(172) & 42(173)

A/R History (172) - Variable Name
Variable - length & data type - null values?

Customer ID - cust_id - 30 character - NO
Transaction ID - tran_id - 30 character - NO
Transaction amount - tran_amt - 15.2 Num - NO
Transaction type - tran_typ - 1 character - NO
Transaction date - tran_dat - date - NO A/R Balance (173) - Variable Name
Variable - length & data type - null values?

Customer ID - cust_id - 30 character - NO
Balance - ar_bal - 15.2 Num - NO
Balance type - bal_typ - 1 character - NO
Balance date - bal_dat - date - NO

Tables 43(174) & 44(175)

Inventory History (174) - Variable Name
Variable - length & data type - null values?

Item Number - itm_num - 30 character - NO
Transaction ID - tran_id - 30 character - NO
Transaction qty - tran_qty - 15.2 Num - NO
Transaction type - tran_typ - 1 character - NO
Transaction date - tran_dat - date - NO Inventory Balance (175) - Variable Name
Variable - length & data type - null values?

Item number - itm_num - 30 character - NO
On hand balance - oh_bal - 15.2 Num - NO
Available balance - avail - 15.2 Num - YES
Balance date - bal_dat - date - NO

| Tables 45(176) & 46(177) |
| --- |
| Payroll (176) - Variable Name<br>Variable - length & data type - null values? |
| Emplyee ID - emp_id - 30 character - NO<br>Pay Type - p_t - 1 character - NO<br>Pay Frequency - p_f - 1 character - NO<br>Pay Amount - p_a - 15.2 Num - NO<br>401K match - match - 1 character - YES<br>Match percentage - mpct - 6.3 Num - YES |
| Open Order Balance (177) - Variable Name<br>Variable - length & data type - null values? |
| Order Number - o_num - 30 character - NO<br>Order Quantity - o_qty - 15.2 Num - NO<br>Order Amount - o_amt - 15.2 Num - YES<br>Order Setup - o_st - 15.2 Num - YES<br>Order Type - o_typ - 1 character - NO<br>Due Date - due_dat - Date - NO |

| Tables 47(178) & 48(179) |
| --- |
| Sales History (178) - Variable Name<br>Variable - length & data type - null values? |
| Order number - ord_num - 30 character - NO<br>Ship date - sdate - Date - NO<br>Customer ID - cust_id - 30 character - NO<br>Quantity - sord_qty - 15.2 Num - NO<br>Extended price - ext_prc - 15.2 Num - NO |
| Sales Order Balance (179) - Variable Name<br>Variable - length & data type - null values? |
| Order number - ord_num - 30 character - NO<br>Promise date - pdate - Date - NO<br>Customer ID - cust_id - 30 character - YES<br>Quantity - sord_qty - 15.2 Num - NO<br>Extended price - ext_prc - 15.2 Num - NO |

| Tables 49(190) & 50(191) |
| --- |
| B-Volume Item Price (190) - Variable Name<br>Variable - length & data type - null values? |
| Vendor ID - ven - 30 character - NO<br>Schedule type - type - 1 character - NO<br>Item number - item - 30 character - NO<br>Unit of Measure - um - 30 character - NO<br>Quantity minimum - qty_min - 15.2 Num - NO<br>Quantity maximum - qty_max - 15.2 Num - NO<br>Unit price - uprice - 15.3 Num - NO |
| Item Price Schedules (191) - Variable Name<br>Variable - length & data type - null values? |
| Vendor ID - ven - 30 character - NO<br>Schedule type - type - 1 character - NO<br>Item number - item - 30 character - NO<br>Unit of Measure - um - 30 character - NO<br>Quantity minimum - qty_min - 15.2 Num - NO<br>Quantity maximum - qty_max - 15.2 Num - NO<br>Unit price - uprice - 15.3 Num - NO |

| Tables 51(202) & 52(203) |
| --- |
| Business Volume Time (202) - Variable Name<br>Variable - length & data type - null values? |
| Start date - start - date - NO |
| End date - end - date - NO |
| B Vol Master Discount (203) - Variable Name<br>Variable - length & data type - null values? |
| Vendor ID - ven - 30 character - NO<br>Level number - lvl - integer - NO<br>Currency minimum - cur_min - 15.2 Num - NO<br>Currency maximum - cur_max - 15.2 Num - NO<br>Discount percentage - disc - 6.3 Num - NO |

Once the master tables and the data tables have been updated with the required information, system processing in accordance with the present invention continues to a software block 115 where the master tables are compared to the data tables to determine if any new master table records need to be added. If it is determined by the software in block 115 that new records need to be added, then processing passes to a block 117 where the user is prompted to enter data for each new master table record. The software in block 115 also checks the item and business volume price tables to see if there are established prices for all items. If there are items without item or business volume price schedules, the user will be prompted by the software in block 117 to enter the required price information.

After the software in block 117 receives the required input from the user 60 concerning the master table and price table records, the information is stored in the application database 90 and processing proceeds to a block 118 where the sales and cash receipt forecast is started with the transfer of processing to a block 299 in the inventory replenishment subsystem. Alternatively, if no new master table or price table records were detected by the software in block 115 then processing proceeds directly to block 118 without proceeding through block 117.

Inventory Replenishment Subsystem—Sales
Forecast by Item

The inventory replenishment subsystem 75 (FIG. 2) is the first subsystem accessed as part of the overall forecast calculation. Processing starts in block 299 (FIG. 5) which transfers processing to a block 300 where the software in that block checks the scenario control table 197 to determine if the application database needs to be filtered by department, location, account or planner in order to restrict processing. If filters need to be added the software in block 300 adds them to the application database 90 and processing advances to a block 301. The software in block 301 checks the item forecast table 182 in the application database 90 to see if it contains a volume forecast for all independent items that was completed within the time period defined as acceptable. The oldest acceptable forecast date is the current system date less the maximum forecast age specified by the user 60 in the system setting table 160. Forecasts that have been completed within the acceptable date and time range using the currently designated scenario are defined as current. Forecasts with a different scenario and/or with a forecast date prior to the oldest acceptable date are non-current. This definition of current will be applied in all subsequent discussions of system operation.

The independence of an item is defined by the user 60 when setting the value for the variable 'dpnd' for each item. The value of this variable for each item is stored in the item master table 153. The unit volume or sales forecast for an independent item is created using only the prior history of the base item. In most cases, the base item is the item being forecast. Dependent items are those where the forecast of future demand is a function of the future demand forecast for another item. The history transactions used as the basis for calculating the forecasts for independent items are obtained from either the inventory history table 174 or the sales history table 178. The value of the 'itm_src' variable in the system setting table 160 determines which table is used as the source for historical data in the forecast calculation. The data dictionary table 193 is used to convert each stored transaction type to a type recognized by the application software of the present invention. If there are independent items in the item forecast table 182 in the application database 90 with forecasts that aren't current (as defined above), then processing transfers to a block 304 where the first item found with a non-current forecast date is retrieved. The software in a block 307 then checks the item to ensure that it is independent. If the item is a dependent item, then processing returns to block 304 where another item is retrieved.

If the item retrieved by the software in block 304 is independent, then processing advances to a block 309 where the software in the block checks to see if the unit price needs to be forecast. The value of the 'prc_src' (price source) variable stored in the item master table 153 for the item being forecast determines the next step in processing. The five (5) possible values for 'prc_src' correspond to list or current price ('c'), three-period average price ('t'), six-period average price ('s'), one year average price ('a') and forecast unit price ('f').

If a forecast of unit price is required for the item being forecast ('prc_src'='f'), then processing is transferred to a block 310. The software in this block obtains the historical data for the item being forecast from the sales history table 178 in the application database 90. It uses this information to determine the historical trend in average period price for the item being forecast. The average period unit price for each prior period is determined by dividing the period revenue for the item by the period volume for the item. Forecasts of average unit price for the base period are then calculated using this information together with the 32 different algorithms listed in Table 12. The accuracy of each forecast in predicting the actual unit price level and trend during the base period is then assessed using the formulas detailed previously. The three forecasts that have the lowest error in predicting the period unit prices and the unit price trend during the base period are then combined to form a multivalent forecast of prices for the base period and the forecast time period using the weightings shown in Table 13. The resulting base period forecast is then compared to the actual average unit prices for the base period and the error of the forecast is calculated using the same procedure described previously for evaluating the 32 original forecasts. If the base period forecast has a high error level then the software in block 310 will use the current unit price as the forecast unit price and flag the unit price forecast for later review. A high error level is defined as having a combined magnitude and trend error greater than or equal to 0.3 or two times the error of the single best fit algorithm (which ever is less). This definition of a high error level will be applied in all subsequent discussions of system operation. The forecast will also be flagged for review if the percentage of periods without any history exceeds the user defined percentage (variable 'ndat') in the system settings table 160. Sufficient accuracy is defined by the value of the price accuracy variable ('pacc') in the system setting table 160. The percentage difference between the forecast total and actual total is defined as:

$$\sum_{i=1}^{n} (\text{period } i \text{ forecast} - \text{period } i \text{ actual})/(\text{period } i \text{ actual})/n$$

Where: n=number of periods

If the percentage of forecast accuracy falls below the previously designated price accuracy percentage ('pacc' in the system setting table 160), the forecast will be flagged for later review. This calculation will be completed for all subsequent forecasts with the only difference being that the other forecasts will utilize the user defined accuracy percentage for item volume or dollar forecasts as appropriate. This same general procedure is used for evaluating all forecasts made by the application software of the present invention.

After the software in block 310 completes the review of the base period forecast accuracy, the unit price forecast covering the forecast time period is saved in the item unit price forecast table 183 in the application database. The value of the source variable ('srce') is set to equal the current value of the price source variable ('prc_src'). After the unit price forecast for the forecast time period has been stored in an item unit price forecast table 183 in the application database 90, processing advances to a block 312.

If a forecast of unit price isn't required ('prc_src'='c', 't', 's' or 'a'), then processing advances from block 309 to a block 311 where the software in the block obtains the historical data for the item being forecast from the sales history table 178 in the application database 90. It uses this information to determine the historical trend in average period price for the item being forecast. The average period unit price for each prior period is determined by dividing the period revenue for the item by the period volume for the item. Using this information, the software in block 311 determines the average price during the last one, three or six periods or the last year as required to provide the specified price for product revenue forecasts. The calculated unit price for the forecast time period is saved in the item unit price forecast table 183 in the application database. The value of the source variable ('srce') is set to equal the current value of the price source variable ('prc_src'). After the calculated unit price has been stored in an item unit price forecast table 183 in the application database 90, processing advances to block 312.

The software in block 312 completes forecasts of item demand for the base period using the specified historical information together with the 32 different algorithms listed in Table 12. The accuracy of each forecast in predicting the actual unit volume and the volume trend during the base period is then assessed using the formulas detailed previously. The three forecasts that have the lowest calculated error in predicting the period unit volume and the volume trend during the base period are then combined to calculate a multivalent forecast of base period and forecast time period volume using the weightings shown in Table 13. If the item is slated for obsolescence during the forecast time period, then the forecast demand for the item drops to zero on the specified date and the balance of the forecast after that date is transferred to the successor item. The resulting base period forecast is then compared to the actual demand during the base period and the error of the forecast is calculated using the same procedure described previously for evaluating the 32 original forecasts. If the relevant prior history doesn't provide enough information to create a reliable forecast or if the base period forecast differs significantly from the base period actual results (error is high)

then the software in block 312 will flag the forecast for review. The forecast will also be flagged for later review if the percentage of forecast accuracy falls below the previously designated volume accuracy percentage ('vacc' in the system setting table 160). The multivalent forecast covering the forecast time period and the related TVO variable are stored in an item forecast table 182 in the application database 90. After the unit volume forecast has been stored in the application database 90, processing returns to block 301 where the software in the block again checks the database to see if all independent items have current forecasts. If there are still items without current forecasts, then the processing described above is repeated until all independent items have current forecasts.

If on the other hand, the software in block 301 determines that there are current forecasts for all independent items, then processing is transferred to a block 302 where the software in that block sets a filter for dependent items and then indexes the item master table 153 in the application database 90 on base item number. Processing passes to a block 303 where the software in that block retrieves the first dependent item from the application database 90. Processing then advances to a block 305 where the software in the block checks the item to see if a unit price forecast is required. The unit price for dependent items is assumed to be independent of the unit price for the base item. As with independent items, the value of the price source ('prc_src') variable stored in the item master table 153 for the item being forecast determines the next step in processing. The 5 possible values for 'prc_src' are identical to those described previously for independent items. If a unit price forecast is required then the procedure described previously for unit price forecasts is repeated and the three forecasts that have the lowest error in predicting the period unit prices and the unit price trend during the base period are combined to form a multivalent forecast of prices in the base period and the forecast time period. The resulting base period forecast is then compared to the actual average unit prices for the base period and the error of the multivalent forecast is calculated using the same procedure described previously for evaluating the 32 original forecasts. If the base period forecast has a high error level then the software in block 310 will use the current unit price as the forecast unit price and flag the forecast for later review. If the percentage of periods without any history exceeds the user-defined percentage (variable 'ndat') in the system settings table 160, then the software in block 310 will use the current unit price as the forecast unit price and flag the item forecast for later review. The forecast will also be flagged for later review if the percentage of forecast accuracy falls below the previously designated unit price accuracy percentage ('pacc' in the system setting table 160). The unit price forecast for the forecast time period is stored in item unit price forecast table 183 in the application database 90 and processing advances to a block 313 where the forecast of unit volume for the dependent items is calculated.

If a forecast of unit price isn't required ('prc_src'='c', 't', 's' or 'a'), then processing advances from block 305 to a block 308 where the software in the block obtains the historical data for the item being forecast from the sales history table 178 in the application database 90. It uses this information to determine the historical trend in average period price for the item being forecast. The average period unit price for each prior period is determined by dividing the period revenue for the item by the period volume for the item. Using this information, the software in block 308 determines the average price during the last one, three or six periods or the last year as required to provide the specified price for product revenue forecasts. The calculated unit price for the forecast time period is saved in the item unit price forecast table 183 in the application database. The value of the source variable ('srce') is set to equal the current value of the price source variable ('prc_src'). After the calculated unit price has been stored in an item unit price forecast table 183 in the application database 90, processing advances to block 313.

The software in block 313 completes forecasts of item demand for the base period using the appropriate base item forecast information together with the 32 different algorithms listed in Table 12. The accuracy of each forecast in predicting the actual unit volume and the volume trend during the base period is then assessed using the formulas detailed previously. The three forecasts that have the lowest error in predicting the period unit volume and the volume trend as a function forecast demand for the base item during the base period are then combined to form a multivalent forecast of base period and forecast time period volume using the weightings shown in Table 13. If the item is slated for obsolescence during the forecast time period, then the forecast demand for the item drops to zero on the specified date and the balance of the forecast after that date is transferred to the successor item. The base period forecast is then compared to the actual demand during the base period and the error of the multivalent forecast is calculated using the same procedure described previously for evaluating the 32 original forecasts. If the relevant prior history doesn't provide enough information to create a reliable forecast or if the base period forecast differs significantly from the base period actual results (error is high) then the software in block 313 will flag the stored account forecast for review. The forecast is flagged for review by setting the review variable to 'y' for yes. The forecast will also be flagged for later review if the percentage of forecast accuracy falls below the volume accuracy percentage ('vacc') specified in the system setting table 160. The forecast covering the forecast time period is then stored in the item forecast table 182 in the application database 90 along with the relevant TVO variable.

After the unit volume forecast has been stored, processing continues on to a block 314 where the software in that block checks the item forecast table 182 to see if there is a current forecast for every dependent item. If there are still items that require a new forecast, then processing is transferred back to block 303 where the next item is retrieved and the process described above is repeated. If on the other hand all dependent items have current forecasts, then processing advances to a block 316 where the database filter for dependent items is removed and item unit volume forecasts stored in table 182 are multiplied by the unit prices stored in the unit price forecast table 183 to create a product revenue forecast for all items. The resulting forecast is stored in the application database 90 in a product revenue forecast table 184. The structure of the three tables related to item forecasts are shown below in Tables 53, 54 and 55.

TABLES 53 (182) & 54 (184)

Item Forecast (i 82) -Variable Name
Variable - length & data type - null values?

Item number - itm_num_30 character - NO
Forecast date - fc_dat - date - NO
Scenario - scen - 30 character - NO
Review - flag - 1 character - NO
Unit of measure - fum - 30 character - No

TABLES 53 (182) & 54 (184)-continued

Item TVO - itvo - 6.3 Num - NO
Forecast algorithm - faigo - integer - NO
Volume period 1 - v1 - integer - NO
through
Volume period 78 - v78 - integer - NO Product Revenue F'cast (1 84)-Variable Name
Variable - length & data type - null values?

Item number - itm_num - 30 character - NO
Forecast date - fc_date - date - NO
Scenario - scen - 30 character - NO
Review - flag - 1 character - NO
Unit price source - ups - 1 character - No
Revenue period 1 - r1 - 15.2 Num - NO
Revenue period 2 - r2 - 15.2 Num - NO
Revenue period 3 - r3 - 15.2 Num - NO
through
Revenue period 78 - r78 - 15.2 Num - NO

TABLE 55 (183)

Item Unit Price F'cast (183) - Variable Name
Variable - length & data type - null values?

Item number - ltm num - 30 character - NO
Forecast date - fc_dat - date - NO
Scenario - scen - 30 character - NO
Review - flag - 1 character - NO
Vendor - up_ven - 30 character - NO
Source - srce - I character - NO
Unit price period 1 - pl - integer - NO
through
Unit price period 78 - p78 - integer - NO After the storage of the item forecast is complete processing continues to a block 323 which transfers processing to a transfer block 351 in the customer payment analysis subsystem 76.

It is worth noting at this point that the sales forecast by item is assumed (by default) to be a forecast of only a portion of the revenue that the commercial enterprise will realize in any given period. It is common for commercial enterprises to sell both products and services. If this is the case, then the product revenue forecast calculated previously would include only a portion of the revenue in any period. If the current forecast sequence is being completed for a company, division or department that sells only products, then the user can designate the current scenario as a product only forecast. Specifying the current scenario as a product only forecast has three effects on system processing:

1. The sales forecast by item can be used as the controlling forecast;

2. The composite sales forecast is derived from a multi-valent combination of the sales forecasts by account, by customer group and by item rather than from a combination of only the sales forecasts by account and customer group; and 3. The sequence of steps in the financial forecast subsystem change as required to accommodate the previous changes.

These changes to system processing will be discussed in more detail in the appropriate sections of the detailed description.

Customer Payment Analysis Subsystem—Sales and Cash Receipt Forecast by Customer Group The software in the customer payment analysis subsystem 76 (FIG. 2) completes the forecast of sales and cash receipts one customer group at a time. The first step in completing the forecast of sales and cash receipts by customer group is completed by the software in a processing block 352 which determines if the user 60 has previously assigned a customer group to all customers. If the user 60 hasn't assigned any customer groups, then the software in block 352 transfers processing to a block 353 which creates customer groupings based on the longevity of the customer's association with the company and the frequency of the customer's purchase of goods and services. The software in block 353 assigns each customer to a group based on the customer's order frequency and first purchase date in a manner similar to that shown in Table 56.

TABLE 56

Customer Groups

| order % months | 76–100% | 51–76% | 26–50% | 1–25% | In-active |
|---|---|---|---|---|---|
| first purchase date: | | | | | |
| >5 years ago | A1 | B1 | C1 | D1 | E1 |
| >4 years ago | A2 | B2 | C2 | D2 | E2 |
| >3 years ago | A3 | B3 | C3 | D3 | E3 |
| >2 years ago | A4 | B4 | C4 | D4 | E4 |
| >1 year ago | A5 | B5 | C5 | D5 | E5 |
| 11 months ago | A6 | B6 | C6 | D6 | |
| 10 months ago | A7 | B7 | C7 | D7 | |
| 9 months ago | A8 | B8 | C8 | D8 | |
| 8 months ago | A9 | B9 | C9 | D9 | |
| 7 months ago | A10 | B10 | C10 | D10 | |
| 6 months ago | A11 | B11 | C11 | D11 | |
| 5 months ago | A12 | B12 | C12 | D12 | |
| 4 months ago | A13 | B13 | C13 | D13 | |
| 3 months ago | A14 | B14 | C14 | | |
| 2 months ago | A15 | B15 | | | |
| 1 month ago | A16 | B16 | | | |
| New this month | A17 | | | | |

The number of categories is set by the software in block 353 to 170 with 10 order frequency divisions (0–10%, 11–20%, 21–30% etc,) with 17 time period groups (as shown above) using the current system date as the reference date. It is possible to have the number of categories dynamically determined by the software in block 353 but that option was not included in the preferred embodiment. The customer groupings established by the software in block 353 are then saved to the customer group master file 158 and the group set by variable ('grp_set') is set to 's' to signify that the system established the customer groups. Processing then advances to a block 356 where each customer is assigned to a group based on its longevity and order frequency history. The customer master file 156 is modified to reflect the newly assigned customer groups. Processing then advances to a block 357 where a forecast of new customer additions is completed.

If the user had previously defined customer groups, then the processing in the present invention follows a different path between blocks 352 and 357. If the software in block 352 determines that the user has previously set customer groups, then processing is advanced to a block 355 where the software in the block checks the customer master table 156 in the application database 90 to see if customer groups have been assigned to all customers. If customer groups have been assigned to all customers, then processing advances from block 355 to block 357. Alternatively, if customer groups haven't been assigned to all customers, then processing advances to a block 354 where the user 60 is prompted to assign customer groups to the remaining customers. The user's input is stored in the application database and processing returns to block 352. Processing returns to block 352 at this point to provide for the possibility that the user may have deleted the previous customer group assignments choosing instead to let the application software of the advanced inventory management system select the customer groups. If all the customer group assignments haven't been deleted by the user 60, then processing returns to block 355 where the processing is advanced to either block 354 as described previously or to block 357 where the new customer addition forecast is calculated.

The forecast of new customer additions is completed by the software in block 357 in a manner similar to that described previously for other forecasts. Forecasts of new customer additions for the base period are created using the relevant accounts receivable history together with the 32 algorithms listed in table 12. The accounts receivable history is used to determine the historical rate of new customer addition. The accuracy of each forecast in predicting the actual number of new customers and the new customer addition trend during the base period is then assessed using the formulas detailed previously. The three forecasts that have the lowest error in predicting the number of new customer additions and the trend in new customer additions during the base period are then combined to form a multivalent forecast of customer additions for the base period and the forecast time period using the weightings shown in Table 13. The forecast covering the forecast time period is stored in the customer addition table 199 in the application database 90. The structure of table 199 is shown in Table 58.

After the storage of the new customer addition forecast is complete, processing advances to a block 358 where the software in the block checks the customer forecast table 181 in the application database 90 to see if their are current sales and cash receipt forecasts for all customer groups. If all customer groups have current sales and cash receipt forecasts, then processing is transferred to the financial forecast subsystem 77. Alternatively, if all customer groups don't have current forecasts of sales and cash receipts, then processing advances to a block 359 where the software in the block retrieves the prior period sales and accounts receivable history from tables 178 and 172 respectively for the next customer group. Processing then advances to a block 360 for the calculation of the sales forecast for the customer group being forecast.

The software in block 360 forecasts sales for each customer group for the base period using the relevant sales history together with the 32 algorithms listed in table 12. The accuracy of the 32 forecasts in predicting the actual sales and the sales trend during the base period is then assessed using the formulas detailed previously. The three forecasts that have the lowest error in predicting the sales by customer group and the sales trend during the base period are then combined to form a multivalent forecast of future sales for the base period and the forecast time period using the weightings shown in Table 13. The base period forecast is then compared to the actual rate of new customer additions during the base period and the error of the forecast is calculated using the same procedure described previously for evaluating the 32 original forecasts. As with the other forecasts, if the relevant prior history doesn't provide enough information to create a reliable forecast or if the "best fit" forecast differs significantly from prior period actual results (error is high) then the software in block 360 will flag the forecast for later review. The forecast will also be flagged for later review if the percentage of forecast accuracy falls below the previously designated currency amount accuracy percentage ('cacc' in the system setting table 160). The forecast covering the forecast time period is stored along with the relevant TVO variable in a customer forecast table 181 in the application database 90. The application software in block 360 sets the forecast type to 's' to designate the forecast as a sales forecast. The structure of the customer forecast table 181 is shown in Table 57.

TABLES 57 (181) & 58 (199)

| Customer Forecast (181) - Variable Name |
| Variable - length & data type - null values? |
| --- |
| Customer group - cs_grp - 30 character - NO |
| Forecast type - fc_typ - 1 character - NO |
| TVO - cg_tvo - 15.3 Num - NO |
| Trend - ctrend - 15.3 Num - NO |
| Forecast date - fc_date - date - NO |
| Scenario - scen - 30 character - NO |
| Forecast algorithm - calgo - integer - YES |
| Review - flag - 1 character - NO |
| Base currency amount pd 1 - c1 - integer - NO |
| through |
| Base currency amount pd 78 - c78 -integer-NO |

| New Customer Addition (199)-Variable Nm |
| Variable - length & data type - null values? |
| --- |
| Scenario - scen - 30 character - NO |
| Forecast date - fc_date - date - NO |
| New customers pd 1 - new1 - integer - NO |
| through |
| New customers pd 78 - new78 - integer - NO |

After storing the sales forecast, the cash receipt forecast is created by the software in a block 361. The forecast is completed using the accounts receivable history of the customer group and the sales history for the group to create a forecast of cash receipts for the base period as a function of the actual sales during the same time period and the periods immediately preceding the base period. The calculation of the cash receipt forecast differs from all previously described forecast calculations in two ways, first, the forecast of cash receipts for each period is based on multiples of the sales from several discrete prior periods rather than only a single prior period or the average of several prior periods and second, the forecast of cash receipts is not a multivalent forecast. The forecast of cash receipts takes the general form shown below:

$$CR_{az} = \sum_{x=1}^{x=10} (S_{z(a-x)} \times P_{z(a-x)})$$

Where:

$CR_{az}$ Cash receipts in period a from customer group z $S_{z(a-x)}$ Sales to customer group z, that were completed in the period x periods before period a $P_{z(a-x)}$ Percentage of the sales to customer group z that had been completed in the period x periods before period a that are paid in period a Because all three elements of the above equation can be calculated from the sales and accounts receivable history, the development of the cash receipt forecast entails finding the average value of $P_x$ for values of x from 1 to 10 during the base period. The values for $P_1$ to $P_{10}$ are stored in the cash receipt data table 204 in the application database 90. The forecast type is set to 'c' for a cash receipt forecast by customer group. The structure of table 204 is shown in Table 59.

TABLE 59

Cash Receipt Data (204) - Variable Name
Variable- length & data type - null values?

Forecast Type - fc_typ - 1 character - NO
Forecast Date - fc_dat - date -NO
Scenario - scen - 30 character - NO
P1 - p1 - 6.3 Num - NO
P2 - p2 - 6.3 Num - NO
P3 - p3 - 6.3 Num - NO
P4 - p4 - 6.3 Num - NO
P5 - p5 - 6.3 Num - NO
P6 - p6 - 6.3 Num - NO
P7 - p7 - 6.3 Num - NO
P8 - P8 - 6.3 Num - NO
P9 - p9 - 6.3 Num - NO
P10 - p10 - 6.3 Num - NO The base period forecasts created using the specified values of $P_1$ to $P_{10}$ are then compared to the actual cash for the customer group during the base period and the error is calculated in the same manner described previously for calculating magnitude error. The forecast of future cash receipts by customer group is then created using an algorithm in the form shown with the calculated values of $P_1$ to $P_{10}$ together with the sales forecast for the customer group that was developed in block 360. If the relevant prior history doesn't provide enough information to create a reliable forecast or if the base period forecast differs significantly from the base period actual results (error is high), then the software in block 361 will flag the customer group cash receipt forecast for later review. The forecast will also be flagged for later review if the forecast accuracy percentage falls below the currency amount accuracy percentage ('cacc') specified in the system setting table 160). The resulting cash receipt forecast is stored in file 181 for the customer group in the application database 90 along with the calculated TVO. The forecast type is set to 'c' for cash receipt forecast by the application software in block 361. The total of the sales and cash receipt forecasts by customer group are assumed to be a forecast of all sales and cash receipts for the commercial enterprise using the system.

After the cash receipt forecast is stored in the application database, processing advances to a block 362. The software in block 362 determines if the rate at which a customer group is paying its bills has deteriorated. Deteriorating rates will be detected by comparing the values of the customer group $P_1$ through $P_{10}$ variables used for the current forecast with the rates stored in table 204 from prior forecasts. If the customer group payment rate is found to be deteriorating, then the software in block 361 will flag the customer group forecast as being one that needs investigation. Unlike the previous forecasts where the review variable is set to either no ('n') or yes ('y'), the cash receipt review variable can also be set to 'r' to designate a rate problem. Highlighting decreasing customer group payment rates can help the commercial enterprise avoid extending credit to customers with a deteriorating financial condition. This precaution can save the company tremendous amounts of money by avoiding the consequent need to write off bad debts.

After determining if there has been any fall off in the rate of customer group payment, processing returns to block 358. The software in block 358 determines if all customer groups now have current sales and cash receipt forecasts. If they don't have current forecasts, then the processing described above is repeated for another customer group until all customer groups have current forecasts. When the software in block 358 determines that all customer groups have current forecasts, then processing is transferred to a block 400 in the financial forecast subsystem 77.

Financial Forecast Subsystem Sales and Cash Receipt Forecast by Account

Figure 7A:
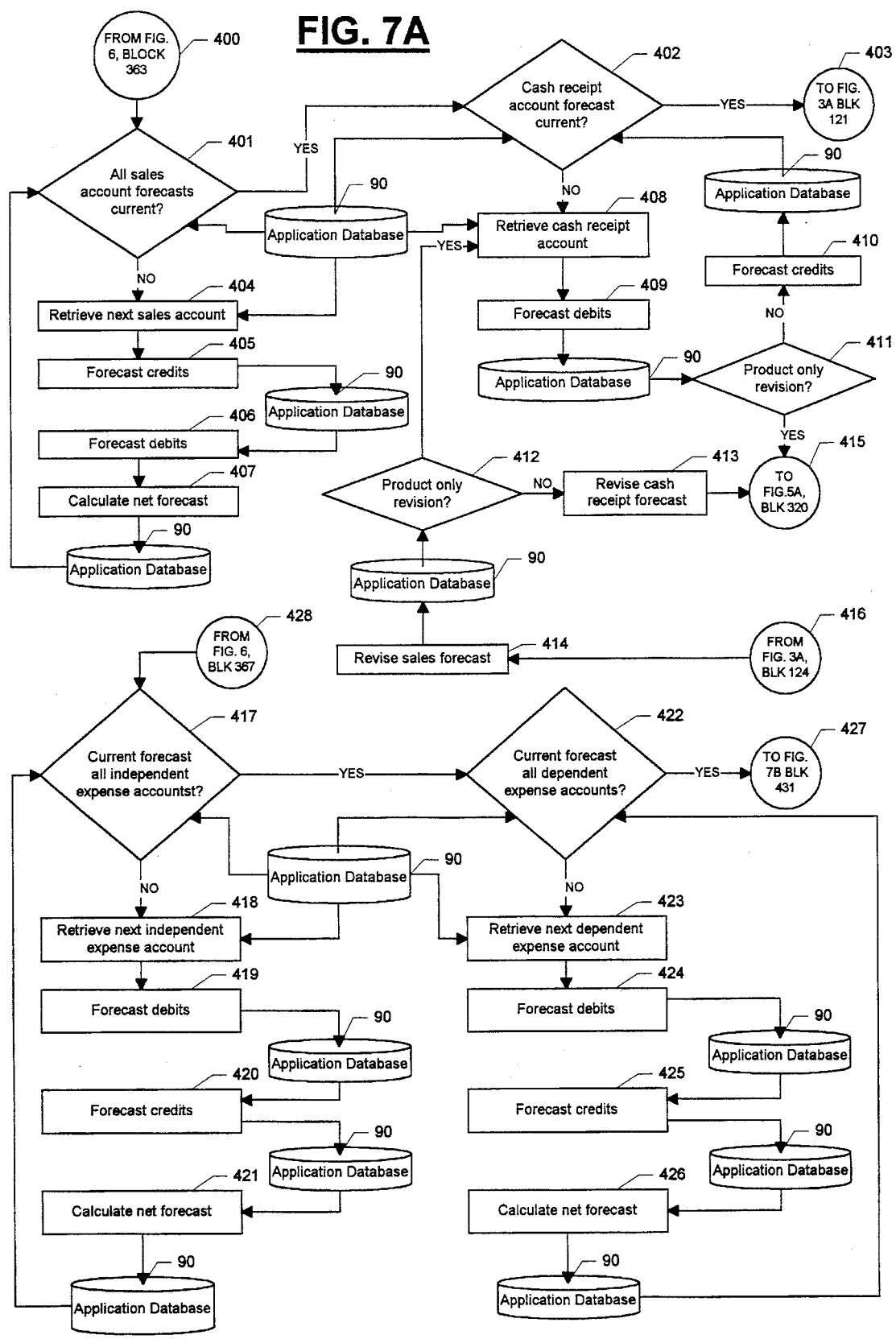
FIG. 7A and 7B are flow diagrams showing the sequence of the steps in the calculation of the financial forecast subsystem that is used for forecasting sales by account number, forecasting cash receipts by account number, forecasting expense account transaction levels, calculating balance sheet account end of period balances, calculating the account TVO variables used for determining the magnitude of account forecast adjustments during forecast synchronization and creating an overall financial forecast.
Figure 7B:
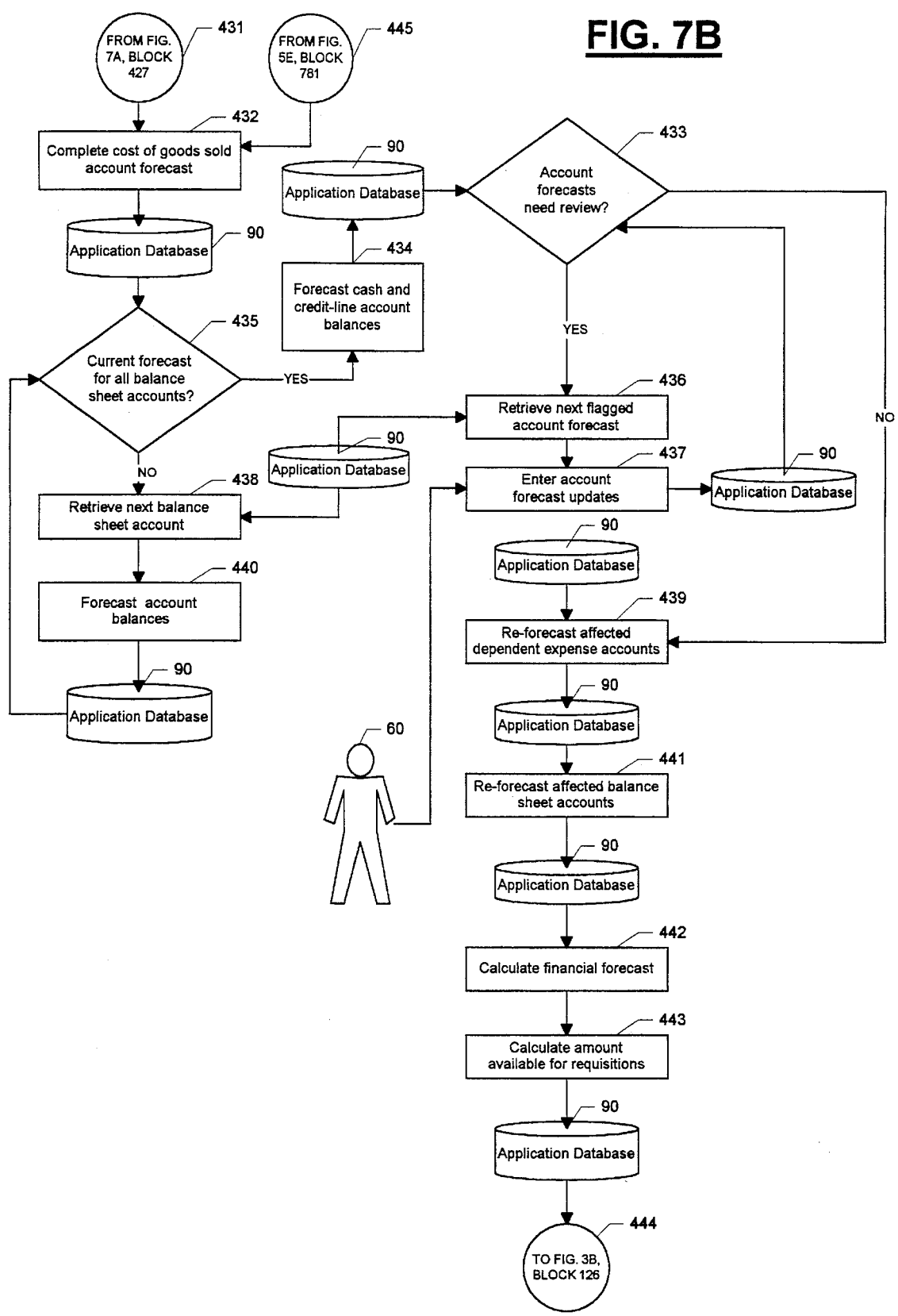

Processing in the financial forecast subsystem 77 (FIG. 2) transfers from block 400 to a block 401 (FIG. 7A) where the software in the block determines if there is a current forecast for all the sales (revenue) accounts stored in the account forecast table 180 in the application database 90. The structure of the account forecast table is shown below.

TABLE 60

Account Forecast (180) - Variable Name
Variable - length & data type - null values?

Account number - ac_num - 30 character - NO
Account type - ac_typ - 1 character - NO
Forecast type - fc_typ - 1 character - NO
Forecast date - fc_dat - date -NO
Scenario - scen - 30 character - NO
Review - flag - 1 character - NO
Account TVO - a_tvo - 15.3 Num - NO
Base currency amount pd 1 - a1 - 19.2 Num -NO
through
Base currency amount pd 78 -c78-19.2 Num-NO If there are sales accounts without current forecasts, then processing proceeds to a block 404. The software in block 404 retrieves the information for the next sales account from the account table 151 and account history table 170 in the application database 90. Each sales account forecast is created in three steps. First, the credits (sales) for each account are forecast in a block 405 then the debits (returns) are forecast in a block 406. Finally, the two independently created forecasts are then added together in a block 407 to produce a net forecast for the sales account.

The forecast of sales account credits is created in processing block 405 by using the account credit history and the algorithms specified in table 12 to create 32 different forecasts of credits (sales) for the base period. The accuracy of the 32 forecasts in predicting the actual sales and the sales trend during the base period is then assessed using the formulas detailed previously. The three forecasts that have the lowest error in predicting the sales by account and the sales trend during the base period are then combined to form a multivalent forecast of sales for the base period and the forecast time period using the weightings shown in Table 13. The base period forecast is then compared to the actual rate of new customer additions during the base period and the error of the multivalent forecast is calculated using the same procedure described previously for evaluating the 32 original forecasts. As with the other forecasts, if the relevant prior history doesn't provide enough information to create a reliable forecast or if the "best fit" forecast differs significantly from prior period actual results (error is high) then the software in block 405 will flag the forecast for later review. The forecast will also be flagged for later review if the forecast accuracy percentage falls below the currency amount accuracy percentage ('cacc') specified in the system setting table 160). The forecast covering the forecast time period is stored along with the relevant TVO variable in the account forecast file 180 in the application database 90. The account forecast type is set to 'c' at the time of storage to designate it as a credit forecast. The same process is repeated by the software in block 406 to produce the account's debit forecast. After the debit forecast is completed, processing advances to block 407 where the net sales forecast for the account is calculated by adding the credit forecast and the debit forecast together in each time period being forecast. The account forecast type for the debit forecast is set to 'd' and it is set to 'n' for the net forecast. After the debit forecast and net forecast are saved, processing returns to block 401 which again checks the account forecast table 180 in the application database 90 to see if there are any sales accounts that need new forecasts. If there are still sales accounts without current forecasts, then the process described in the preceding paragraph is repeated until all sales accounts have current forecasts.

When all sales accounts have current forecasts, processing is transferred to a block 402 which checks to see if there are current forecasts for the cash receipt account. As the name implies, the cash receipt account is the account where money received from customers is posted. Successful operation of the present invention requires the user 60 to establish a single, separate account for cash receipts if one isn't already in place. If the cash receipt account has a current forecast, then processing is transferred to a block 121 via a block 403. If the cash receipt account requires a new forecast, then processing is transferred to block 408 which retrieves the information for the cash receipt account from the account master table 151 along with the corresponding account history table 170 information. The cash receipt (debit) forecast is then created in processing block 409 using the account debit history and the sales history to create a forecast for the base period that predict cash receipts for each period in the base period as a function of current and prior period sales. The general form of the forecast that is developed is shown below.

$$CR_{ab} = \sum_{x=1}^{x=10} (S_{b(a-x)} \times P_{ba-x})$$

Where:

$CR_{ab}$ Cash receipts in period a from account b $S_{b(a-x)}$ Account b sales that were completed in the period x periods before period a $P_{b(a-x)}$ Percentage of the sales in account b that had been completed in the period x periods before period a that are paid in period a Because all three elements of the above equation can be calculated from the sales and accounts receivable history, the development of the cash receipt forecast entails finding the average value of $P_x$ for values of x from 1 to 10 during the base period. The values for $P_1$ to $P_{10}$ are stored in the cash receipt data table (204). The forecast type is set to 'a' for a cash receipt forecast by account. The base period forecasts created using the specified values of $P_1$ to $P_{10}$ are then compared to the actual cash receipts during the base period and the error is calculated in the same manner described previously for calculating magnitude error. The forecast of future cash receipts is then created using an algorithm in the form shown above with the specified values of $P_1$ to $P_{10}$ together with the sales forecasts by account that were developed in block 405. The resulting forecast is stored along with the associated TVO and forecast type variable for the debit forecast in table 180 in the application database 90. The forecast type variable ('fc_type') is used to distinguish first time cash receipt forecasts from those created as part of a revision to match a controlling item sales forecast. In this case the 'fc_type' variable would be set to 'f' for first time. If the relevant prior history doesn't provide enough information to create a reliable forecast of cash receipts or if the base period forecast differs significantly from base period actual results (error is high), then the software in block 409 will flag the account forecast for later review. The forecast will also be flagged for later review if the forecast accuracy percentage falls below the currency amount accuracy percentage ('cacc') specified in the system setting table 160). Processing then advances to a block 411 which checks the forecast type ('fc_type') variable to see if the debit forecast is a first time forecast or a product only revision forecast. In this case, 'fc_type' is set to 'f' for first time and processing would advance to a block 410 where the same forecast creation process is followed for the calculation of a credit forecast for the cash receipt account. This forecast is stored separately in the account forecast table 180 in the application database 90. The total of all sales and cash receipt forecasts by account is assumed to be a forecast of all sales and cash receipts for the commercial enterprise using the system. Processing then returns to block 402 which again checks the account forecast table 180 in the application database 90 to see if the cash receipt account needs new forecast calculations. When the forecast is completed for the cash receipt account, then processing advances to a block 121 via a block 403.

Composite Sales and Cash Receipt Forecast

System processing in the present invention advances directly from block 121 (FIG. 3A) to a block 120 where the software in the block checks the forecast tables 180, 181, 182, 183 and 184 to see if there any forecasts that require review by the user 60 before processing can continue. If there are individual sales and cash receipt forecast elements that are flagged for review, then processing is transferred to a block 122 where the software in the block will prompt the user 60 to enter the required information concerning the flagged forecasts and store the input within the appropriate table in the application database 90. Processing then advances to a block 123 where the composite sales and cash receipt forecasts are calculated. If no forecast elements have been flagged for review, then processing proceeds directly from block 120 to block 123.

The software in block 123 completes the multivalent calculation of a composite sales forecast and a composite cash receipt forecast. If the user has set the product only variable to 'yes' for the current scenario, then the composite sales forecast will be completed by using the previously calculated forecasts based on customer group buying patterns, product volume trends and the relevant account transaction histories. In the default condition (product only variable set to 'no'), the composite sales forecast will be based on previous forecasts that were created by using customer group buying patterns and relevant account transaction histories. The composite cash receipt forecast is based on the previous forecasts by customer group and account under all scenarios because there is no cash receipt forecast by item.

Before calculating the multivalent forecast, the software in block 123 retrieves the forecast information from the application database for each forecast type and calculates a base period forecast for each dimension as shown in Table 61.

TABLE 61

| Table Number | Table Name | Retrieve Current: | Calculate Base Period: |
|---|---|---|---|
| 180 | Account Forecast | Sales Account Forecasts | Total Sales Forecast |
| 181 | Customer Forecast | Sales Forecasts | Total Sales Forecast |
| 182 | Customer Forecast | Cash Receipt Forecasts | Total Cash Receipt Forecast |
| 184* | Product Revenue Forecast | Product Revenue Forecasts | Total Sales Forecast |

*only in product only scenarios

Because there is only one cash receipt account there is no need to calculate a total cash receipt forecast by account.

The relative weightings that the different forecasts receive in the composite multivalent forecast calculation are determined in accordance with the present invention by quantifying the magnitude and trend error between the total base period forecast on each dimension (account, customer group and item) and the base period actual. The error is quantified using the same formulas used for evaluating the error of the 32 preliminary forecasts. The weightings are assigned to each forecast based on the relative, normalized trend and magnitude error for each forecast using the figures shown in Table 13. An alternate mechanism for developing the composite forecast involves the use of neural net pattern recognition software to determine the relative forecast weightings after evaluating the closeness of fit between the forecast pattern of sales and cash receipts and the actual pattern of sales or cash receipts.

The application software of the present invention uses the weightings assigned to each forecast in calculating composite forecasts for each period in the base period and the forecast time period using the formula shown below.

Weighted average sales and cash receipt forecast in each period equals:

$$((W_a \times F_a) + (W_c \times F_c))/(W_a + W_c)$$

Where:

$W_a$=Weighting assigned to forecasts by account $F_a$=Period cash receipt or sales forecast by account $W_c$=Weighting assigned to forecasts by customer group $F_c$=Period cash receipt or sales forecast by account or in a product only scenario, the sales forecast would equal:

$$((W_a \times F_a) + (W_c \times F_c) + (W_i \times F_i))/(W_a + W_c + W_i)$$

Where:

$W_i$=Weighting assigned to sales forecasts by item $F_i$=Period sales forecast by item The base period forecasts calculated in the manner shown above are then compared to the actual cash receipts during the base period and the error is calculated in the same manner described previously for calculating magnitude and trend error. If the user has chosen to use the most accurate forecast as the controlling forecast for this scenario, then the software in block will compare the combined base period sales and cash receipt error totals for the composite forecast, the forecast by account and the forecast by customer group and select the forecast with the lowest error level as the controlling forecast. The controlling forecast variable in the scenario control table 197 is modified to reflect the controlling forecast selection and the composite sales forecast and the composite cash receipt forecast covering the forecast time period are then saved to the composite forecast table 189 in the application database 90. The composite forecast table 189 has the structure shown in Table 62.

TABLE 62

| Composite Forecast (189) - Variable Name<br>Variable- length & data type - null values? |
|---|
| Forecast Type - fc__typ - 1 character - NO |
| Forecast Date - fc__dat - date -NO |
| Scenario - scen - 30 character - NO |
| Review - flag - 1 character - NO |
| Base currency period 1 - c1 - integer - NO |
| Base currency period 2 - c2 - integer - NO |
| through |
| Base currency period 78 - c78 - integer-NO |

After the composite forecast is saved, processing advances through a block 124 to a block 416. From there processing advances to a block 414 in the financial forecast subsystem 77.

Financial Forecast Subsystem—Forecasts by Account Adjusted to Match Controlling Forecast The software in block 414 adjusts the forecast of sales by account number that was previously stored in the account forecast table 180 to match the controlling forecast. To complete this adjustment, the software in block 414 first determines the magnitude and the sign of the change that will be required in each time period to adjust the sales forecast by account to match the controlling sales forecast for the current scenario. The change for each period is then spread to the sales account forecasts in each period based on their relative TVO values and the number of categories that the user has established in the Account TVO table 163 as described previously.

After the required changes are made, the sales forecast by account is again stored in table 180 in the application database 90. Processing then advances to a block 412 where the software in the block determines if the sales forecast by account was adjusted to match a controlling forecast of sales by item. The item sales forecast can only be the controlling forecast if the user has specified the current scenario as a product only scenario. If the controlling forecast was the item sales forecast then a controlling cash receipt forecast needs to be developed. The first step in developing this controlling cash receipt forecast is to transfer processing to block 408. The software in block 408 retrieves the information for the cash receipt account forecast from the account master table 151, the account history table 170, the account forecast table 180 and the cash receipt data table 204. The cash receipt (debit) forecast is then calculated for the base period and the forecast time period in processing block 409 using the history of total sales, the recently completed sales forecast and the values for $P_1$ to $P_{10}$ retrieved from table (204) in the cash receipt forecast equation used previously. The resulting forecast for the forecast time period is stored along with the forecast type variable for the debit forecast in table 180 in the application database 90. The forecast type variable (fc_type) is set to 'r' for revision. Processing then transfers to block 411 which checks the 'fc_type' variable to see if the debit forecast is a first time forecast or a revised forecast. In the case being described, 'fc_type' is set to 'r' and processing would advance to a block 320 after passing through a block 415.

If the software in block 412 determines that the item sales forecast is not the controlling forecast, then processing advances to a block 413 where the cash receipt forecast by account is adjusted to match the controlling forecast. Because there is only one cash receipt account, the adjustment involves simply changing the forecast values in each period to match the values of the controlling forecast. After this adjustment is completed, processing advances to block 320 via a block 415.

Inventory Replenishment Subsystem—Forecast by Item Adjusted to Match Controlling Forecast and Preliminary Requisitions Calculated In the inventory replenishment subsystem 75 (FIG. 2), processing advances directly from block 320 to a block 315 (FIG. 5). The software in block 31 5 adjusts the forecast of sales by item number that was previously stored in tables 182 and 184 to match the controlling forecast one account number at a time. To accomplish this, the software in block 315 first segregates the product revenue forecasts by account number. The software in block 315 then determines the sign and the magnitude of the change that is required in each time period to adjust the total product revenue forecast for a given sales account number to match the sales forecast for that account number that was just revised in the financial forecast subsystem. The required change for each period is then spread to individual items having that particular sales account based on their relative TVO values and the number of categories that the user has established in the Item TVO table 164 as described previously. The change is made to the product revenue forecast by item number stored in table 184. When the forecasts for all periods and all sales accounts in the product revenue forecast file have been adjusted to match the controlling sales forecast, then the product revenue forecast dollars are divided by the appropriate unit prices to determine the corresponding unit volumes that should be stored in the item forecast file 182 in the application database 90. After these calculations are completed for all sales accounts, processing advances to a block 323.

The software in block 323 sets order dates for each vendor. The user 60 had the option of specifying two days per week, three days per month and five days per quarter as being the days when orders are placed for each vendor in the system setting table 160. The order days that can be selected are shown in Table 63.

TABLE 63

| Order Frequency | Order Days (system setting) |
|---|---|
| Weekly - up to 2 | Mon, Tues, Wed, Thurs, Fri, Sat, Sun |
| Monthly - up to 3 | 1st through 31st day of month |
| Quarterly - up to 5 | 1st through 91st day of quarter |

The order dates for the forecast time period for each vendor are determined by the software in block 323 based on order frequency specified in the vendor master table 152 and order days specified in the system setting table 160. The resulting dates are stored in the vendor order date table 198. The structure of the order date table 198 is shown in table 64.

TABLE 64

Order Dates (198) - Variable Name
Variable- length & data type - null values?

Vendor ID - ven - 30 character - NO
Frequency - o_freg - 1 character - NO
Day of week 1 - w_num - 1 character - YES
Day of week 2 - w_nm2 - 1 character - YES
Day of month - m_num - 2 character - YES
Day of month - m_nm2 - 2 character - YES
Day of month - m_nm3 - 2 character - YES
Day of quarter - q_num - 2 character - YES
Day of quarter - q_nm2 - 2 character - YES
Day of quarter - q_nm3 - 2 character - YES
Day of quarter - q_nm4 - 2 character - YES
Day of quarter - g_nm5 - 2 character - YES After the order dates for all vendors are calculated and stored, processing passes to a block 317. The software in block 317 checks the requisition table 185 in the application database 90 in order to determine if there are current requisitions for all items with unit volume forecasts stored in the item forecast table 182. If there are some items that don't have current requisitions, then processing advances to a block 318 where the software in that block retrieves the information for the next item needing requisitions from the item master table 153 in the application database 90. After the item information has been retrieved, processing advances to a block 320.

The software in block 320 determines the target inventory level required for the item to meet the targeted fill rate or margin loss level that was previously specified by the user 60 for the item. In the instances where the user 60 has specified a target fill rate percentage, the software in block 320 considers the current inventory level, the forecast demand in each time period, the distribution of demand, the lead time for the item from the vendor initially specified and the previously calculated standard deviation of the demand in determining an inventory level that will ensure that the desired fill rate target is satisfied. The formula used to determine the target inventory level for each period, is shown below:

$$N=(D \times L)+(k \times \sigma_d \times SQRT(L))$$

where

N inventory reorder level

D is the forecast demand per day

L is the lead time in days k factor directly related to target fill rate $\sigma_d$ standard deviation of demand during lead time SORT(L) square root of L If the user has specified a target level of margin loss rather than a fill rate target, then the software in block 320 completes a different series of calculations before determining the target inventory level.

"If the percentage of annual demand (A) that is met from stock is defined as S' then the percentage of orders that are initially backordered, $S_b$, can be defined as:

$$S_b=(1-S')A$$

For the situation described above, the probability of a stockout occurring while a replenishment order is in process is represented by the first integral of the probability density function of demand f(x) during the lead time from the reorder level N to plus infinity $$\left( \text{i.e.} \int_m^\infty f(x) \right).$$

The expected number of units backordered per stockout will be given by the second integral over the same range $$\left( \text{i.e.} \int_m^\infty (x-M)f(x) \right).$$

This second statistic is known as the "partial expectation" $E(k)$."[3] The values of $E(k)$ are set for a given value of k (same k used in previous calculation). With an order quantity of Q, it follows that there are NQ occasions during a year when a stockout could occur while a replenishment order is in process and the expected number of units backordered per order would be $E(k) \times (C\sigma_d \times (SQRT(L)))$. The expected number of items backordered per year will be:

$((A/Q) \times (E(k) \times (\sigma_d \times (SQRT(L)))))$=expected number of backordered units In completing this calculation, the software in block 320 divides the annual margin loss target by the margin per unit to determine the allowable number of backordered units per year. The equation below is then solved to determine the value of $E(k)$:

Allowable number backordered units=Margin loss target/Margin per unit $E(k)=((Q/A) \times (\text{allowable number backordered units}))/(\sigma_d \times (SQRT(L)))$ The value of $E(k)$ in turn determines the value of k. The reorder level N can then be calculated using the formula $N=(D \times L)+(k \times \sigma_d \times SQRT(L))$ discussed previously. Once the reorder level has been determined for the item, it is then stored in the item master table 153 in the application database 90. Processing then advances to a block 322.

[3]. Colin Lewis, *Demand Analysis and Inventory Control*, Lexington Books, 1975, page 156

Determining the timing and number of requisitions an item will need during the forecast time period requires the calculation of the economic order quantity by the software in block 322. The economic order quantity for an item is the quantity that minimizes the total cost of ordering and receiving inventory as well as the cost of carrying inventory for the year. The formula used for calculating the economic order quantity is shown below.

$Q=2(A \times C_o)/(i \times C)$ where

Q is the economic order quantity

A is the forecast annual demand $C_o$ is the cost of placing & receiving an order i is the annual inventory carrying cost C is the cost of the item If item level order costs and inventory carrying costs have been specified, then the software in block 322 will use these values for Go and i in the economic order quantity calculation. If no item level values have been specified, then the software in block 322 will use the system setting table 160 default cost for placing an order to determine the value for $C_o$ and the default rate for annual inventory carrying cost for the value of i. The cost of the item 'C' is obtained from the single quantity price, from the specified vendor that is listed in the vendor item price schedule table 191. After calculating the economic order quantity for the item process advances to a block 321.

The software in the block 321 determines if an increase in order quantity for the item would be beneficial. More specifically, the software in the block determines if the reductions in purchase price and order costs that result from increasing order quantities to the vendor specified price break levels are sufficient to offset the increase in inventory carrying cost for the item. The example shown below illustrates the specifics of the calculation.

Item abcxyz is available from the Acme Bolt Company under the following price schedule:

| Quantity | Unit Price |
|---|---|
| 0–499 | $79.00 |
| 500–999 | $78.50 |
| 1,000–2,500 | $78.00 |
| >2,500 | $77.00 |

The other relevant information for the product is shown below:

| | |
|---|---|
| Forecast period: | 1 year |
| Annual volume: | 17,529 units |
| Planned forecast period purchase: | 17,760 units |
| Cost per order: | $500.00 |
| Annual carrying cost %: | 24% |
| User Selected Vendor: | Vendor A (Acme Bolt) |
| User Selected U of M: | Each |
| Economic Order Quantity: | 962 |
| Target Inventory Level: | 650 |
| Orders per Year: | 19 |

Using the existing order quantities and prices, total annual costs for item abcxyz are:

Purchase cost+Order Cost+Carrying Cost=Total Cost (19 orders×(962×$78.50))+(19 orders×$500/order)+((650+(962/2))× $78.5×24%)=$1,465,631

If order quantities were increased to 1,000 then, total annual costs for item abcxyz would be:

(18 orders×(1,000×$78))+(18 orders×($500/order))+((650+(1,000/ 2))×$78×24%)=$1,434,528

If order quantities were increased to 2,500 then, total annual costs for item abcxyz would be:

8 orders×(2,500×$77.50)+(8 orders×$500/order)+((650+(2,500/2))× $77.5×24%)=$1,589,340

Because the increase in requisition quantity from 962 to 1,000 decreases forecast period costs by $31,103 the software in blocks 321 changes the stored value of the economic order quantity to 1,000. This is the quantity that will be used for all requisitions planned in the next step in processing in a block 319.

The software in block 319 determines the dates when requisitions need to be placed in order to keep item inventory levels above target levels and creates requisition(s) for those dates. The analysis of required requisitions covers the forecast time period plus the item lead time. The item lead time is added to the forecast time period for this analysis to prevent stock-outs shortly after the forecast time period is over. The forecast of the date when the item is expected to reach the target inventory level involves the completion of the formula shown below for each work date in each period being forecast:

$$I - ((n+L)(F/d)) + \sum_{i=1}^{i=N+L} PO_{in} + \sum_{i=1}^{i=N+L} REQ_{in} = E - \text{for } n = 1 \text{ to } (N+L)$$

Where:
- I=starting item inventory
- n=number of work days from calculation start date
- N=total number of work days during forecast time period
- L=number of days required for vendor lead time, quality control inspections and warehouse stocking
- F=forecast item demand for the period
- d=number of work days in forecast period
- i=date, n days after current system date
- $PO_i$=existing purchase orders available on date i
- $REQ_i$=new requisitions available on date i
- E=ending item inventory Requisitions are planned one work date at a time for every item. A requisition for the economic order quantity is initially created by the software in block 319 for the date when the ending inventory drops below the target inventory level calculated previously. The requisition date is n work days after the current system date. After adding the planned requisition, the inventory balance calculation is repeated for the same date to ensure that the single order was sufficient to bring the expected inventory level above the target level. If the ending inventory is still below the target inventory level after adding the new requisition, then another requisition is planned for the same date. The inventory balance calculation is repeated until the ending inventory for the date being examined exceeds the target inventory level. Planned requisitions dates are then moved forward to the closest order date for the specified vendor. If the first vendor order date is after the initial order date, then the item is flagged for review. When every work date during the forecast time period plus lead time has been examined, the planned requisitions are stored in the requisition table 185 in the application database 90. The structure of the requisition table 185 is shown in Table 65.

TABLE 65

Requisitions (185) - Variable Name
Variable - length & data type - null values?

Requisitions ID - req_id - 30 character - NO
Item number - itm_num - 30 character - NO
Vendor ID - ven - 30 character - no
Requisition date - rq_dt - date - NO
Forecast date - fc_dt - date - NO
Scenario - scen - 30 character - NO
Requisition status - req_st - 1 character - NO
Discount type - dsc_typ - 1 character - NO
Requisition quantity 1 - ord_qty - integer - NO
Requisition UM 1- ord_um - 30 character - NO
Requisition price 1 - ord_up - 15.2 Num - NO
Requisition quantity 2 - ord_qty - integer - YES
Requisition UM 2- ord_um - 30 character - YES
Requisition price 2 - ord_up - 15.2 Num - YES
Item Category - bas_cat - integer - YES
Review - flag - 1 character - YES The requisitions are labeled as preliminary at the time they are stored in the requisition table as the software in block 319 sets the 'req_st' variable to 'p'. The software in block 319 also assigns each requisition a unique id that includes the first 10 characters of the item number, the system date and the number of orders created for the item during this calculation. Processing then returns to block 317 where the application database is again checked to see if there are current requisitions for all items that require them. If there are still items that require new requisition calculations, then the process described in the preceding paragraphs is repeated. If, on the other hand, all items have current, preliminary requisitions, then processing advances to a block 601 where the base level requisition calculations are started.

Inventory Replenishment Subsystem—Base-level Requisition Calculations for Item Quantity Discount Items The next series of steps in the advanced system for inventory management determine the profit maximizing set of requisitions, the base-level requisitions, that are required to meet the forecast demand with the target fill rate or the maximum level of margin loss that was previously specified by the user 60. The base level requisitions are first calculated for the items purchased under item quantity discounts. The requisitions for these items are determined one item at a time in alphanumeric order. Changes to units of measure, vendors and order quantity are considered for each item as permitted by the global and item level vendor and unit of measure change variables as part of the process of determining the profit maximizing set of requisitions for each item. For each item quantity discount item examined by application software of the present invention, the potential changes that will be considered for that item as part of the base level requisition calculation fall in to one of the four categories shown in Table 66.

TABLE 66

| Category | Potential changes: |
|---|---|
| 1. | Change vendor and/or unit of measure with associated quantity changes |
| 2. | Change unit of measure with associated quantity changes |
| 3. | Change vendor with associated quantity changes |
| 4. | No Change |

The calculation of the base level requisitions starts when system processing advances to block 600 where the software in the block retrieves the global vendor and unit of measure substitution parameters that were previously stored in the system setting file 160. Processing them continues to a block 604 which checks to see if global vendor substitution is permitted. From block 604 processing advances to either a block 603 which checks to see if global vendor substitution is permitted or through a connecting block 605 to a connecting block 631 and then on to a block 632 which also checks to see if global vendor substitution is permitted. The software in block 603 transfers processing to either a block 602 if unit of measure substitution is globally permitted or a block 618 if unit of measure substitution isn't permitted globally. In a manner identical to that of block 603, the software in block 632 transfers processing to either a block 634 if unit of measure substitution is globally permitted or to a block 642 if unit of measure substitution isn't permitted globally. From the four blocks, 602, 618, 634 and 642, the next steps in processing are determined by vendor substitution and unit of measure substitution variables for each item. The profit maximization analyses fall in to one of the four categories listed in table 67.

TABLE 67

| Item:<br>Global: | Ven-Y/UM-Y<br>Category 1 | Ven-Y/UM-N<br>Category 2 | Ven-N/UM-Y<br>Category 3 | Ven-N/UM-N<br>Category 4 |
|---|---|---|---|---|
| Ven-Y/UM-Y | Block 612 | Block 610 | Block 613 | Block 611 |
| Ven-Y/UM-N |  | Block 621 |  | Block 620 |
| Ven-N/UM-Y |  |  | Block 638 | Block 637 |
| Ven-N/UM-N |  |  |  | Block 645 |

The details of the calculations that occur for items that fall within each category will be described below. The different processing paths through the application software that lead to each different category calculation will also be identified as part of this overall discussion.

As shown above, category 4 is a potential path for every item under any combination of global change parameters. A category 4 item is one where no changes to the unit of measure or vendor specified in the preliminary requisition will be considered. The possible paths for processing category 4 items are shown in table 68.

TABLE 68

| Start Block | UM multiples | Item Vendor? | Item UM? | Change status | Check DB |
|---|---|---|---|---|---|
| 1. Block 602 to | Block 606 to | Block 607 to | Block 609 to | Block 611 to | Block 617 |
| 2. Block 618 to |  | Block 619 to |  | Block 620 to | Block 623 |
| 3. Block 634 to | Block 635 to |  | Block 636 to | Block 637 to | Block 640 |
| 4. Block 642 to |  |  |  | Block 645 to | Block 646 |

The overall result from processing items in this category is changing the status of the requisitions stored in table 185 for the item from preliminary (req_st='p') to base (req_st='b').

If the processing for the category 4 item starts in block 602 or block 634, then the first step in system processing involves the determination of the unit of measure multiples that are associated with the item. The software in a block 606 or a block 635 retrieves the relevant information from the unit of measure schedule master table 157 and unit of measure master table 155 for the item. The software in these blocks then determines the conversion factors required for converting the current unit of measure order quantities to the different units of measure. Every item must be linked to one unit of measure schedule as defined by the information in the item master table 153. The unit of measure schedule master table 157 lists the different units of measure that fall under a given unit of measure schedule. By combining the information from the three tables (153, 155 and 157) the software in block 606 or 635 is able to calculate the factors required for converting requisitions from one unit of measure to another. As an example, item abcxyz is purchased from Acme Bolt Company under unit of measure schedule A1. Schedule A1 has three different units of measure as shown in Table 69.

TABLE 69

| Unit of Measure | Base Unit of Measure | Quantity of Base U of M |
|---|---|---|
| Each | Each | 1 |
| Case | Each | 24 |
| Carton | Case | 10 |

Using the information shown above the software in block 606 or block 635 would then determine the conversion factors required for converting orders for each to orders for cases or cartons and for converting orders for cartons to orders for cases or each and for converting orders for cases to orders for each or cartons before proceeding to the next step in processing. The conversion factors are established as global variables and are therefore available to all system processing blocks when the initial calculations are completed. Once the calculations are completed processing advances to block 606 or block 635.

The first step in processing for the category 4 item that starts base requisition calculations in block 618 is identical to the second step in processing for the category 4 item that starts base requisition calculations in block 602. In this step, the value of the item's vendor substitution variable is checked by the software in a block 607 or a block 619 to see if vendor substitution is permitted. In either case the answer is 'no' (for a category 4 item) and processing advances to the next step.

The second step in processing for the category 4 item that starts base requisition calculations in block 634 is identical to the third step in processing for the category 4 item that starts base requisition calculations in block 602. In this step, the value of the item unit of measure substitution variable is checked by the software in a block 636 or a block 609 to see if vendor substitution is permitted. In both cases the answer is 'no' (for a category 4 item) and processing advances to the next step.

In the first step for the category 4 item that starts base requisition calculations in block 642, the second step for the category 4 item that starts base requisition calculations in block 618, the third step for the category 4 item that starts base requisition calculations in block 634 and the fourth step for the category 4 item that starts base requisition calculations in block 602 the software in a block 645, 620, 637 or 611 changes the status of the requisitions stored in table 185 for the item from preliminary (req_st='p') to base (req_st='b'). The 'bas_cat' variable is also set to '4' (as the item falls into category 4 for base level requisition calculations) in the requisition table 185 for the item at this time. The average unit cost for the item during the forecast time period is calculated and stored in the item master table 153 at the same time.

After the requisition status has been changed by the software in blocks 614, 612, 638 or 645, processing advances to a block, 617, 623, 640 or 646. The software in this latter group of blocks checks the requisition table 185 in the application database 90 to see if there are any items purchased under item quantity discounts that only have preliminary requisitions calculated. The software in these blocks determine this by checking the requisition table 185 to see if there are (item-quantity) items with requisitions where the 'req_st' variable has a value of 'p'. If there are still requisitions with this status, then processing loops back to block 602, 608, 634 or 636 where the next (item quantity discount) item is retrieved. If all item quantity discount items have base level requisitions (req_st='b') then processing advances to the base level requisition calculation for business volume discount items.

The processing completed for items in category 3 determines if changes to the unit of measure and the associated order quantities used for the requisitions will produce an increase in forecast time period profit. The possible paths for processing category 3 items are shown in Table 70.

a block 615. Block 615 contains a mixed-integer linear optimization program such as the one found in IBM's Optimization Subroutine Library (OSL) or in the Multiobjective Linear Programming Package (MLPP) from Computing and Systems Consultants. The maximized solution defines the most profitable mix of quantities for the different units of measure for the item quantity discount item being analyzed. The most profitable mix is then passed from block 615 to a block 616 or a block 639. The software in these blocks determine the lowest total cost requisition set by recalculating the Economic Order Quantity for the given mix and developing a new set of requisitions using the method described previously for preliminary requisitions. The resulting set of requisitions is then stored as the base level requisition set for the item in the requisition table 185. The 'bas_cat' variable for the new requisition set is set to '3' (as the item falls into category 3 for base level requisition

TABLE 70

| Start Block | UM multiples | Item Vendor? | Item UM? | Calc Setup | Check DB |
|---|---|---|---|---|---|
| 1. Block 602 to | Block 606 to | Block 607 to | Block 609 to | Block 613 to | Block 617 |
| 2. Block 634 to | Block 635 to |  | Block 636 to | Block 638 to | Block 640 |

The overall result from processing items in this category will be to change the unit of measure and the associated order quantity used for requisitions from the preliminary specifications if making the change improves profitability.

The processing completed during intermediate steps in the calculation of base level requisitions for category 3 items is identical to that described previously for category 4 items. The processing associated with category 3 items differs from the category 4 item processing in that the potential for increasing profitability by changing units of measure and the associated order quantity changes must be analyzed before the requisition status for the item can be changed from preliminary to base.

The profit maximization calculation begins when processing advances to a block 613 or to a block 638. The software in these block prepares the equations and constraints required for determining the most profitable mix of units of measure and quantities for purchasing the item quantity calculations). The average unit cost for the item during the forecast time period is calculated and stored in the item master table 153 at the same time. Processing then advances to block 617 or 640 where the application database 90 is checked to see if there are any more item quantity discount items with preliminary requisitions in the requisition table 185. If there are item quantity discount items that still have only preliminary requisitions then processing returns to either block 602 or block 634 where the next item is retrieved. If all item quantity discount items have base level requisitions then processing advances to the base level requisition calculation for business volume discount items.

The processing completed for items that fall in to category 2 determines if changing the vendor and the associated order quantity from the vendor specified in the preliminary requisitions will increase profitability during the forecast time period. The possible paths for processing category 2 items are shown in Table 71.

TABLE 71

| Start Block | UM multiples | Item Vendor? | Item UM? | Calc Setup | Check DB |
|---|---|---|---|---|---|
| 1. Block 602 to | Block 606 to | Block 607 to | Block 608 to | Block 610 to | Block 617 |
| 2. Block 618 to |  | Block 619 to |  | Block 621 to | Block 623 | discount item being analyzed. The general form of the equation prepared for each category 3 item is shown below.

Maximize Profit=(forecast period sales revenue)−(forecast period requisition costs+change in storage cost during forecast period)

$$(S_d \times N_d) - \sum_{a=a}^{a} \sum_{b=1}^{B} \sum_{c=1}^{C} (P_{abcd} \times Q_{acd} \times U_c) \times U_{ab} -$$

$$\sum_{a=a}^{a} \sum_{c=1}^{C} (Q_{acd} - R_{dpre}) \times P_d \times i \times K$$

The profit equation shown above and detailed in section 1A of the Appendix is the objective function that is maximized by the advanced system for inventory management in The overall result from processing items in this category will be to change the vendor and the associated order quantity used for requisitions from the preliminary specifications if making the changes produces a cost savings.

The intermediate steps in the calculation of base level requisitions for category 2 items are identical to those described previously for category 3 and category 4 items. The calculation of the profit increase that can be realized from changing vendors is done in a manner that is similar to that described for unit of measure profit maximization calculations in the category 3 discussion. The objective function for a category 2 item is in the general form shown below:

$$(S_d \times N_d) - \sum_{a=1}^{A} \sum_{b=1}^{B} \sum_{c=c}^{C} (P_{abcd} \times Q_{acd} \times U_c) \times$$

$$Y_{ab} - \sum_{a=1}^{A} \sum_{c=c}^{C} (Q_{acd} - R_{dpre}) \times P_d \times i \times K$$

The profit equation shown above and detailed in section 1B of the Appendix is the objective function that is maximized by the advanced system for inventory management in a block 615. The maximized solution defines the most profitable mix of quantities from the different vendors for the item quantity discount item being analyzed. The most profitable mix is then passed from block 615 to block 616 or a block 622. The software in these blocks determine the lowest total cost requisition set by recalculating the Economic Order Quantity for the given mix and developing a new set of requisitions using the method described previously for preliminary requisitions. The resulting set of requisitions is then stored as the base level requisition set for the item in the requisition table 185. The 'bas_cat' variable for the new requisition set is set to '2' (as the item falls into category 2 for base level requisition calculations). The average unit cost for the item during the forecast time period is calculated and stored in the item master table 153 at the same time. Processing then advances to block 617 or 623 where the application database 90 is checked to see if there are any more item quantity discount items with preliminary requisitions in the requisition table 185. If there are item quantity discount items that still have only preliminary requisitions then processing returns to either block 602 or block 618 where the next item is retrieved. If all item quantity discount items have base level requisitions then processing advances to the base level requisition calculation for business volume discount items.

The processing completed for items that fall in to category 1 are very similar to the calculations associated with category 2 and category 3 items that was described previously. The path for processing a category 1 item is shown in Table 72.

a block 615. The maximized solution defines the most profitable mix of quantities from the different vendors for the item quantity discount item being analyzed. The most profitable mix is then passed from block 615 to block 616. The software in block 616 determines the lowest total cost requisition set by recalculating the Economic Order Quantity for the given mix and developing a new set of requisitions using the method described previously for preliminary requisitions. The resulting set of requisitions is then stored as the base level requisition set for the item in the requisition table 185. The 'bas_cat' variable for the new requisition set is set to '1' (as the item falls into category 2 for base level requisition calculations). The average unit cost for the item during the forecast time period is calculated and stored in the item master table 153 at the same time. Processing then advances to block 617 where the application database 90 is checked to see if there are any more item quantity discount items with preliminary requisitions in the requisition table 185. If there are item quantity discount items that still have only preliminary requisitions then processing returns to block 602 where the next item is retrieved. If all item quantity discount items have base level requisitions then processing advances to the base level requisition calculation for business volume discount items.

Inventory Replenishment Subsystem—Base Level Requisition Calculations for Business-volume Discount Items After the base level requisitions have been calculated and stored for all item quantity discount items, the base level requisitions are calculated for the business volume discount items. It is worth noting here that the time frame of the calculations changes at this point in the system processing. The business volume discount time period specified by the user is the relevant time period for the calculations that will be completed by this portion of the application software. The system only allows for the specification of one business volume discount time period. The calculations completed in this segment of system processing will maximize the profit

TABLE 72

| Start Block | UM multiples | Item Vendor? | Item UM? | Calc Setup | Check DB |
|---|---|---|---|---|---|
| 1. Block 602 to | Block 606 to | Block 607 to | Block 608 to | Block 612 to | Block 617 |

The overall result from processing items in this category will be to change the vendor, the unit of measure and/or the associated order quantity used for requisitions from the preliminary specifications if making the changes improves forecast period profitability.

The intermediate steps in the calculation of base level requisitions for category 1 items are identical to those described previously for category 2, 3 and 4 items. The objective function for a category 1 item is in the general form shown below:

$$\text{Profit} = (S_d \times N_d) - \sum_{a=1}^{A} \sum_{b=1}^{B} \sum_{c=1}^{C} (P_{abcd} \times Q_{acd} \times U_c) \times$$

$$Y_{ab} - \sum_{a=1}^{A} \sum_{c=1}^{C} (Q_{acd} - R_{dpre}) \times P_d \times i \times K$$

The profit equation shown above and detailed in section 1C of the Appendix is the objective function that is maximized by the advanced system for inventory management in associated with purchasing the required business volume discount items during the specified period. If the forecast time period extends beyond the business volume discount time period, then the preliminary requisitions for the time period after the specified period are adjusted after the profit maximizing mix for the business volume discount time period has been determined.

If the global vendor and unit of measure substitution variables are both set to 'no', then no profit maximization calculations are completed and processing advances to a block 647 where the status of the preliminary requisitions that were created for the business volume items is changed to base. If either or both of the global substitution variables are set to 'yes' (in the system setting table 160) then processing advances to a block 624. The software in block 624 establishes equations and constraints for the business volume discount items purchased on a commitment basis. The exact composition of the equations and constraints will vary as required by the global and item level vendor and unit of measure change variables. The details of this aspect of the present invention are presented in section 2A of the appendix.

In completing this portion of system processing, the most profitable mix of vendors, units of measure and quantities for purchases made on a business volume, commitment basis are calculated by minimizing the total cost of procurement during the business volume discount period. The overall profitability equation is created by adding together the equations that have been prepared for each business volume item. The general form of the equation is shown below.

$$\text{Profit} = \sum_{a=1}^{A} \sum_{b=1}^{B} \sum_{c=1}^{C} ((Q_{abc} \times U_c) \times S_b) - \sum_{a=1}^{A} \sum_{b=1}^{B} \sum_{c=1}^{C} \sum_{n=1}^{N} (P_{abc} \times Q_{abc} \times U_c) \times (1 - d_{an}) \times Y_{an}$$

The profitability equation shown above and detailed in section 2A of the Appendix is the objective function that is maximized by the advanced system for inventory management in a block 615. The resulting solution is then stored one item at a time in the Business Volume Mix table 188. The calculation type for this calculation is set to 'base level'. The structure of the Business Volume Mix table 188 is shown in Table 73.

TABLE 73

Business Volume Mix (188) - Variable Name
Variable - length & data type - null values?

Item Number - itm_num - 30 character - NO
Vendor ID - vendor - 30 character - NO
Discount type - disc - 1 character - NO
Calculation Type - ctype - 1 character - NO
Discount Period End Date - end - date - NO
Forecast Date - fc_dat - date -NO
Scenario - scen - 30 character - NO
Period tim_pd - 1 character - NO
Period quantity - qty - integer - NO
Unit of measure - um - 30 character - NO
Price per unit - pr - 15.2 Num - NO
through
Period quantity n - qtyn - integer - YES
Unit of measure n - umn - 30 character - YES
Price per unit n - prn - 15.2 Num - YES
For 1 through n units of measure After the solution has been stored in Business Volume Mix table 188 in the application database 90, processing advances to a block 625 where equations are prepared for each business volume item purchased on as-ordered basis.

The general form of the equations and constraints prepared for each business volume, as-ordered item are similar to those prepared for the business volume commitment items described previously, with two differences:

1. the prices are changed to the business-volume as-ordered prices instead of the business-volume commitment prices if the commitment price is not locked in; and 2. the constraint on volume for the as-ordered item is modified to reflect the volume available for as-ordered purchases after taking in to account the previously calculated volume for the item that will be purchased on a commitment basis.

The software in blocks 625 creates equations and constraints for every business volume item and then combines the equations to form the objective function that will be maximized. The software in block 620 then maximizes the objective function subject to the constraints developed by the software in block 625. The minimized solution defines the lowest cost mix of quantities for the different units of measure by vendor for the items that are to be purchased on an as-ordered basis during the business volume discount time period. After the resulting solution is stored in Business Volume Mix table 188 in the application database 90, processing advances to a block 624 where the software in the block adjusts the previously calculated requisitions in table 185 for each business volume item as required to match the lowest cost solution stored in table 188.

Because the time period covered by the optimization calculation was limited to the business volume discount period, there may be preliminary requisitions in the forecast time period that aren't affected by the results of the base level requisition calculation. These requisitions are adjusted by the software in block 626 to match the overall business volume discount period order quantity, vendor, and unit of measure mix on a percentage basis by item. An example of the adjustments made to the post business volume discount period requisitions is shown below.

| Preliminary Requisitions for item abcxyz | Profit Maximized Business Volume Forecast Period Requisition Mix |
|---|---|
| Time period: 18 months<br>Requisitions: 18 requisitions for 1,000 each during the forecast time period, one requisition per month<br><br>Vendor: Acme Bolt Company | Time period: 12 months<br>Requisitions: 6 requisitions of 12 cartons (cartons contain 100 each) to cover commitment purchases and 4 requisitions of 12 cartons for as-ordered purchases<br>Vendor: Triad Supply, Ltd. |
| Post Business Volume Discount Period Requisitions ||
| Time Period: 6 months<br>Requisitions: 5 requisitions of 12 cartons (cartons contain 100 each). 3 to cover commitment purchases and 2 to cover as-ordered purchases<br>Vendor: Triad Supply, Ltd. ||

After the base level business-volume discount item requisition solution is stored in table 185 in the application database 90 and the status of each requisition is changed from preliminary to base-level, the average unit cost for the each business volume discount item during the forecast time period is calculated and stored in the item master table 153. System processing then transfers to the customer payment analysis subsystem 76.

Customer Payment Analysis Subsystem—Forecasts by Customer Group Adjusted to Match Controlling Forecast In the customer payment analysis subsystem 76 (FIG. 2), the software in a block 364 (FIG. 6) adjusts the forecast of sales and cash receipts by customer group that was previously stored in table 181 to match the controlling forecast. To accomplish this, the software in block 364 first determines the magnitude and sign of the change that will be required in each time period to adjust the sales forecast to match the controlling forecast. The change for each period is then spread to individual customer groups in each period based on their relative TVO values and the number of categories that the user has established in the Customer Group TVO table 162 as described previously. After the sales forecast has been adjusted to match the controlling forecast, the same process is repeated for the cash receipt forecast. When both of the forecasts by customer group have been adjusted to match the controlling forecast, they are stored in the customer forecast table 181 in the application database 90. After the storage of the revised forecasts has been completed, processing advances to a block 428 in the financial forecast subsystem via a block 366.

Financial Forecast Subsystem—Expense Account Forecast Calculation

In the financial forecast subsystem 77 (FIG. 2), the next segment of calculations in accordance with the present invention is the forecast of the expense accounts and balance sheet accounts for the forecast time period. Expense accounts forecasts are completed before balance sheet account forecasts begin. Expense account forecasts are first completed for the independent expense accounts in alphanumeric account order. Independent expense accounts are those where the forecast of future transactions is a function of the prior history of the base account (definition is identical to that used to define independent items).

The first step in this segment starts when processing advances from block 428 to a block 417. The software in block 417 examines the account forecast table 180 in the application database 90 to determine if there are current forecasts for all independent expense accounts. If all independent expense accounts have current forecasts, then processing passes to a block 422 where the software in the block checks the account forecast table 180 to determine if there are current forecasts for all dependent expense accounts. Alternatively, if the software in block 417 determines that there are independent expense accounts that don't have current forecasts, then processing passes to block a 418 where the next independent expense account is retrieved from the application database.

After the independent expense account information is retrieved from the account master table 151, account history table 170 and account balance table 171 processing advances to a block 419 where a forecast of debits for the account is completed. The independent account debit forecasts are created by using the base account transaction history together with the algorithms specified in table 12 to create 32 different forecasts of debit transaction values for the base period. The accuracy of each forecast in predicting the actual debit transactions and the transaction trend during the base period is then assessed using the formulas detailed previously. The three forecasts that have the lowest error in predicting the period debit transactions and the debit transaction trend during the base period are then combined to form a multivalent forecast of base period and forecast time period debits using the weightings shown in Table 13. The base period forecast is then compared to the actual debit transactions during the base period and the error of the multivalent forecast is calculated using the same procedure described previously for evaluating the 32 original forecasts. If the relevant prior history doesn't provide enough information to create a reliable forecast or if the base period forecast differs significantly from the base period actual results (error is high) then the software in block 419 will flag the stored account forecast for review. The forecast is flagged for review by setting the review variable to 'y' for yes. The forecast will also be flagged for later review if the percentage of forecast accuracy falls below the currency amount accuracy percentage ('cacc') specified in the system setting table 160.

After the debit forecast is stored in the account forecast table 180 in the application database 90, processing transfers to block a 420 where the independent forecast of credits for the same account is completed using the same method described above for the debit forecast. It is worth noting here that the debit and credit forecasts are examined separately and that their multivalent forecasts can be completed using different algorithms. After the credit forecast has been stored in the account forecast table 180 in the application database 90, processing advances to block 421 where the two independently calculated forecasts are added together to produce the net overall expense account forecast that is also stored in the account forecast table 180. If the net forecast differs significantly from the base period actuals (error is high), then the software in block 421 will flag the account forecast for later review. After the net expense account forecast has been stored processing returns to block 417. From this point, processing either proceeds to the next independent item as described above or advances to block 422 when all independent expense account forecasts have been completed.

The software in block 422 examines the account forecast table 180 in the application database 90 to ascertain if there are current forecasts for all dependent expense accounts. Dependent expense accounts are those where the forecast of future transactions is a function of the forecast of another account. If all dependent expense accounts have current forecasts, then processing passes to a block 427. From block 427 processing advances to a block 431 and on to a block 432 where the software in the block completes the forecast of the cost of goods sold account.

Alternatively, if the software in block 422 determines that there are dependent expense accounts that don't have current forecasts, then processing passes to a block 423 where the next dependent expense account is retrieved from the application database 90. Dependent expense account forecasts are calculated in alphanumeric order of their base accounts with the exception of the cost of goods sold account forecast which is completed in a separate operation. After the information is retrieved from the account forecast table 180, account master table 151, account history table 170 and account balance table 171 for both the dependent account and the base account, processing advances to block a 424 where a forecast of debits for the account based on the debit forecast of the base item is completed. The dependent expense account forecasts are calculated by the software in block 424 in a manner that is similar to that described for the independent expense accounts. The accuracy of each of the 32 forecasts in predicting the actual debit transactions and the transaction trend during the base period are assessed using the formulas detailed previously. The three forecasts that have the lowest error in predicting the period debit transactions and the transaction trend as a function forecast debit transactions for the base account during the base period are then combined to form a multivalent forecast of base period and forecast time period debits using the weightings shown in Table 13. The base period forecast is then compared to the actual debit transactions during the base period and the error of the multivalent forecast is calculated using the same procedure described previously for evaluating the 32 original forecasts. If the relevant prior history doesn't provide enough information to create a reliable forecast or if the base period forecast differs significantly from the base period actual results (error is high) then the software in block 424 will flag the account forecast for review. The forecast is flagged for review by setting the review variable to 'y' for yes. The forecast will also be flagged for later review if the percentage of forecast accuracy falls below the currency amount accuracy percentage ('cacc') specified in the system setting table 160. After this forecast is stored in the account forecast table 180 in the application database, processing transfers to block 425 where the independent forecast of credits for the same account is completed using the credit forecast for the base item as the basis for future period forecasts in a manner identical to that described above. After the credit forecast has been stored in the account forecast table 180 processing advances to block 426 where the debit and credit forecasts are added together to produce the net expense account forecast that is also stored in the account forecast table 180. If the net forecast differs significantly from the base period actual net results for the account (calculated error is high), then the software in block 426 will flag the account forecast for later review. After the net expense account forecast has been stored processing returns to block 422. From this point processing either proceeds to the next dependent item as described above or advances to block 432 via blocks 427 and 431 when all dependent expense account forecasts have been completed.

The cost of goods sold account debit forecast is calculated for each period by the software in block 432. In completing this calculation for a single forecast period, the software in the block multiplies the period unit forecast quantities stored in table 182 for each item by the forecast period average unit cost that was stored in the item master table 153. The resulting total is the debit forecast for the cost of goods sold account for each period. After all forecast periods have a current debit forecast processing shifts to the calculation of the credit forecast. The credit forecast for the cost of goods sold account is calculated in a manner identical to that described above for an independent credit forecast. The two forecasts are then added together to produce an overall net cost of goods sold account forecast. If the net forecast differs significantly from base period actual net results, then the software in block 432 will flag the account forecast for later review. All three forecasts are stored in the account forecast table 180 in the application database 90.

Financial Forecast Subsystem—Balance Sheet Account Forecast Calculation

Every expense account has an ultimate account designated in the account master table 151. The application software of the present invention also permits every expense account to have up to two intermediate accounts in addition to the required ultimate account. The intermediate account information is also stored in the account master table 151 for each account. Direct expense accounts are those where the expense flows directly to the ultimate account. Examples of direct expense accounts include the non-tax portion of most payroll expense (salary) and most rents which are paid immediately when incurred. Indirect expense accounts are those accounts where the expense doesn't flow directly to the ultimate account. Indirect expenses typically flow into (intermediate) liability account such as accounts payable when they are first recognized before eventually flowing to the ultimate account (cash) when they are paid.

The balance sheet account forecasts are completed in the next portion of processing in the advanced inventory management system. Balance sheet accounts can be thought of as checking accounts for a specific type of asset or liability. During each time period, additions (debits for asset accounts, credits for liability accounts) and withdrawals (credits for asset accounts, debits for liability accounts) are made to each account. The timing and amount of each input and withdrawal are determined by the information provided by the input account and by the parameters of the balance sheet account. The amount reported on the balance sheet at the end of every forecast time period is simply the original account balance plus period additions minus period withdrawals. Forecasting the balance sheet accounts is simply a matter of keeping track of the forecast additions and forecast withdrawals. Sales, cash receipt and expense accounts were forecast before the balance sheet accounts because they are the primary sources of additions and withdrawals to balance sheet accounts as illustrated by the following example.

> The accounts receivable account represents the money owed to a company by its customers that have received goods and/or services from the company for which they haven't completed payment. Additions to the accounts receivable account include all non-cash sales while the receipt of cash from customers is a withdrawal from accounts receivable. The balance in the account at any one time equals total sales on account less total cash receipts from customers on account.

> Note: for simplicity bad debt expense is ignored in this example

The calculation of the balance sheet account forecasts begins in a block 435 where the application software in the block checks the account forecast table 180 in the application database 90 to see if there are current forecasts for all balance sheet accounts. If there are current forecasts for all balance sheet accounts except the cash and the operating credit line account, then processing passes to block a 434 where the software in the block calculates the operating cash and credit line account forecasts.

If there are balance sheet accounts without current forecasts, then processing continues to a block 438 where the software in the block retrieves the relevant information for the next balance sheet account from the account forecast table 180, account master table 151, account history table 170 and account balance table 171. The first part of the account forecast calculation for each period is completed by adding all forecast sales, cash receipt, expense, capital structure, capital expenditure and balance sheet transactions to the balance sheet account identified as the intermediate or ultimate account. The second part of the forecast calculation is completed by withdrawing the sales, expense, balance sheet, capital structure and capital transactions flagged for removal from the account during the period. This calculation is completed for every period during the base and forecast time periods.

Transaction addition and withdrawal dates can be specified at either the transaction level or the account level. Transactions that will generally have specified withdrawal dates include inventory purchases that are typically added to the accounts payable account forecast at the time of the expected receipt of goods and withdrawn from the accounts payable account at the end of the credit term granted by the supplier. At the time of their withdrawal from accounts payable, such transactions are generally transferred to the cash account (the ultimate account) to reflect the payment of the invoice. Another transactions with a specified withdrawal date is payroll which is paid on the basis of a known schedule. Accounts with specified removal dates include tax and employee benefit liability accounts which are generally paid on a monthly or quarterly basis, rent and utility payments which are paid at regular intervals and leases and maintenance contracts which are generally paid on a monthly basis. If a transaction doesn't have a specified removal date, then the default time period for that account will be used.

The balance sheet account forecast for the base period is compared to the actual balances during the base period. If the error associated with the base period balance sheet account balance forecast is high, then the software in block 440 will flag the account forecast for later review. As with the expense accounts, the number of future periods (the forecast time period) that will be calculated is determined by the value of the no_pd variable in the system setting file 160. When current account forecasts have been saved in the account forecast table in the application database for all balance sheet accounts save the cash and operating credit line accounts, then processing passes to block 424 where the forecasts for these accounts are completed.

The cash account is calculated last because it is the ultimate account for virtually all of the sales, expense and balance sheet accounts. If a period cash account balance goes negative during the calculation of the period-to-period balance, then the software in block 424 will decrease the designated credit line and increase the cash balance within the available credit limit as required to bring the cash balance back to a positive value. If the magnitude of the negative cash balance exceeds the available credit line during any time period, then the account will be flagged for later review by the user (60).

After all the account forecasts are stored in the application database 90, processing advances to a block 433 where the software in that block checks to see if any account forecasts have been flagged for review. If any account forecasts require review by the user 60, then the software in block 433 transfers processing to a block 436 where the next account requiring review by the user 60 is retrieved. Processing then continues on to a block 437 which prompts the user 60 to provide input concerning the flagged account forecasts. This input is stored in the application database 90 before processing returns to block 433 to determine if there are any remaining account forecasts that require review. If there are no more account forecasts requiring review, then processing advances to a block 439 where all dependent expense account forecasts that need to be recalculated as a result of the user's input concerning the flagged forecasts are recalculated. If any forecasts do require recalculation, then the processing described previously for dependent accounts is repeated for the affected accounts by the software in block 439 using the newly stored forecasts as the basis. After the revised dependent expense account forecasts are stored in the account forecast table 180 in the application database 90, processing passes to block 441 where the balance sheet account forecasts are recalculated as required to reflect the changes in flagged and dependent expense account forecasts. If any balance sheet account forecasts need to be recalculated, then the processing described for block 440 is repeated by the software in block 441. After the revised balance sheet account forecasts have been stored in the account forecast table 180 in the application database 90, processing advances to a block 442 where the financial forecast is calculated. If there were no accounts flagged for review, then processing will pass directly from block 433 to block 439 and on to block 442.

The financial forecast calculation completed by the software in block 442 has two major functions. First, the software in block 442 determines the accounting profit for each time period by completing a calculation of the formula shown below:

Period accounting profit=Total sales for the period−Total expenses for the period The profit forecast is then used to calculate a forecast of retained earnings (the period profit forecast is also by definition the forecast of period-to-period changes in retained earnings before dividend payments) for the forecast time period. After this forecast has been completed and stored in the account forecast table 180 application database 90, the software a block 442 examines the available capital balance (cash and available credit balance) for every period during the forecast time period and stores the month or week, year, start date, end date and period deficit for any time period when available capital is forecast to be below the minimum acceptable level in a low capital period table 192 in the application database 90. The structure of the low capital period table is shown in Table 74.

TABLE 74 (192) & 75 (201)

| Low Capital Period (192) - Variable Name Variable - length & data type - null values? |
| --- |
| Forecast Type - fc_typ - 1 character - NO<br>Forecast Date - fc_dat - date -NO<br>Scenario - scen - 30 character - NO<br>Low capital week - week - integer - YES<br>Low capital month - month - 1 character - YES<br>Low capital year - year - integer - NO<br>Low capital period start date - st - date - NO<br>Low capital period end date - end - date - NO<br>Period deficit - deficit - NUM 15.2 - NO |
| Requisition Capital (201) - Variable Name Variable - length & data type - null values? |
| Forecast Type - fc_typ - 1 character - NO<br>Forecast Date - fc_dat - date -NO<br>Scenario - scen - 30 character - NO<br>Pd. 1 requisition capital - p1cap -15.2 Num-NO<br>Pd. 1 item qty purchases - p1iqp-15.2 Num-NO<br>to<br>Pd. n requisition capital - pncap -15.2 Num-NO<br>Pd. n item qty purchases - pniqp-15.2 Num-NO<br>for 1 to n periods being forecast |

After the storage of the low capital periods is completed, processing passes to a processing block 443 where the amount of money available for requisitions in each period within the forecast time period is calculated in accordance with the formula shown below.

Period amount available to fund requisitions=Available capital at beginning of period+(period revenue+period decrease in asset accounts+period increase in liability accounts)−(payroll expense for period+other expenses for period+period dividend payments)−(period increase in asset accounts+period decrease in liability accounts)−minimum available capital The forecast amount of spending for item quantity discount items in each period during the forecast is then calculated by totaling the base level requisitions for these items for each time period. The results of the preceding calculations are then stored in the requisition capital table 201 (shown above) in the application database 90.

After the storage of the requisition capital table 201 is complete, processing advances to a transfer block 444 and then to a transfer block 126. Processing immediately advances to a block 128 where the software in the block checks the low capital period table 192 in the application database 90 to see if the available capital ever fell below the user specified minimum during the period that was covered by the forecast. If the available capital balances were above the minimum level during every period, then processing passes to a block 129 where the software in the block generates a display of the financial forecast in the format previously chosen by the user 60. Alternatively, if available capital dropped below the minimum level for one or more of the forecast time periods, then processing passes from block 128 to a block 127 which creates a display of the financial forecast in the format previously chosen by the user 60 that highlights the periods where the available capital was forecast to be below the minimum level.

The software in blocks 127 and 129 creates a display of the financial forecast in one of seven formats as shown below:

1. The cash flow calendar format—available capital status, forecast cash receipts, forecast cash expenditures and the forecast cash and available credit balances are shown for each day in the forecast time period in a calendar format as shown in Table 76 below:

3. The cash flow statement format—period-to-period cash flow statements in the standard format which is well known show the sources and uses of the cash generated by the enterprise using the system during the forecast time period.
4. The income statement format—period-to-period income statements in the standard format which is well known show the income and/or loss generated by the enterprise using the system during the forecast time period.
5. The balance sheet format—period-to-period balance sheets in the standard format which is well known show the change in account levels created by the business activity during the forecast time period.
6. The integrated balance sheet, income statement and cash flow statement format—uses the period income statement and cash flow statements to account for period-to-period balance sheet changes as shown in Table 78.

TABLE 76

| Week 1, 1996 | Week 2, 1996 | Week 3, 1996 | Week 4, 1996 |
| --- | --- | --- | --- |
| $3,460.22 Surplus/(Deficit) | $2,638.64 Surplus/(Deficit) | ($7,201.77) Surplus/(Deficit) | ($7,201.77) Surplus/(Deficit) |
| Cash Start-  $27,321.33 | Cash Start-  $28,460.22 | Cash Start-  $27,638.64 | Cash Start-  $17,798.23 |
| Cash In-  $ 9,871.21 | Cash In-  $ 1,710.89 | Cash In-  $ 5,371.21 | Cash In-  $ 0.00 |
| Cash Out-  $ 8,732.32 | Cash Out-  $ 2,532.47 | Cash Out-  $15,211.62 | Cash Out-  $ 0.00 |
| Cash End-  $28,460.22 | Cash End-  $27,638.64 | Cash End-  $17,798.23 | Cash End-  $17,798.23 |
| Credit Start - $10,000 | Credit Start - $10,000 | Credit Start - $10,000 | Credit Start - $10,000 |
| Credit Change - $0 | Credit Change - $0 | Credit Change - $0 | Credit Change - $0 |
| Total:  $38,460.22 | Total:  $37,638.64 | Total:  $27,798.23 | Total:  $27,798.23 |
| Minimum:  $35,000.00 | Minimum:  $35,000.00 | Minimum:  $35,000.00 | Minimum:  $35,000.00 |

2. The checkbook format—forecast cash receipts, cash expenditures and the cash and available credit balances are shown for the forecast time period in a checkbook register format as shown in Table 77.

TABLE 77

| | Check (−) amt. | Deposit (+) amt | Balance |
| --- | --- | --- | --- |
| Starting balance | | | $123,554.98 |
| Period 1 - rent | $8,950 | | $114,604.98 |
| Period 1 - payroll | $32,443.19 | | $82,161.79 |
| Period 1 - cash receipts | | $234,667.19 | $316,828.98 |
| A/P inventory item abcxyz | $3912.15 | | $312,916.83 |

TABLE 78

| Beginning B Sheet | Income Statement | Cash Flow Stmt | Internal B Sheet | Ending B Sheet |
|---|---|---|---|---|
| Cash 100,000 | | Change (50,000) | | Cash 50,000 |
| A/R 100,000 | Sales 250,000 | Cash Rct 200,000 | | A/R 150,000 |
| Inventory 300,000 | COGS 150,000 | | Inventory 100,000 | Inventory 250,000 |
| Equipment 200,000 | | | | Equipment 200,000 |
| Acc Depr 100,000 | Depr 10,000 | | | Acc Depr 110,000 |
| Net Equip 100,000 | | | | Net Equip 90,000 |
| ASSETS 600,000 | | | | ASSETS 540,000 |
| A/P 200,000 | Expenses 50,000 | Payments 220,000 | Inventory 100,000 | A/P 130,000 |
| Debt 200,000 | | Payments 10,000 | | Debt 190,000 |
| Equity 100,000 | | | | Equity 100,000 |
| Ret. Earn 100,000 | Income 40,000 | Dividends 20,000 | | Ret. Earn 120,000 |
| LIAB& EQ 600,000 | | | | LIAB& EQ 540,000 |

7. The cash flow return on investment format—the forecast of net cash flow generated by the commercial enterprise in every period is divided by the forecast level of cash investment in the business to determine the cash flow return on investment for each period during the forecast time period.

After displaying the forecast to the user 60, the software in block 127 transfers processing to a block 130 where the software in the block checks to see if the preceding calculations were deficit reduction calculations. This is determined by checking the value of the deficit variable in the scenario control table 197. If the deficit variable is already set to 'y', then the user 60 will be returned to the initial data entry portion of the application software. If the deficit variable isn't already set to 'y' then the user 60 will be given the option of changing the system settings and re-running the forecast or running the profit enhancement calculation in deficit mode. If the user chooses to change the system settings, then the software in block 130 restricts processing options to those associated with initial data entry and changing previous forecasts as required to create a forecast where the available capital is above the minimum level during all forecast time periods. Alternatively, if the user chooses to run the profit enhancement calculation, then the deficit calculation variable ('deficit') in the scenario control table 197 is set to 'y' for yes and processing advances through a block 131 to a block 700. The profit enhancement calculations will be described in more detail below.

If the available capital is above the minimum level for all days in the forecast time period, then processing proceeds to a block 132 where the user 60 is queried by the software in the block to determine if the base level financial forecast is acceptable. If the user rejects the base level financial forecast, the software in block 132 transfers processing to a block 134 to a block 119 and on to the initial data entry screens in block 100 where the user 60 will have the option of changing the system settings, item specifications or individual forecast elements as required to produce a financial forecast that is acceptable. Should the user 60 chose to accept the base level financial forecast, the software in block 130 advances processing to a block 133 where the software in the block checks the forecast scenario table to determine if the preceding calculations were for a deficit calculation. If the calculations were for a deficit calculation then processing advances to a block 143 for the display of a summary management report. The details of this portion of the processing in the deficit calculation scenario will be explained in detail after the profit enhancement calculation discussion is completed. If the calculations were not for a deficit calculation, then processing is transferred to a block 135 which transfers processing to a block 700 in the inventory replenishment subsystem 75. Processing then advances from block 700 to a block 701 in the inventory replenishment subsystem 75 where the calculation of the prioritized list of profit enhancing changes to the base level requisitions is started.

Inventory Replenishment Subsystem—Profit Enhancement Calculations

The profit enhancement processing closely mirrors the processing that was completed in the calculation of the base level requisitions. The processing is completed in the same order discussed previously with the analysis of potential changes for item discount items being calculated first, changes for committed business volume discount items being calculated second and changes for as ordered business volume discount items being calculated last.

The profit enhancing changes are first calculated for the items purchased under item quantity discounts. The potential changes for these items are examined one item at a time in alphanumeric order. Changes to units of measure, vendors and order quantity are considered for each item as permitted by the variables 'venmax' and 'ummax' in the system setting table 160 that specify if the global vendor and/or unit of measure substitution restrictions can be removed as part of the profit enhancement calculations. The potential profit maximizing requisition set for each item is stored if it increases profitability over the base requisition level.

The capital efficiency of each potential change to base level requisitions is also determined before it is stored. Capital efficiency is defined as the ratio of the potential profit improvement over the increase in average working capital investment required to produce the profit improvement. When profit improvement is achieved with a reduction in average capital investment, capital efficiency is defined as the profit improvement less the reduction in average capital investment (because the reduction is negative the effect is to add the reduction to the forecast profit improvement) as shown in Table 79.

TABLE 79

|  | Average Capitol Change (+) | Average Capital Change (−) |
|---|---|---|
| Forecast Period Cost Change + (increase) | Forecast Pd. Cost Change Average Capitol Change | Forecast Pd. Cost Change |
| Forecast Period Cost Change − (decrease) | Forecast Pd. Cost Change Average Capitol Change | Forecast Pd. Cost Change − Average Capital Change |

The purchase options that increase profits are stored in the item change table 186 in the application database 90 while. The requisition sets that corresponds to the stored item changes are in turn stored in the alternate requisition table 187 in the application database 90. The structure of these tables are shown in Table 80 and 81.

TABLES 80(186) & 81(187)

| Item Change (186) - Variable Name Variable - length & data type - null values? |
|---|
| Item Number- itm_num-30 character-NO Scenario - scen - 30 character - NO Calculation date - calcdt - date - NO Vendor- vndr-30 character-NO Unit of Measure 1 - um1-15 character-NO Unit of Measure 2 - um2-15 character-NO Total Quantity U of M 1-tq1-15.2 Num-NO Total Quantity U of M 2-tq2-15.2 Num-NO Capital efficiency - cap_ef-15.2 Num-NO Selected - select - 1 character - YES Item Only - itm_only-1 character-YES |
| Alternate Requisition (187) - Variable Name Variable - length & data type - null values? |
| Item Number - itm_num-30 character-NO Scenario - scen - 30 character - NO Calculation date - caldt - date - NO Vendor- vndr-30 character-NO Unit of Measure 1 - um1-15 character-NO Order Quantity U of M 1- qty1-15.2 Num-NO Unit of Measure 2 - um2-15 character-NO Order Quantity U of M 2-qty2-15.2 Num-NO Total Requisitions - tot - integer - NO Order Date 1 - odt1 - date - NO through Order Date n - odtn - date - NO |

For each item quantity discount item examined by the application software of the present invention, the potential changes that will be considered for that item as part of the profit maximizing change calculation fall in to one of the three classes shown in Table 82.

TABLE 82

| Class | Potential profit enhancing changes: |
|---|---|
| A | Change vendors and/or units of measure and associated order quantity |
| B | Change units of measure and associated order quantity |
| C | Change vendors and associated order quantity |

The calculation of the profit enhancing changes starts when system processing advances to block 701 where the software in the block retrieves the profit enhancement vendor restriction variable ('venmax'), the profit enhancement unit of measure restriction variable ('ummax'), the global vendor substitution variable ('yensub') and the unit of measure substitution variable ('umsub') that were previously stored in the system setting table 160. Processing then continues to a block 702 which checks to see if variable 'ummax' is set to 'y' for yes. If it is set to yes, then global unit of measure substitution restrictions can be removed as part of the profit enhancement calculation. From block 702 processing advances to a block 703 if unit of measure substitution restrictions are not being removed or to a block 705 if they are being removed. The software in block 703 determines whether or not global vendor restrictions can be removed ('yenmax'='y') as part of the profit enhancement calculations. If the restrictions can be removed, then the software in block 703 will transfer processing to a block 736. Alternatively, if global vendor substitution restrictions are not being lifted for the calculation, processing transfers to a block 735.

Processing advanced to block 735 because the current system settings won't allow the removal of either unit of measure or vendor restrictions as part of profit enhancement calculations. In this situation, there are no profit enhancement options to be analyzed and processing advances to a block 779 which checks the scenario control table 197 to determine if the current calculation is a deficit calculation ('deficit'='y'). If it is a deficit calculation, then processing leaves the inventory replenishment system and returns to block 445 in the financial forecast subsystem. If the calculation isn't a deficit calculation, processing leaves the inventory replenishment system and returns to a block 136. There are other combinations of restriction removal variables and global substitution variables that leave no profit enhancement options to be analyzed. In these situations, system processing will advance to block 735 as will be discussed in more detailed below.

In a manner identical to that of block 703, the software in block 705 transfers processing to either a block 706 if unit of measure substitution restrictions remain in place during profit enhancement calculations or to a block 718 if unit of measure substitution restrictions are being removed for this calculation. From the three blocks, 706, 718 and 736, the next steps in processing are determined by the value of the vendor substitution variable, the unit of measure substitution variable and the item category (set during base requisitions processing) as shown in Table 83.

TABLE 83

| Start Block | Valid Combinations for the Vendor and Unit of Measure Substitution Variables | Item Category | Resulting Calculations |
|---|---|---|---|
| 706 | (UM=y, V=n) & (UM=y, V=y) | 1 or 3 | Class B |
| 718 | (UM=n, V=y), (UM=y, V=n) & (UM=y, V=y) | 1, 2 or 3 | Class A, B or C |
| 736 | (UM=n, V=y) & (UM=y, V=y) | 1 or 2 | Class C |

If the vendor and unit of measure substitution variables have values different than the valid combinations (for the current start block) shown in Table 83, then there are no profit enhancement options to be analyzed for any item and processing will advance to block 735 as described previously. In a similar fashion, if the vendor and unit of measure substitution variables have valid combinations but the item category is different than the one listed in table 83, then there are no profit enhancement options to be analyzed for the current item and processing advances to the next item (if any).

In the instances when the substitution variables are in valid combinations for the current start block and item is in the proper category, the processing steps are virtually identical as shown in Table 84.

TABLE 84

| Processing Step | Start Block 706 | Start Block 718 | Start Block 736 |
| --- | --- | --- | --- |
| Retrieve next item quantity item | Block 708 | Block 719 | Block 737 |
| Calculate UM Conversion Factors | Block 710 | Block 720 | |
| Check Item Category | Block 709 | Block 721, 722 & 723 | Block 738 |
| Set equations for a Class A analysis | | Block 724 | |
| Set equations for a Class B analysis | | Block 725 | Block 739 |
| Set equations for a Class C analysis | Block 711 | Block 726 | |
| Determine profit maximizing solution | Block 615 | Block 615 | Block 615 |
| Check for profit increase | Block 712 | Block 727 | Block 740 |
| Determine new requisition set | Block 714 | Block 728 | Block 741 |
| Determine capital efficiency | Block 715 | Block 729 | Block 742 |
| Check for last item quantity discount item | Block 716 | Block 731 | Block 743 |

Because of the similarity in the processing steps for each of the different paths available for completing profit enhancement calculations, the description of the three paths will be presented together. The differences between the different paths will be highlighted as required as part of the discussion.

The first step in profit enhancement calculations for item quantity discount items involves the retrieval of the next item quantity discount item with current, base level requisitions stored in the requisitions table 185. The software in a block 719 retrieves the requisitions table, item master table, item vendor master table, unit of measure schedule master table, unit of measure master table and vendor item price schedule table information for the item selected. In a similar fashion, the software in a block 708 retrieves the requisitions table, item master table, unit of measure schedule master table, unit of measure master table, and vendor item price schedule table information for the chosen item and the software in block 737 retrieves the requisitions table item master table, item vendor master table, and the vendor item price schedule table information for the item.

The next step in processing for the item that starts its processing in block 718 is the determination of the unit of measure multiples that are associated with the item. This is also the next step in processing for the item that starts its processing in block 706. The software in a block 708 or 719 organizes the information previously retrieved from the unit of measure schedule master table 157 and unit of measure master table 155 for the item. The software in these blocks then determines the multipliers required for converting the current unit of measure order quantities to different units of measure in a manner identical to that described previously during the base level requisition description. Items that start their profit enhancement calculations in block 738 have no unit of measure conversion factors calculated because their analysis only examines the potential benefits of changing vendors.

The next step in processing checks the value of the item category variable ('bas_cat') for the retrieved item to determine if the profit enhancement processing should continue for this item. This check is made to prevent completing calculations that will provide no new information. For example, start block 706 is the starting block for calculations when the removal of global unit of measure substitution restrictions is permitted and the removal of global vendor substitution restrictions isn't permitted. Under these circumstances, removing the global unit of measure restrictions will have no impact on items that don't permit unit of measure substitution at the item level (category 2 and 4 items) and reprocessing an item with the restriction would provide no new information. Continuing the example, if the software in a block 709 determined that the category of the retrieved item was 2 or 4, then the requisition status variable for the stored requisitions for the item would be changed to 'f' for final and processing would advance to the final step in the processing loop. In a similar fashion, the software in a block 738 checks the category of the retrieved item to determine if further processing to analyze potential savings from changing vendors would produce a benefit. If the software in block 738 determines that the item is a category 3 or 4 item, then the requisition status variable for the stored base level requisitions for the item would be changed to 'f' for final and processing would advance to the final step in the processing loop. In both cases, if the item was found to be in the proper category then processing would advance to the next stage where the equations and constraints for the profit maximization calculation are prepared.

For items that start their profit enhancement calculations in a block 718 there are more steps required to check the item category than for the other blocks. The first step in this part of the processing occurs in a block 721 where the software in the block determines if the item is a category 1 item. If the item is a category 1 item, then processing advances to the equation set up block for class A items. If the item is not a category 1 item, processing advances to a block 722 which determines if the item is a category 2 item. If the item is a category 2 item, then processing advances to an equation set up block for a class B item. If the item is not a category 2 item, processing advances to a block 723 which determines if the item is a category 3 item. If the item is a category 3 item, then processing advances to an equation set up block for a class C item. If the item is not a category 3 item then it must be a category 4 item. If the item is a category 4 item then the requisition status variable for the base level requisitions for the item would be changed to 'f' for final and processing would advance to the final step in the processing loop.

The preparation of the equations and constraints required to complete a profit maximization calculation for the item is the next step in processing for items from all three starting blocks. The preparation of these equations is completed in a manner identical to that described previously for the base level requisitions and detailed in the Appendix. The types of equations prepared by the different blocks vary as required by the restriction removal, global substitution and item substitution variables. For purposes of this analysis, class A items are defined as items where vendor, unit of measure and associated quantity changes are considered. The equations for these analyses are prepared in a block 724. For purposes of this analysis, class B items are defined as items where vendor and associated quantity changes are considered. The equations for these analyses are prepared in a block 725 or a block 739. For purposes of this analysis, class C items are defined as items where unit of measure and associated quantity changes are considered. The equations for these analyses are prepared in a block 711 or a block 726. The profit maximization calculation is completed in block 615 by the same software package described in the base level requisition description.

After the software in block 615 completes the profit maximization calculation for the item, processing advances to a block 712, 727 or 740. The software in these blocks check the results of the just completed calculation to see if the profit enhancement solution generated an increase in profit over the base level. Base level profit is defined as the level of the profit generated by the sale of the base requisition quantity less the cost of purchasing the base level requisitions. If the software in block 712, 727, or 740 determines that there was no increase in profitability, then the requisition status variables for the base level requisitions for the item are changed from base (req_st='b') to final (req_st='f') in the requisition table 185 in the application database 90 and processing advances to the final step in the processing loop.

Alternatively, if the software in block 717, 727, or 740 determines that the profit maximizing solution generated an increase in profit over the base level and that the calculation is not a deficit calculation, then the software in these blocks changes the requisition status variable for the stored item requisitions from base to profit enhanced (req_st='p') and advances processing to the next step where the new requisition set is created. If the calculation was being completed as part of a deficit calculation then the requisition status variable would be changed to 'd' for deficit.

After the status of the requisitions for the item have been changed to deficit or profit enhanced, processing advances to a block 714, a block 728, or a block 741 where the requisition set for the profit maximized solution is created. The processing completed in blocks 714, 728, and 741, determines the most cost effective set of requisitions for the item that match the forecast period quantities contained in the profit maximized solution. For example, if the base level requisitions for item abcxyz called for 10 requisitions of 1,200 each during the forecast time period and the maximum profit solution called for a total forecast period purchase of 130 cartons (containing 100 each), then the software in block 714, 728, and 741 would recalculate the Economic Order Quantity for the item and recalculate the order dates using the method detailed in the previous discussion of block 319 processing. If the calculation is not a deficit calculation, the resulting solution is saved in the alternate requisition table 187 for the item after the capital efficiency of purchasing the alternate requisition set has been determined in the next step in processing. If the calculation is a deficit calculation then the previous requisitions for the item are deleted and the resulting solution is saved in the item requisition table 185 with a status of 'm' for maximized.

The software in a block 715, a block 729, or a block 742 determines the capital efficiency of changing the planned purchases to the profit enhanced quantities, vendors and units of measure. The software in blocks 715, 729, or 742 starts this calculation by calculating the change in average working capital for the item during the forecast time period as shown below:

$$C=((Q_m \times P_m)/2)-((Q_b \times P_b)/2)$$

Where:

C=Change in working capital $Q_m$=Order quantity for profit maximized solution $P_m$=Average unit price for profit maximized solution $Q_b$=Order quantity for base requisition solution $P_b$=Average unit price for base requisition solution The change in average working capital is then combined with the forecast period savings using the formulas shown in table 79 to calculate the capital efficiency of the change. After this calculation is completed, the software in the block completing the calculation stores the profit maximizing solution in the item change table 186 and the alternate requisition set in table 187 of the application database 90. Processing then advances to a block 716, a block 731, or a block 743 where the software in the block checks the requisition table 185 to see if there are any remaining item-quantity discount items with base level requisitions (req_st='b'). If there are still items that haven't been profit maximized or finalized, then processing loops back to block 708, 719, or 737 where the next item is retrieved for processing.

If all item quantity discount items have profit enhanced, maximized or final requisitions (req_st='p', 'm' or 'f'), then processing advances to the profit maximizing calculation for business volume discount items. From block 716, processing advances to a block 717 where it is transferred to a block 770 for the start of business volume discount profit enhancement calculations. From block 731, processing advances to a block 732 where it is transferred to a block 749 for the start of business volume discount profit enhancement calculations. From block 743, processing advances to a block 744 where it is transferred to a block 758 for the start of business volume discount profit enhancement calculations.

The business-volume-discount item profit maximization processing varies depending on the value of the variables 'venmax' and 'ummax' stored in the system setting table 160. Table 84 shows the different business volume discount item analyses completed by the software of the present invention and the starting point for profit enhancement calculations as a function of the value of the two variables.

TABLE 84

| Variables (start block) | Business volume discount item profitability analyses: |
|---|---|
| venmax-Y/ ummax-Y | 1. Increase in profitability after removing vendor and/or unit of measure and associated quantity restrictions |
| | 2. Increase in profitability after removing vendor and associated quantity restrictions |

TABLE 84-continued

| Variables (start block) | Business volume discount item profitability analyses: | |
| --- | --- | --- |
| | 3. | Increase in profitability after removing unit of measure and associated quantity restrictions |
| venmax-Y/ ummax-N (block 758) | 1. | Increase in profitability after removing vendor and quanity restrictions |
| venmax-N/ ummax-Y (block 770) | 1. | Increase in profitability after removing unit of measure and quantity restrictions |

The processing that is completed for business volume discount items when both vendor and unit of measure restrictions can be removed will be detailed below. As shown above, the analyses completed by the application software of the present invention in this situation includes all three analyses that can be performed by the present invention.

In this instance, the business volume discount item profit maximization calculation begins when processing advances from block 749 to a block 750. The software in block 750 prepares the equations and constraints required for determining the most profitable mix of vendors, units of measure and quantities for purchases made on a business volume, commitment basis. The overall profitability equation for this Class A analysis is created by combining the equations that have been prepared for each business volume discount item. This overall equation is the objective function that is maximized by the processing in the advanced system for inventory management. This objective function is detailed in the Appendix in Section 2C. After the maximization calculation has been completed, the resulting mix is stored in the business volume mix table 188. The solution is then compared to the solution generated for the base level requisitions for these items by the software in a block 751 to determine if the profit enhancement solution generated a profit increase during the business volume discount time period (in comparison with the base level profit). If a profit increase wasn't generated by the profit enhancement, the software in block 751 changes the requisition status variable for the stored base level requisitions to 'f' for final and advances processing to the as-ordered item profit enhancement calculation after storing the changes in the item requisition table 185 application database 90. If a profit increase was generated by the new mix, then the requisition status variable of the stored base level requisitions is changed to 'p' for profit enhanced or 'd' if the calculation is a deficit calculation and processing advances to a block 752 where a new set of requisitions is prepared to reflect the new mix. These calculations are completed in accordance with the procedures described previously for requisition determination. If the forecast time period extends beyond the business volume discount time period, then the requisitions for this time period are also adjusted in the manner described previously. From block 752 processing advances to a block 753 where the capital efficiency of the profit enhancing change is evaluated in accordance with the appropriate equation from Table 79. The calculated changes are then stored in the application database 90. More specifically, the changes in requisition status that were made to the base level requisitions are stored in table 185, the profit enhancing requisition set is stored in the alternate requisition table 187 if the calculation was not a deficit calculation and the capital efficiency information is stored in the business volume mix table 188. If the calculation was part of a deficit calculation, then the requisitions are saved to the item requisition table 185 with a maximized status (req_st=m) and the prior set of requisitions are deleted. Processing then advances to the Class A, profit enhancement calculation for as-ordered items.

The calculation of a Class A, profit enhancing mix for business volume discount items purchased on an as ordered basis proceeds in a manner that is virtually identical to that described above for the business volume discount commitment purchase analysis. The software in a block 754 prepares the equations and constraints for each item and assembles them together to form the objective function that is to be maximized. The objective function for the as-ordered item enhancement calculation is virtually identical to that used for the commitment items except different unit prices are used if the commitment prices are not locked in and the quantity constraints are modified to reflect the planned purchases on a commitment basis. These changes are detailed in section 2D of the Appendix. The resulting objective function is maximized by block 615 and the profit increase comparison is completed by the software in a block 755. The software in block 755 also changes the requisition status variable for stored item requisitions from base to final or profit enhanced as appropriate. If the profit enhancement calculation produced an increase in forecast profit, then the new requisition set is calculated by the software in a block 756 and the capital efficiency of the resulting change is calculated by the software in a block 757. At this point, all changes are stored in the appropriate tables in the application database 90 and processing advances to a block 759 for the start of the class C (vendor change) profit enhancement calculation.

Block 759 is also the starting point for business volume profit enhancement calculations when item quantity discount processing ends in block 743 as described previously. The calculation of a Class C, profit enhancing mix for business volume discount items purchased on a commitment basis proceeds in a manner that is virtually identical to that described above for the Class A business volume discount commitment purchase analysis. The software in block 759 prepares the equations and constraints for each item and assembles them together to form the objective function that is to be maximized. The objective function for the Class C, item enhancement calculation is virtually identical to that used for the Class A, commitment items except different unit of measure options are not included. These changes are detailed in the Appendix. The resulting objective function is maximized by block 615 and the profit increase comparison is completed by the software in a block 760. The software in block 760 also changes the requisition status variable for stored item requisitions from base to final or profit enhanced as appropriate. If the profit enhancement calculation produced an increase in forecast profit, then the new requisition set is calculated by the software in a block 761 and the capital efficiency of the resulting change is calculated by the software in a block 762. At this point, all changes are stored in the appropriate tables in the application database 90 and processing advances to a block 762 for the start of the class C business volume as-ordered profit enhancement calculation.

The calculation of a Class C, profit enhancing mix for business volume discount items purchased on an as ordered basis proceeds in a manner that is very similar to that described above for the Class C, business volume discount commitment purchase analysis. The software in a block 763 prepares the equations and constraints for each item and assembles them together to form the objective function that is to be maximized. The objective function for the as-ordered item enhancement calculation is virtually identical to that used for the commitment items except different unit prices are used if the commitment prices are not locked in and the quantity constraints are modified to reflect the planned purchases on a commitment basis. These changes are detailed in the Appendix. The resulting objective function is maximized by the software in block 615 and the profit increase comparison is completed by the software in a block 764. The software in block 764 also changes the requisition status variable for stored item requisitions from base to final or profit enhanced as appropriate. If the profit enhancement calculation produced an increase in forecast profit, then the new requisition set is calculated by the software in a block 765 and the capital efficiency of the resulting change is calculated by the software in a block 766. At this point, all changes are stored in the appropriate tables in the application database 90 and processing advances to a block 767 where the next step in processing is determined. If the preceding calculation was not a continuation of a class A profit enhancement calculation, then processing advances to block 779 where the software in the block determines if preceding calculation was a deficit calculation (as defined by the deficit variable in the forecast scenario table). If the preceding calculation was a deficit calculation then processing is advanced to block 127. Alternatively, if the preceding calculation was not a deficit calculation then processing is advanced to block 137. If the preceding calculation was the continuation of a Class A profit enhancement calculation, then processing advances to a block 771 for the start of the class B (unit of measure change) profit enhancement calculation.

Block 771 is also the starting point for business volume profit enhancement calculations when item quantity discount processing ends in block 717 as described previously. The calculation of a Class B, profit enhancing mix for business volume discount items purchased on an as commitment basis proceeds in a manner that is similar to that described above for the Class A and Class C business-volume discount commitment purchase analyses. The software in a block 771 prepares the equations and constraints for each item and assembles them together to form the objective function that is to be maximized. The objective function for the Class B, item enhancement calculation is virtually identical to that used for the other analyses except different vendor options are not considered. These changes are detailed in the Appendix. The resulting objective function is maximized by the software in block 615 and the profit increase comparison is completed by the software in a block 772. The software in block 772 also changes the requisition status variable for stored item requisitions from base to final or profit enhanced as appropriate. If the profit enhancement calculation produced an increase in forecast profit, then the new requisition set is calculated by the software in a block 773 and the capital efficiency of the resulting change is calculated by the software in a block 774. At this point, all changes are stored in the appropriate tables in the application database 90 and processing advances to a block 775 for the start of the class B as-ordered profit enhancement calculation.

The calculation of a Class B, profit enhancing mix for business volume discount items purchased on an as ordered basis proceeds in a manner that is virtually identical to that described above for the other business volume discount purchase analyses. The software in a block 775 prepares the equations and constraints for each item and assembles them together to form the objective function that is to be maximized. The objective function for the Class B, as-ordered item enhancement calculation is virtually identical to that used for the other as-ordered analyses except different vendor options are not included. These changes are detailed in the Appendix. The resulting objective function is maximized by the software in block 615 and the profit increase comparison is completed by the software in a block 776. The software in block 776 also changes the requisition status variable for stored item requisitions from base to final or profit enhanced as appropriate. If the profit enhancement calculation produced an increase in forecast profit, then the new requisition set is calculated by the software in a block 777 and the capital efficiency of the resulting change is calculated by the software in a block 778. At this point, all changes are stored in the appropriate tables in the application database 90 and processing advances to a block 779 for the determination of the next step in processing. If the preceding calculation was a deficit calculation (as defined by the deficit variable in the forecast scenario table), then processing is transferred to block 445. Alternatively, if the preceding calculation was not a deficit calculation then processing is advanced to block 136.

If processing was returned to block 445 then the processing described previously for forecasting the cost of goods sold account and the overall financial forecast is repeated by the relevant sections of the financial forecast subsystem. The maximized requisitions are used for this calculation in place of the base level requisitions for items that were profit enhanced. Processing then returns to block 128 where the determination is made as to whether available capital is above the user specified minimum in all periods. If the available capital is still below the minimum level during some periods, then processing advances to block 127 where the forecast is displayed using the format previously specified by the user. As described previously, the software in block 130 will determine at this point that the deficit variable in the scenario control table is already set to 'yes'. As a result, the user 60 will not be given the option to run the profit enhancement calculation. The software in block 130 will transfer processing block 125 and on from there to the initial data entry screens in block 100 where the user 60 will have the option of changing the system settings, item specifications or individual forecast elements as required to produce a financial forecast that is acceptable.

If the deficit calculation was able to eliminate the previously forecast shortfall in available capital, then processing advances to block 129 where the software in the block generates a display in the format previously chosen by the user 60. The user is then prompted by the software in block 132 to determine if the resulting financial forecast is acceptable to the user 60. If the forecast is acceptable then processing passes to block 133 where the software in the block again checks to see if the preceding calculations were deficit calculations. If the preceding calculations were not deficit calculations, then processing would advance to the profit enhancement calculations as described previously. In the situation where the calculations are profit enhancement calculations, system processing is advanced to a block 143 where a management summary report is generated and displayed to the user 60. From this point, processing continues to completion as described below.

If the completed profit enhancement calculations are not deficit calculations, then the software processing transferred from block 136 to a block 137. The software in block 137 creates and displays a listing of potential changes to the base level requisitions listed in descending capital efficiency order (i.e., the changes with the highest capital efficiency are first). The business-volume changes are simply listed as business volume committed items with no quantity restrictions, business volume committed items with no vendor restrictions, business volume committed items with no restrictions, business volume as ordered items with no quantity restrictions, business volume as ordered items with no vendor restrictions, business volume as ordered items with no restrictions.

After the display is created, processing advances to a block 138. The software in block 138 gives the user 60 the option of accepting any of the displayed profit enhancing changes until the sum of the increases in average capital investment for the accepted changes is equal to the lowest available capital balance during the forecast time period. After the user has indicated to the software in block 138 that no more changes will be accepted, the accepted changes are saved in the application database 90 and processing passes to a block 139 where the base level financial forecast is revised to reflect the impact of the accepted changes to base level requisitions. A display of the revised forecast is then generated by the software in a block 140 in the format previously chosen by the user 60. The user 60 is then prompted by the software in a block 141 to accept or reject the revised financial forecast. If the user rejects the revised financial forecast then processing returns to block 137 where the original prioritized listing of the potential changes to base level requisitions is displayed and the processing described above for blocks 137 to 141 is repeated until the user 60 accepts the revised financial forecast.

Once the user 60 provides input to the software in block 141 that indicates acceptance of the revised financial forecast processing passes to the software in a block 142 where the base level requisitions are revised to reflect the changes accepted by the user 60. After storing the revised base level requisitions in the application database 90, processing passes to the software in a block 143 where a management report summarizing dollar value of the created requisitions and of the average inventory levels during the forecast time period is created and displayed to the user 60. Processing then passes to a block 144 which prompts the user 60 to print additional management reports, print the requisitions and/or stop the system processing. If the user's input to the application software of the present invention indicates that additional reports or requisitions are desired, then the software in block 145 passes processing to a block 146 where the additional reports are created using information from the application database before sending the reports to the printer 14. Report options include ability to compare scenarios. After the printing is completed, processing advances to a block 147. In block 147, any database filters that restricted the items, locations, or accounts being forecast are removed and processing stops. If the user 60 doesn't wish to print any management reports or requisitions then processing passes directly from block 145 to block 147.

Thus, the reader will see that system and method described above transforms extracted, basic financial system transaction data the into detailed, multivalent forecasts of sales, cash receipt trends, inventory requirements and corporate financial status. The preparation of these forecasts is aided by the calculation, storage and use of an innovative variable for each forecast element that facilitates forecast synchronization and reduces obsolescence risk. The present invention then displays and uses these synchronized forecasts to create profit maximizing sets of requisitions for item quantity discount items and business volume discount items that minimize obsolescence risk and are feasible under the forecast financial constraints accepted by the user.

While the above description contains many specificities, these should not be construed as limitations on the scope of the invention, but rather as an exemplification of one preferred embodiment thereof. Accordingly, the scope of the invention should be determined not by the embodiment illustrated, but by the appended claims and their legal equivalents.

Appendix

The general form of all profit maximization objective functions that are presented below is:

Profit=sales revenue−(planned requisition costs+change* in storage cost) *change from forecast storage cost for preliminary requisitions.

All of the profit maximization objective functions have equations for planned requisition costs in the general form:

$$\Sigma \Sigma \Sigma \left( \begin{matrix} a=A & b=B & c=C \\ P_{abc} \times Q_{abc} \times U_c \\ a=1 & b=1 & c=1 \end{matrix} \right)$$

An example is presented below in order to clearly illustrate the variety of equations that the advanced inventory management system of the present invention creates for the profit maximization analyses. Item 'z' is available from three different vendors (j,k & l) each of whom offers two different units of measure (p & q). If global vendor substitution, global unit of measure substitution, item vendor substitution and item unit of measure substitution were permitted, then the application software of the present invention would generate the following set of equations for analyzing purchases on a business volume commitment basis:

$$\Sigma(((P_{jzp} \times Q_{jzp} \times U_p) + (P_{jzq} \times Q_{jzq} \times U_q)) \times (1 - d_{jn}) \times Y_{jn}) +$$
$$(((P_{kzp} \times Q_{kzp} \times U_p) + (P_{kzq} \times Q_{kzq} \times U_q)) \times (1 - d_{kn}) \times Y_{kn}) +$$
$$(((P_{izp} \times Q_{izp} \times U_p) + (P_{izq} \times Q_{izq} \times U_q)) \times (1 - d_{in}) \times Y_{in})$$

For the same item with global vendor substitution and item vendor substitution being the only available options, the application software of the present invention would create the following set of equations:

$$\Sigma((P_{jzp} \times Q_{jzp} \times U_p) \times (1 - d_{jn}) \times Y_{jn}) +$$
$$((P_{kzp} \times Q_{kzp} \times U_p) \times (1 - d_{kn}) \times Y_{kn}) +$$
$$((P_{izp} \times Q_{izp} \times U_p) + (1 - d_{in}) \times Y_{in})$$

If item 'z' was being analyzed with global and item unit of measure substitution being the only available options, then the application software of the present invention would create the following set of equations:

$$\Sigma((P_{jzp} \times Q_{jzp} \times U_p) + (P_{jzp} \times Q_{jzp} \times U_q)) \times (1 - d_{jn}) \times Y_{jn})$$

The details of the equations and constraints generated by the application software of the present invention are presented below in the order they are discussed in the detailed specification.

1A. Item Quantity Discount Item Profit Maximization—Unit of Measure Substitution Analysis Profit =

$$(S_d \times N_d) - \sum_{a=a}^{a} \sum_{b=1}^{B} \sum_{c=1}^{C} (P_{abcd} \times Q_{acd} \times U_c) \times Y_{ab} -$$

$$\left( \left( \sum_{a=a}^{a} \sum_{c=1}^{C} (Q_{acd} \times U_c) - R_{dpre} \right) \times P_d \times (i/K) \right)$$

Subject to:
$Y_{ab} = [0,1]$

-continued $$\sum_{b=1}^{B} Y_{ab} = 1 \text{ for } a \sum_{a=a}^{a} \sum_{c=1}^{C} (Q_{acd} \times U_c) \geq R_{dpre}$$

Where:
- a=specified vendor for item d purchases (from requisition table 185)
- b=1,2,3 . . . B divisions in business the item quantity discount schedule
- c=1, 2 , 3 . . . C units of measure
- $S_d$=Sale price of item d (from item unit price forecast table 191)
- $N_d$=Total quantity of item d sold during the forecast time period (from item forecast table 182)
- i=inventory carrying cost (% per time period—from system setting table 160)
- K=total number of forecast time periods (from system setting table 160)
- $P_d$=current price paid for item d (from item master table 153)
- $P_{abcd}$=unit price for item d when purchased from vendor a using unit of measure c from section b of the quantity discount schedule (from vendor item price schedule table 191)
- $Q_{acd}$=Quantity of item d purchased from vendor a in unit of measure c
- $U_c$=Factor that converts unit of measure c to the base unit of measure (previously calculated)
- $Y_{ab}$=0 if the total quantity of planned and actual year to date purchases from vendor a is less than the lower bound of division b or greater than the highest bound of division b; or
- 1 if the total quantity of planned and actual year to date purchases from vendor a is more than the lower bound of division b and less than the higher bound of division b
- $R_{dpre}$=total preliminary requisition quantity for item d during the forecast time period (from requisition table 185)

1B. Item Quantity Discount Item Profit Maximization—Vendor Substitution Analysis Profit =

$$(S_d \times N_d) - \sum_{a=1}^{A} \sum_{b=1}^{B} \sum_{c=c}^{c} (P_{abcd} \times Q_{acd} \times U_c) \times Y_{ab} - \left( \left( \left( \sum_{a=1}^{A} \sum_{c=c}^{c} (Q_{acd} \times U_c) \right) - R_{dpre} \right) \times P_d \times (i/K) \right)$$

Subject to:
$Y_{ab} = [0,1]$ $$\sum_{b=1}^{B} Y_{ab} = 1 \text{ for every } a \sum_{a=1}^{A} \sum_{c=c}^{C} (Q_{acd} \times U_c) \geq R_{dpre}$$

Where:
- a=1,2,3 . . . A units of measure
- b=1,2,3 . . . B divisions in business the item quantity discount schedule
- c=specified unit of measure for item d purchases (from requisition table 185)
- $S_d$=Sale pdce of item d (from item unit price forecast table 191)
- $N_d$=Total quantity of item d sold during the forecast time period (from item forecast table 182)
- i=inventory carrying cost (% per time period–from system setting table 160)
- K=total number of forecast time periods (from system setting table 160)
- $P_d$=current price paid for item d (from item master table 153)
- $P_{abcd}$=unit price for item d when purchased from vendor a using unit of measure c from section b of the quantity discount schedule (from vendor item price schedule table 191)
- $Q_{acd}$=Quantity of item d purchased from vendor a in unit of measure c
- $U_c$=Factor that converts unit of measure c to the base unit of measure (previously calculated)
- $Y_{ab}$=0 if the total quantity of planned and actual year to date purchases from vendor a is less than the lower bound of division b or greater than the highest bound of division b; or
- 1 if the total quantity of planned and actual year to date purchases from vendor a is more than the lower bound of division b and less than the higher bound of division b
- $R_{dpre}$=total preliminary requisition quantity for item d during the forecast time period (from requisition table 185)

1C. Item Quantity Discount Item Profit Maximization—Vendor & Unit of Measure Substitution Analysis Profit =

$$(S_d \times N_d) - \sum_{a=1}^{A} \sum_{b=1}^{B} \sum_{c=1}^{C} (P_{abcd} \times Q_{acd} \times U_c) \times Y_{ab} - \left( \left( \sum_{a=1}^{A} \sum_{c=1}^{C} (Q_{acd} \times U_c) - R_{dpre} \right) \times P_d \times (i/K) \right)$$

Subject to:
$Y_{ab} = [0,1]$ $$\sum_{b=1}^{B} Y_{ab} = 1 \text{ for every } a \sum_{a=1}^{A} \sum_{c=1}^{C} (Q_{acd} \times U_c) \geq R_{dpre}$$

Where:
- a=1,2,3 . . . A vendors
- b=1,2,3 . . . B divisions in business the item quantity discount schedule
- c=1,2,3 . . . C units of measure
- $S_d$=Sale price of item d (from item unit price forecast table 191)
- $N_d$=Total quantity of item d sold during the forecast time period (from item forecast table 182)
- i=inventory carrying cost (% per time period–from system setting table 160)
- K=total number of forecast time periods (from system setting table 160)
- $P_d$=current purchase price paid for item d (from item master table 153)
- $P_{abcd}$=unit price for item d when purchased from vendor a using unit of measure c from section b of the quantity discount schedule (from vendor item price schedule table 191)
- $Q_{abcd}$=Quantity of item d purchased from vendor a in unit of measure c
- $U_c$=Factor that converts unit of measure c to the base unit of measure (previously calculated)
- $Y_{ab}$=0 if the total quantity of planned and actual year to date purchases from vendor a is less than the lower bound of division b or greater than the highest bound of division b; or
- 1 if the total quantity of planned and actual year to date purchases from vendor a is more than the lower bound of division b and less than the higher bound of division b
$R_{dpre}$=total preliminary requisition quantity for item d during the forecast time period (from requisition table 185)

2A. Business Volume Discount Item Profit Maximization—commitment purchases

Profit =

$$\sum_{a=1}^{A} \sum_{b=1}^{B} \sum_{c=1}^{C} ((Q_{abc} \times U_c) \times S_b) -$$

$$\sum_{a=1}^{A} \sum_{b=1}^{B} \sum_{c=1}^{C} \sum_{n=1}^{N} (P_{abc} \times Q_{abc} \times U_c) \times (1 - d_{an}) \times Y_{an}$$

Subject to:
$Y_{an} = [0,1]$ $$\sum_{n=1}^{N} Y_{an} = 1 \text{ for every } a$$

$$\sum_{a=1}^{A} \sum_{c=1}^{C} (Q_{abc} \times U_c) \leq ((R_{bpre} + V_{bcom} + V_{bas}) * C_b) - (V_{bcom})$$

for every b that has a maximum commitment percentage specified, or $$\sum_{a=1}^{A} \sum_{c=1}^{C} (Q_{abc} \times U_c) \leq ((R_{bpre} + V_{bcom} + V_{bas}) * C_o) - (V_{bcom})$$

for every b that doesn't have a maximum commitment percentage specified $$\sum_{a=1}^{A} \sum_{c=1}^{C} (Q_{abc} \times U_c) \leq (M_a * C_o)$$

Where:
a=1,2,3 ... A vendors
b=1,2,3 ... B items
c=1,2,3 ... C units of measure
n=1,2,3 ... N divisions in business the volume discount schedule
$Q_{abc}$=Quantity of item b planned for purchase from vendor a in unit of measure c during the remaining time in the current business volume discount time period
$U_c$=Factor that converts unit of measure c to base unit of measure (calculated from unit of measure schedule master table 157 and unit of measure schedule table 155)
$S_b$=Average sale price of item b (from item unit price forecast table 191)
$P_{abc}$=Base unit price for item b when purchased from vendor a in unit of measure c on a business-volume, commitment basis or on an as-ordered basis when the commitment price is locked in (from business volume item price schedule table 190)
$d_{an}$=Base price discount percentage for the n division of the business volume discount structure for vendor a (from business volume master discount table 203)
$Y_{an}$=0 if the total value of planned and actual year to date purchases from vendor a is less than the lower bound of division n or greater than the highest bound of division n; or
1 if the total value of planned and actual year to date purchases from vendor a is more than the lower bound of division n or less than the higher bound of division n $R_{bpre}$=total preliminary requisition quantity for item b, planned for purchase during the remainder of the business volume discount time period (from requisition table 185)

$V_{bcom}$=total quantity of item b already purchased on a commitment basis during the business volume discount time period (from open order balance table 177)

$V_{as}$=total quantity of item b already purchased during the business volume discount time period on an as-ordered basis (from open order balance table 177)

$C_b$=Maximum commitment percentage for item b that was previously specified by the user (from item master table 153)

$C_o$=Maximum commitment percentage for all items that was previously specified by the user (from system setting table 160)

$M_a$=Maximum volume for vendor a during the business volume discount time period 2B. Business Volume Discount Item Profit Maximization—as ordered purchases $$\text{Profit} = \sum_{b=1}^{B} (N_b \times S_b) -$$

$$\sum_{a=1}^{A} \sum_{b=1}^{B} \sum_{c=1}^{C} \sum_{n=1}^{N} (P'_{abc} \times Q_{abc} \times U_c) \times$$

$$(1 - d_{an}) \times Y_{an} -$$

$$\left( \sum_{a=1}^{A} \sum_{b=1}^{B} \sum_{c=1}^{C} (Q_{abc} + R_{bcom}) - R_{bpre} \right) \times P_b \times (i/J)$$

Subject to:
$Y_{an} = [0,1]$ $$\sum_{n=1}^{N} Y_{an} = 1 \text{ for every } a$$

$$\sum_{a=1}^{A} \sum_{c=1}^{C} (Q_{abc} \times U_c) \geq (R_{bpre} - R_{bcom})$$

$$\sum_{a=1}^{A} \sum_{c=1}^{C} (Q_{abc} \times U_c) \leq (M_a - D_{acom}) \text{ for every } a$$

Where:
a=1,2,3 ... A vendors
b=1,2,3 ... B items
c=1,2,3 ... C units of measure
n=1,2,3 ... N divisions in business the volume discount schedule
$Q_{abc}$=Quantity of item b planned for purchase from vendor a in unit of measure c during the remainder of the business volume discount time period on an as-ordered basis
$U_c$=Factor that converts unit of measure c to base unit of measure (calculated from unit of measure schedule master table 157 and unit of measure schedule table 155)
$N_b$=Total quantity of item b that is forecast to be sold during the remainder of the business volume discont time period (from item forecast table 182)
$S_b$=Average sale price of item b (from item unit price forecast table 191)
$P'_{abc}$=Base unit price for item b when purchased from vendor a in unit of measure c on a business-volume, as-ordered basis (from business volume item price schedule table 190)
$d_{an}$=Base price discount percentage for the n division of the business volume discount structure for vendor a (from business volume master discount table 203)
$Y_{an}$=0 if the total value of planned and actual year to date purchases from vendor a is less than the lower bound of division n or greater than the highest bound of division n; or 1 if the total value of planned and actual year to date purchases from vendor a is more than the lower bound of division n or less than the higher bound of division n $R_{bpre}$=total preliminary requisition quantity for item b, planned for purchase during the remainder of the business volume discount time period (from requisition table 185)

$R_{bcom}$=total quantity of item b planned for purchase on a commitment basis during the remainder of the business volume discount time period (solution from prior calculation from business volume mix table 188)

$V_{as}$=total quantity of item b already purchased during the business volume discount time period on an as-ordered basis (from open order balance table 185)

$M_a$=maximum volume from vendor a during the business volume discount time period $D_{acom}$=total dollar value of requisitions from vendor a planned for purchase on a commitment basis during the remainder of the business volume discount time period (solution from prior calculation from business volume mix table 188)

i=inventory carrying cost (% per time period–from system setting table 160)

J=number of time periods remaining in the business volume discount time period (from business volume dates table 202)

$P_b$=current purchase price paid for item b (from item master table 153)

2C. Business Volume Discount Item Profit Enhancement–commitment purchases $$\text{Profit} = \sum_{a=1}^{A} \sum_{b=1}^{B} \sum_{c=1}^{C} ((Q_{abc} \times U_c) \times S_b) -$$

$$\sum_{a=1}^{A} \sum_{b=1}^{B} \sum_{c=1}^{C} \sum_{n=1}^{N} (P_{abc} \times Q_{abc} \times U_c) \times (1 - d_{an}) \times Y_{an}$$

Where all definitions are identical to those listed in 2A. The volume constraint is changed from:

$$\sum_{a=1}^{A} \sum_{c=1}^{C} (Q_{abc} \times U_c) \leq ((R_{bpre} + V_{bcom} + V_{bas}) * C_b) - (V_{bcom})$$

for every b that has a maximum commitment percentage specified, or $$\sum_{a=1}^{A} \sum_{c=1}^{C} (Q_{abc} \times U_c) \leq ((R_{bpre} + V_{bcom} + V_{bas}) * C_o) - (V_{bcom})$$

for every b that doesn't have a maximum commitment percentage specified to:

$$\sum_{a=1}^{A} \sum_{b=1}^{B} \sum_{c=1}^{C} (P_{abc} \times Q_{abc}) \leq (T - l) \times C_o$$

T=Total amount of capital available for requisition purchases during the business volume discount time period (from requisition capital table 201)

l=Forecast of the total amount of funds to be spent on purchasing item-quantity discount items during the business volume discount time period (from requisition capital table 201)

2D. Business Volume Discount Item Profit Enhancement— as ordered purchases $$\text{Profit} = \sum_{b=1}^{B} (N_b \times S_b) -$$

$$\sum_{a=1}^{A} \sum_{b=1}^{B} \sum_{c=1}^{C} \sum_{n=1}^{N} (P_{abc}' \times Q_{abc} \times U_c) \times (1 - d_{an}) \times Y_{an} -$$

$$\sum_{a=1}^{A} \sum_{b=1}^{B} \sum_{c=1}^{C} (Q_{abc} + R_{bcom}) - R_{bpre} \Big) \times P_b \times (i/J)$$

Where all definitions are identical to those listed in 2C. The volume constraint is changed from:

$$\sum_{a=1}^{A} \sum_{c=1}^{C} (Q_{abc} \times U_c) \geq (R_{bpre} - R_{bcom})$$

to:

$$\sum_{a=1}^{A} \sum_{b=1}^{B} \sum_{c=1}^{C} (P_{abc} \times Q_{abc}) \leq (T - l - D_{bcom})$$

$D_{bcom}$=total dollar value of requisitions for item b planned for purchase on a commitment basis during the remainder of the business volume discount time period (solution from prior calculation from business volume mix table 188)

I claim:

1. In a computer, a method of and system for generating feasible, profit maximizing requisition sets for products purchased under a variety of discount regimes, the method comprising the steps of:

a) specifying by user input to said computer the type of analysis to be run, the controlling forecast, target customer service levels, minimum capital levels and the primary source of historical transaction, forecast element specification and current balance information, user input, electronic files or a basic financial system database, b) specifying by user input to said computer a plurality of templates and data definitions for use in extracting, converting and storing data from the primary source, c) extracting, converting and storing the source data in the application database of the present system in a format suitable for use in the present system, d) applying a set of prescribed mathematical algorithms, as implemented by a computer program stored in the computer system, to the extracted source data to create, display and store forecasts of sales by account, sales by customer group, sales by item, cash receipts by account as a function of sales by account and cash receipts by customer group as a function of sales by customer group, e) generating and storing a variable with each forecast element that is calculated in accordance with system default or user specified weighting criteria that facilitates forecast synchronization and obsolescence risk reduction, f.) applying a set of prescribed mathematical algorithms, as implemented by a computer program stored in the computer system, to the forecasts of sales by account, sales by customer group and sales by item, cash receipts by account and cash receipts by customer group to create and store a multivalent composite forecast of sales and of cash receipts, g) using the stored variable for each forecast element to prioritize and quantify the adjustments made to each forecast element in the sales by account, sales by customer group, sales by item, cash receipt by account and cash receipt by customer group forecasts as they are adjusted to exactly match the controlling forecast designated by the user, h) applying a set of prescribed mathematical algorithms, as implemented by a computer program stored in the computer system, to said sales by item forecast and item balance information to create a set of preliminary requisitions for all items that satisfy forecast demand with current vendors and units of measure while maintaining user specified service level targets, i) calculating the profit maximizing requisition set for all items under a variety of discount regimes within the constraints on vendor and unit of measure substitution established by the user, j) applying a set of prescribed mathematical algorithms as implemented by a computer program stored in the computer system, to account history information and said forecast of sales by account to create a forecast of expenses by account as well as a balance sheet account balance forecast for use in a financial forecast, k) creating and displaying a financial forecast on the computer system in the format specified by the user, l) determining if the forecast financial situation of the commercial enterprise provides for sufficient funds to purchase the profit maximizing set of requisitions (steps a–p are repeated until this condition is satisfied), m) calculating potential profit enhancing requisition sets for specific items under a variety of discount regimes, within the forecast financial constraints after relaxing user specified restrictions on global vendor and unit of measure substitution, n) creating and then displaying on the computer system a listing of the potential profit enhancing changes to the profit maximizing requisition set listed in descending capital efficiency order, o) specifying by user input to said computer the specific profit enhancing changes that are to be included in the profit maximizing requisition set, p) displaying on the computer system a report that summarizes the final profit maximizing requisition set and the forecast inventory status, and q) optionally printing financial management and requisition summary reports.

2. The method as recited in claim 1 wherein said step calculating the profit maximizing requisition set for all items under a variety of discount regimes includes the steps of:

a) determining a profitability equation and a set of constraints for the forecast time period for each item quantity discount item using extracted source data, b) maximizing said profitability equation for each item quantity discount item with a multi-objective, mixed integer, linear programming technique, c) determining a profitability equation and a set of constraints for the business volume discount time period for the business volume discount items using extracted source data, d) maximizing said profitability equation for business-volume discount commitment purchases and business-volume discount as-ordered purchases with a multi-objective, mixed integer, linear programming technique, and e) adjusting the vendor, unit of measure and quantity mix of any preliminary requisitions for business volume discount items that exist for the period between the end of the business volume discount time period and the end of the forecast time period to match the mix of actual and planned purchases during the business volume discount time period.

3. The method as recited in claim 1 wherein said step calculating a profit enhancing set of requisitions for items under a variety of discount regimes includes the steps of:

a) determining a profitability equation and a set of constraints for the forecast time period for each item quantity discount item using extracted source data after removing the specified global vendor and/or unit of measure constraints, b) maximizing said profitability equation for each item quantity discount item with a multi-objective, mixed integer, linear programming technique, c) determining a profitability equation and a set of constraints for the business volume discount time period for the business volume discount items using extracted source data after removing the specified global vendor and/or unit of measure constraints, d) maximizing said profitability equation for business-volume discount commitment purchases and then the business-volume discount as-ordered purchases with a multi-objective, mixed integer, linear programming technique, and e) adjusting the vendor, unit of measure and quantity mix of any preliminary requisitions for business volume discount items that exist for the period between the end of the business volume discount time period and the end of the forecast time period to match the mix of actual and planned purchases during the business volume discount time period.

4. The method as recited in claim 1 wherein the user has the ability to specify restrictions on vendor and unit of measure substitution during profit maximization calculations both globally and at the item level.

5. The method as recited in claim 1 wherein the user has the ability to specify an obsolescence date and a successor item for items that are expected to become obsolete during the forecast time period.

6. The method as recited in claim 1 wherein said forecasts of sales by account, sales by customer group, sales by item, and expenses by account are calculated using either user specified computation algorithms or weighted averages of the best fit forecasts where the weightings are determined in accordance with a preprogrammed multivalent weighting criteria.

7. In a computer, a method of and system for generating, displaying and storing forecasts of the type used in inventory management and financial planning, the method comprising the steps of:

a) specifying by user input to said computer the type of forecast to be run and the primary source of historical transaction, forecast element specification and current balance information, user input, electronic files or a basic financial system database, b) specifying by user input to said computer a plurality of templates and data definitions for use in extracting, converting and storing data from the primary source, c) extracting, converting and storing the source data in the application database of the present system in a format suitable for use in the present system, d) applying a set of prescribed mathematical algorithms, as implemented by a computer program stored in the computer system, to the extracted source data to create, display and store forecasts of sales by account, sales by customer group, sales by item, cash receipts by account as a function of sales by account and cash receipts by customer group as a function of sales by customer group, e) generating and storing a variable with each forecast element that is calculated in accordance with system default or user specified weighting criteria that facilitates forecast synchronization and obsolescence risk reduction, f) applying a set of prescribed mathematical algorithms, as implemented by a computer program stored in the computer system, to the forecasts of sales by account, sales by customer group and sales by item, cash receipts by account and cash receipts by customer group to create and store a multivalent composite forecast of sales and of cash receipts, and g) using the stored variable for each forecast element to prioritize and quantify the adjustments made to each forecast element in the sales by account, sales by customer group, sales by item, cash receipt by account and cash receipt by customer group forecasts as they are adjusted to exactly match a controlling forecast designated by the user or entered by the user into said computer.

8. The method as recited in claim 7 wherein said forecasts of sales by account, sales by customer group, and sales by item are calculated using either user specified computation algorithms or weighted averages of the best fit forecasts where the weightings are determined in accordance with a preprogrammed multivalent weighting criteria.

9. The method as recited in claim 6 wherein said step of specifying the type of analysis to be run provides the user with option of restricting processing to a specific site, department, or division.

10. In a computer, a method of and system for generating, displaying and storing forecasts of the type used for cash management, the method comprising the steps of:

a) specifying by user input to said computer the primary source of historical transaction, forecast element specification and current balance information, user input, electronic files or a basic financial system database, b) specifying by user input to said computer a plurality of templates and data definitions for use in extracting, converting and storing data from the primary source, c) extracting, converting and storing the source data in the application database of the present system in a format suitable for use in the present system, d) applying a set of prescribed mathematical algorithms, as implemented by a computer program stored in the computer system, to the extracted source data to create, display and store multivalent forecasts of sales by account, sales by customer group, sales by item, cash receipts by account as a function of sales by account and cash receipts by customer group as a function of sales by customer group, e) generating and storing a variable with each forecast element that is calculated in accordance with system default or user specified weighting criteria that facilitates forecast synchronization and obsolescence risk reduction, f) applying a set of prescribed mathematical algorithms, as implemented by a computer program stored in the computer system, to the forecasts of sales by account, sales by customer group and sales by item, cash receipts by account and cash receipts by customer group to create and store a multivalent composite forecast of sales and of cash receipts, g) using the stored variable for each forecast element to prioritize and quantify the adjustments made to each forecast element in the sales by account, sales by customer group, sales by item, cash receipt by account and cash receipt by customer group forecasts as they are adjusted to exactly match a controlling forecast designated by the user or entered by the user into said computer h) calculating and storing the variables that define the mathematical relationship between prior and current period sales and current period cash receipts by customer group, l) comparing the variables used to calculate the rate of payment by each customer group with previous payment rate variables for the same customer group in order to highlight any decrease in the rate of payment (i.e., percentage of payments made in later periods is increasing), and m) displaying a listing to the user listing the customer groups that have decreased their rate of invoice payment from prior levels.

* * * * *